Oct. 9, 1945. P. SPURLINO ET AL 2,386,364
CASH REGISTER
Filed July 16, 1941 15 Sheets-Sheet 1
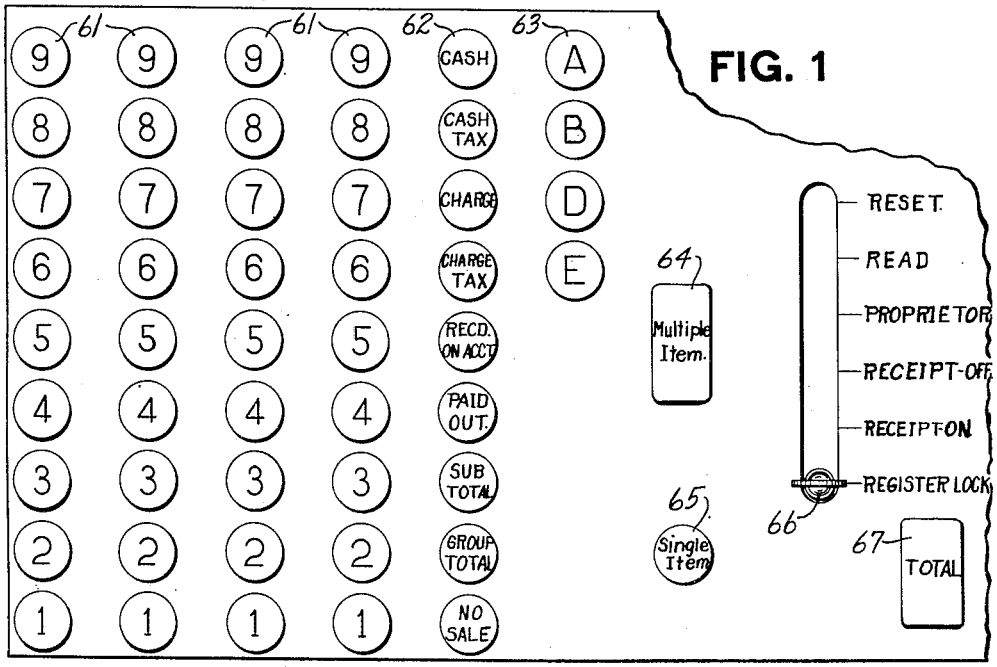
FIG. 1
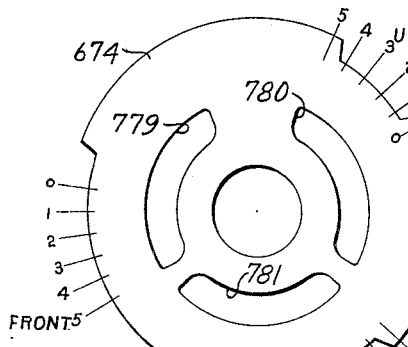
FIG. 2
UNIT LOCK LEVER.
FIG. 3
ITEM CONTROL BANK.
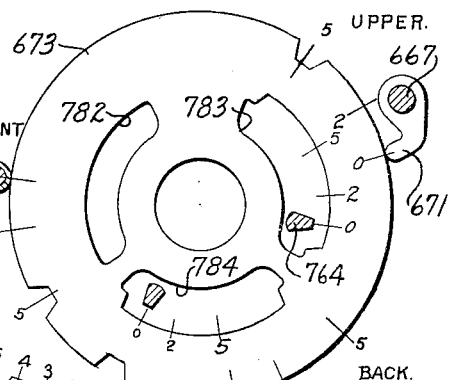
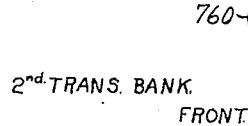
FIG. 4
2nd TRANS. BANK.
Pascal Spurlino
Arthur R. Colley
Laurence N. Lehman
and Frederick Gantner
Inventors
By Earl Beust
Their Attorney

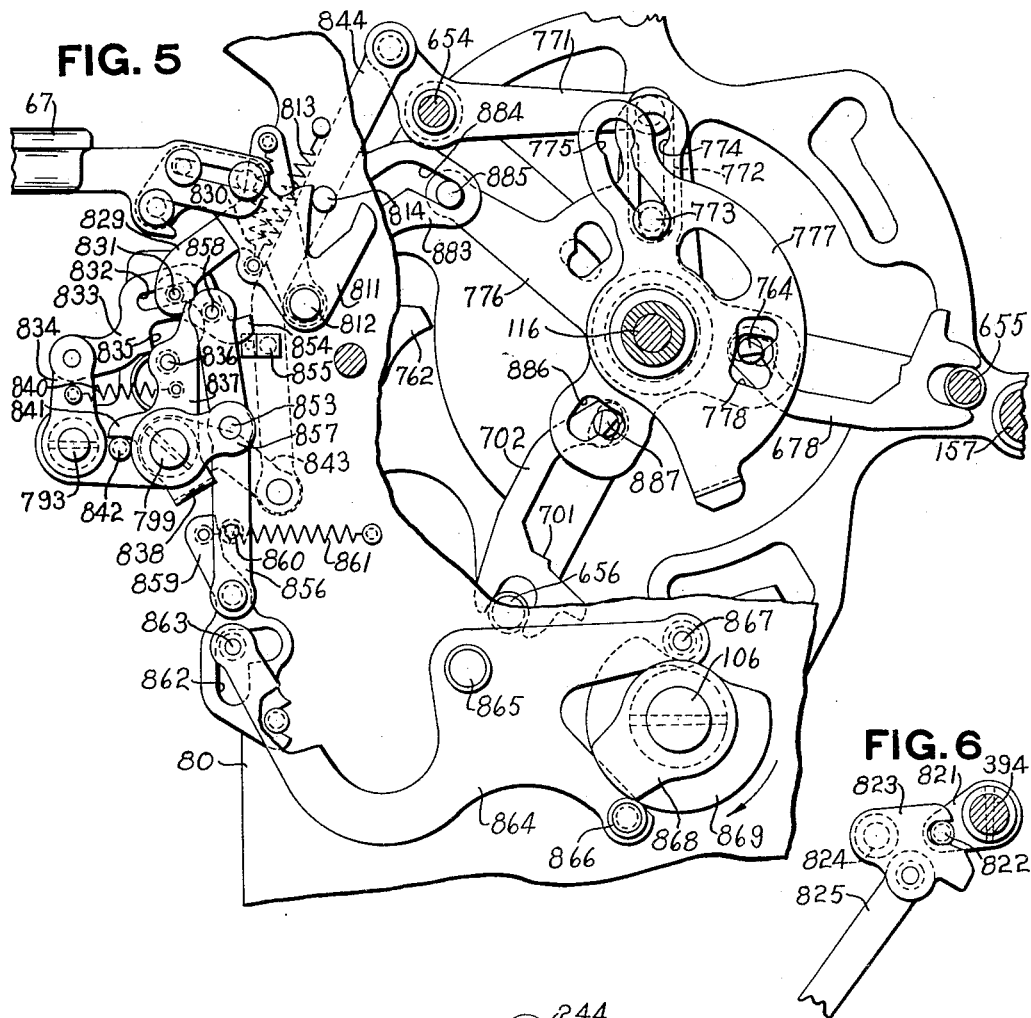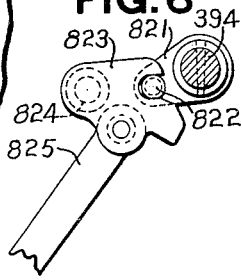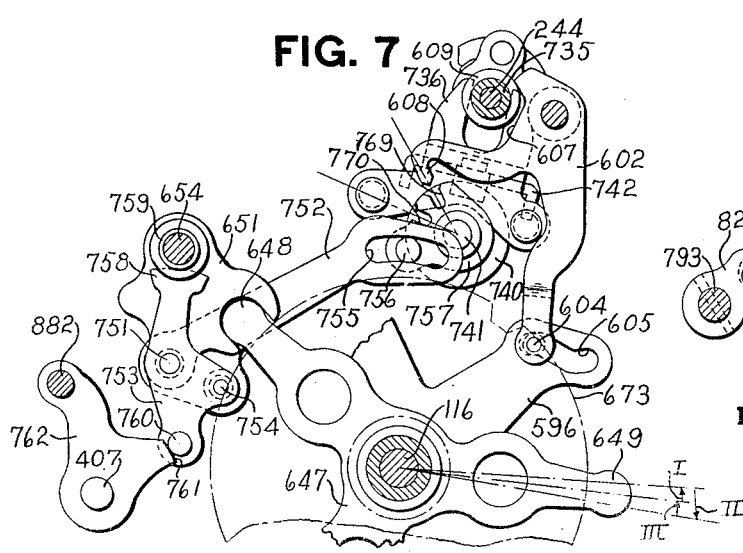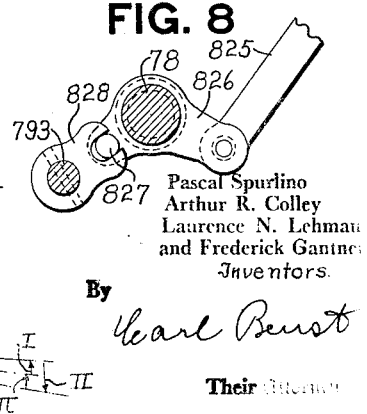

Oct. 9, 1945.    P. SPURLINO ET AL    2,386,364
CASH REGISTER
Filed July 16, 1941    15 Sheets-Sheet 4

Pascal Spurlino
Arthur R. Colley
Laurence N. Lehman
and Frederick Gantner
Inventors By *Pearl Beust*

Their Attorney

Oct. 9, 1945.  P. SPURLINO ET AL  2,386,364
CASH REGISTER
Filed July 16, 1941  15 Sheets-Sheet 5
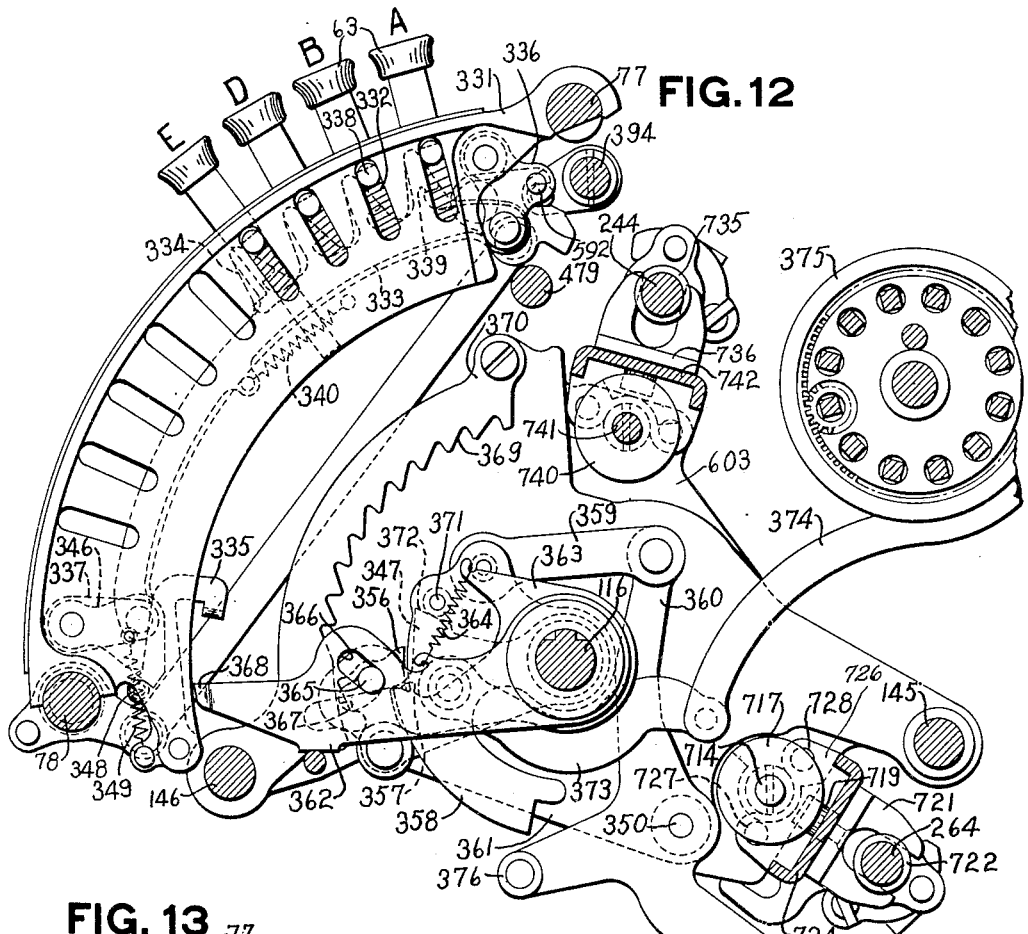
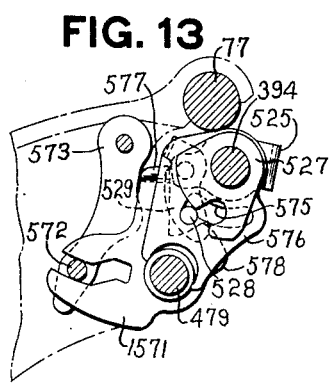
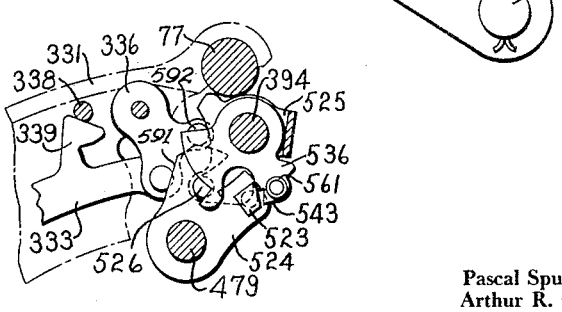
Pascal Spurlino
Arthur R. Colley
Laurence N. Lehman
and Frederick Gantner
Inventors
By Earl Benst
Their Attorney

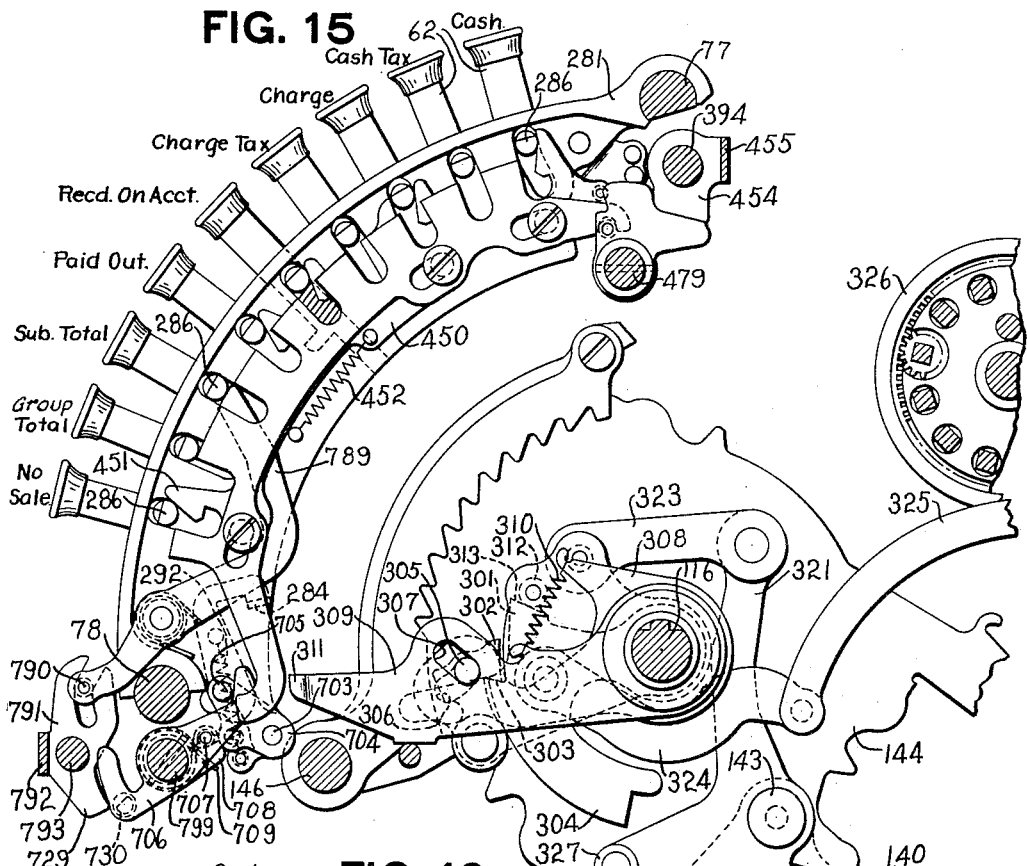
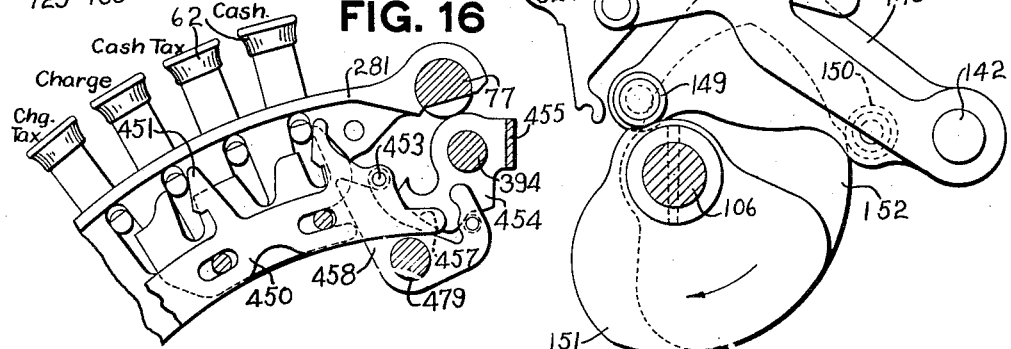

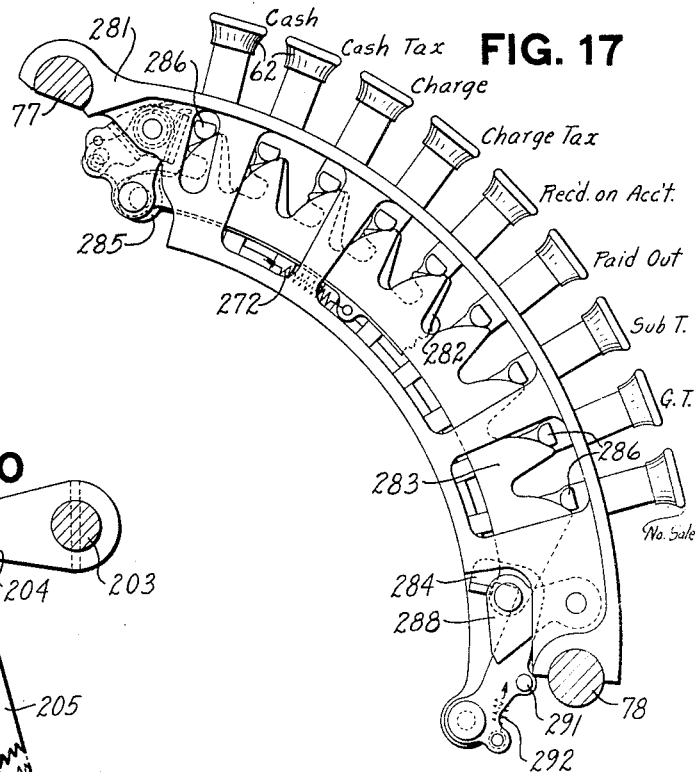
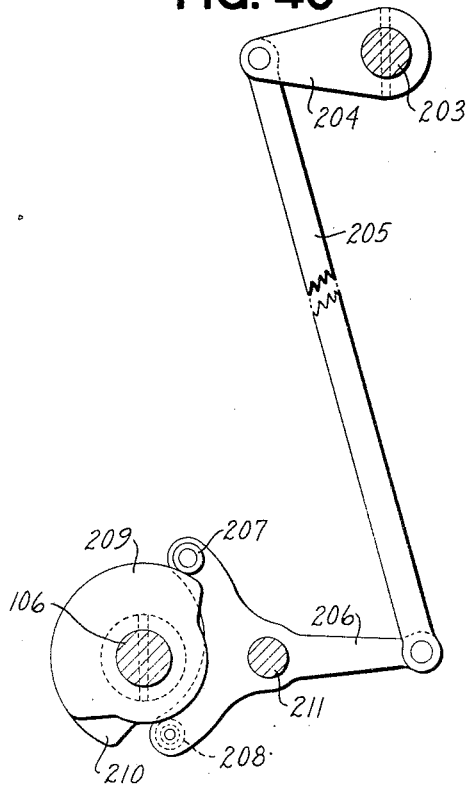

Oct. 9, 1945.  P. SPURLINO ET AL  2,386,364
CASH REGISTER
Filed July 16, 1941   15 Sheets-Sheet 8

Pascal Spurlino
Arthur R. Colley
Laurence N. Lehman
and Frederick Gantner
Inventors By Their Attorneys

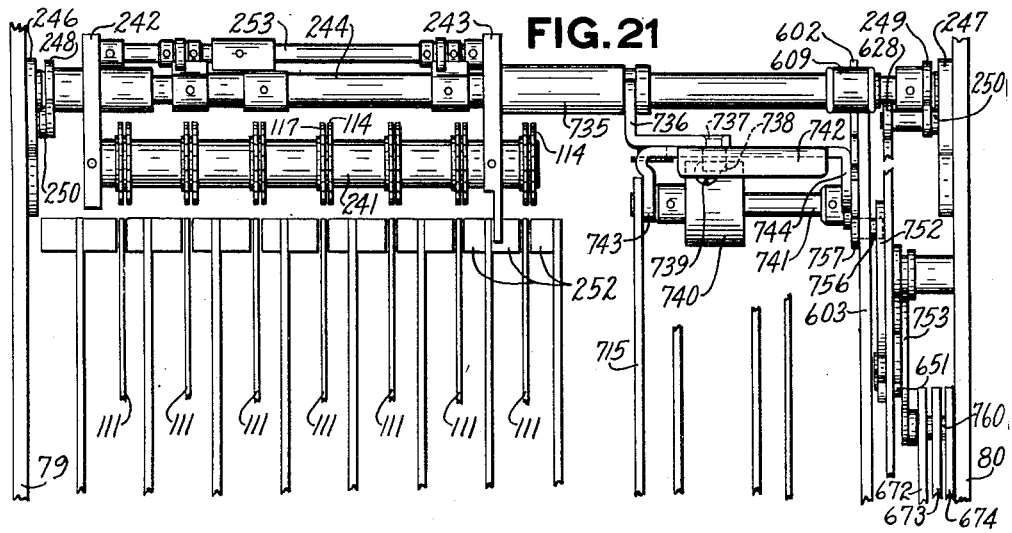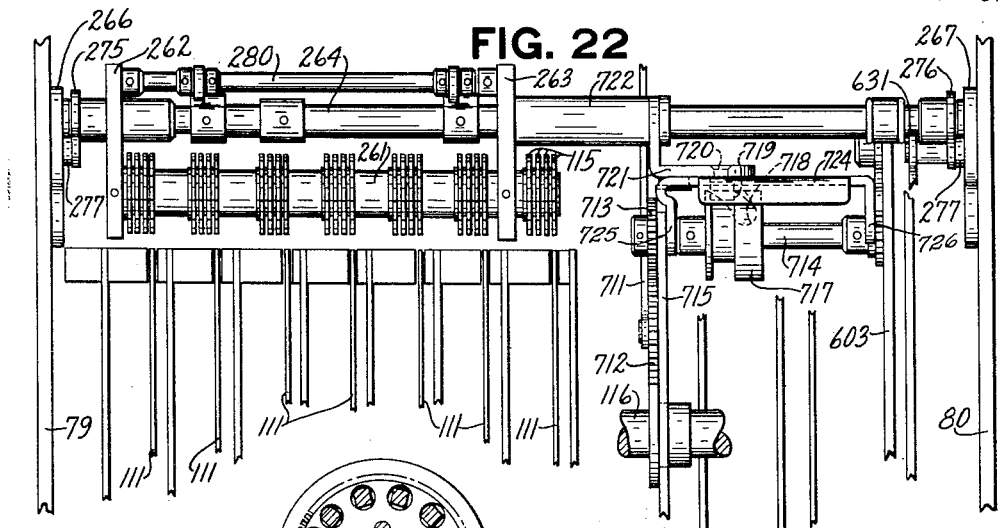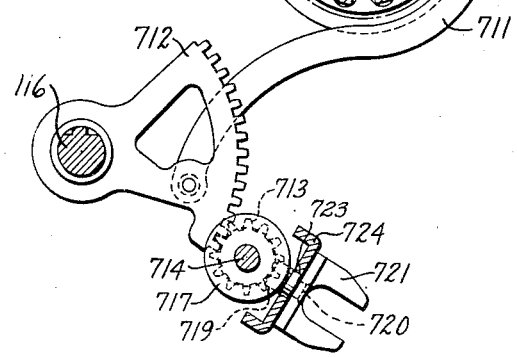

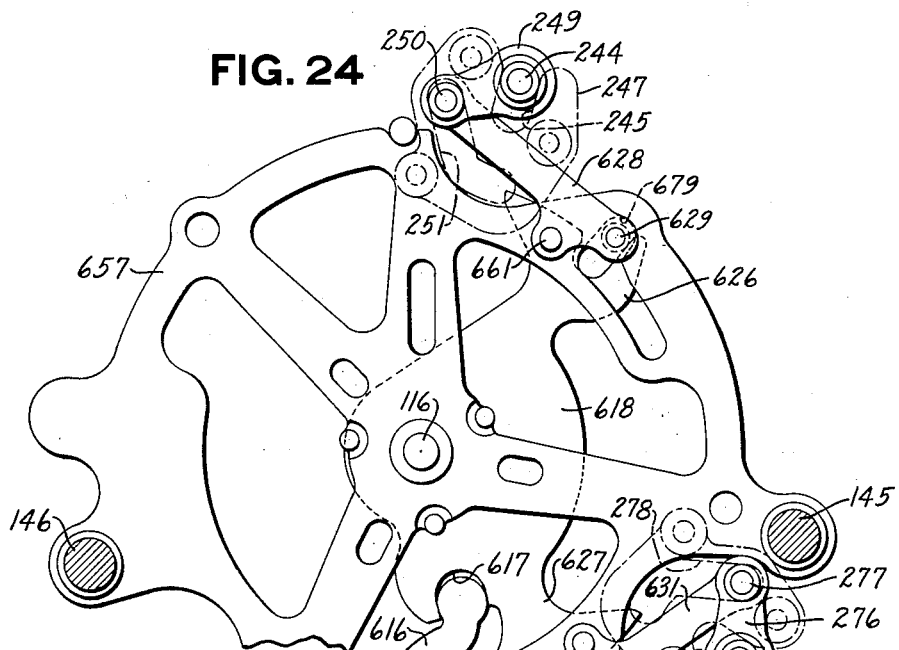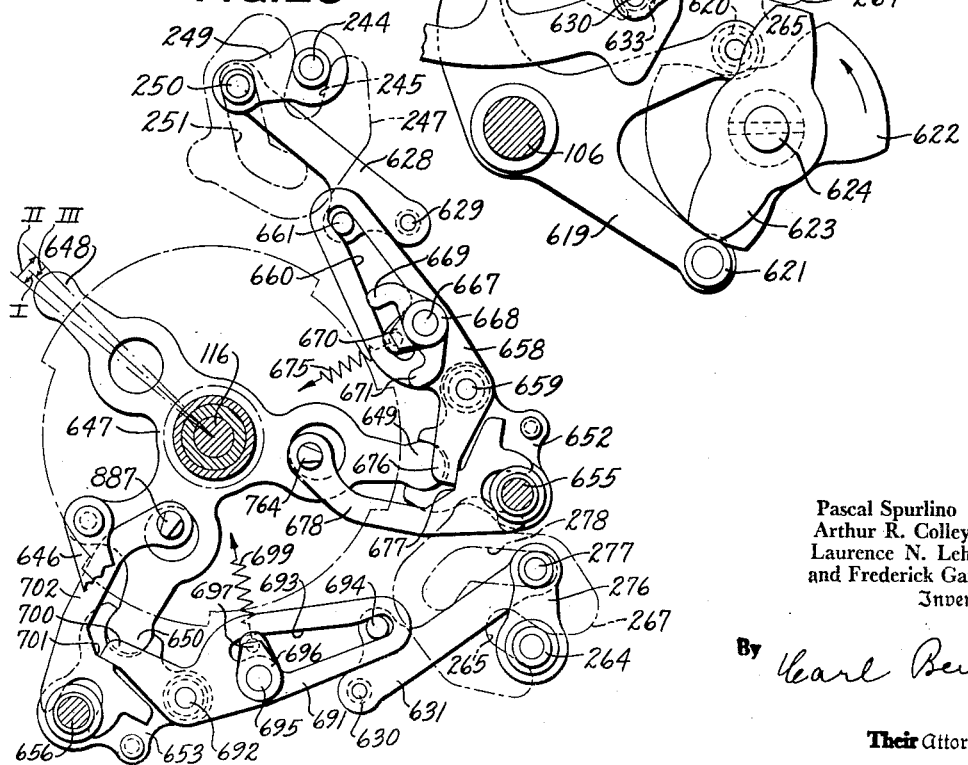

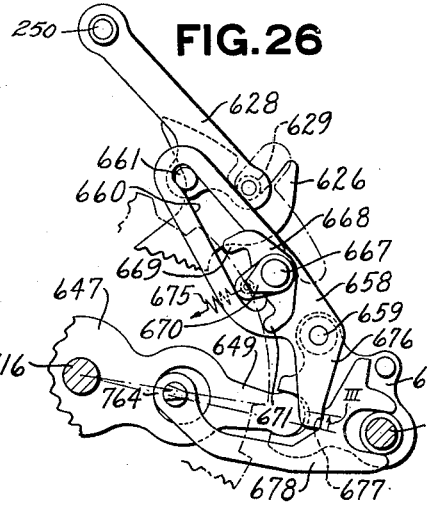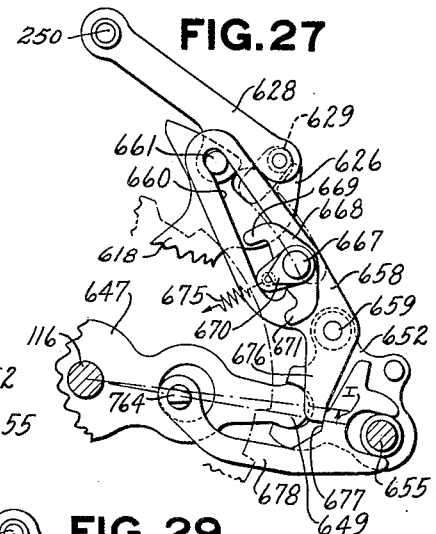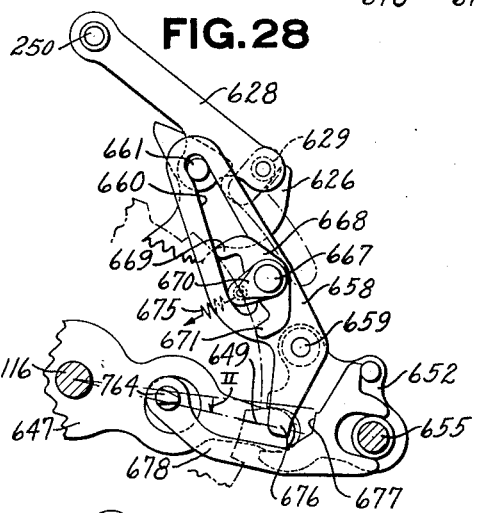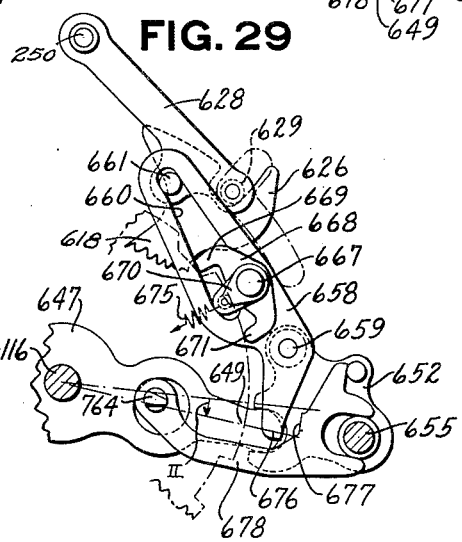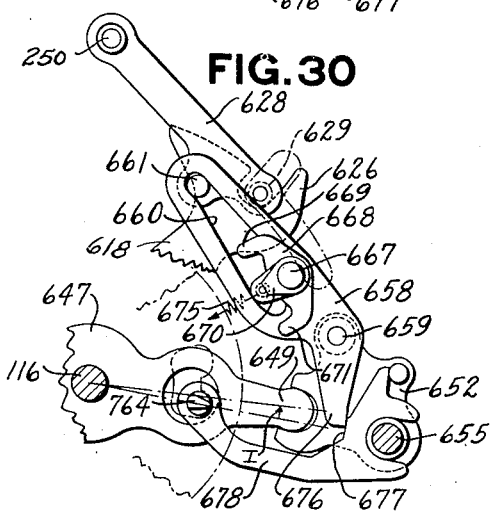
Pascal Spurlino
Arthur R. Colley
Laurence N. Lehman
and Frederick Gantner
Inventors Oct. 9, 1945.  P. SPURLINO ET AL  2,386,364
CASH REGISTER
Filed July 16, 1941  15 Sheets-Sheet 12

Pascal Spurlino
Arthur R. Colley
Laurence N. Lehman
and Frederick Gantner
Inventors By Carl Benst Their Attorney Pascal Spurlino
Arthur R. Colley
Laurence N. Lehman
and Frederick Gantner
Inventors By Earl Beust Their Attorney Oct. 9, 1945.   P. SPURLINO ET AL   2,386,364
CASH REGISTER
Filed July 16, 1941   15 Sheets-Sheet 14
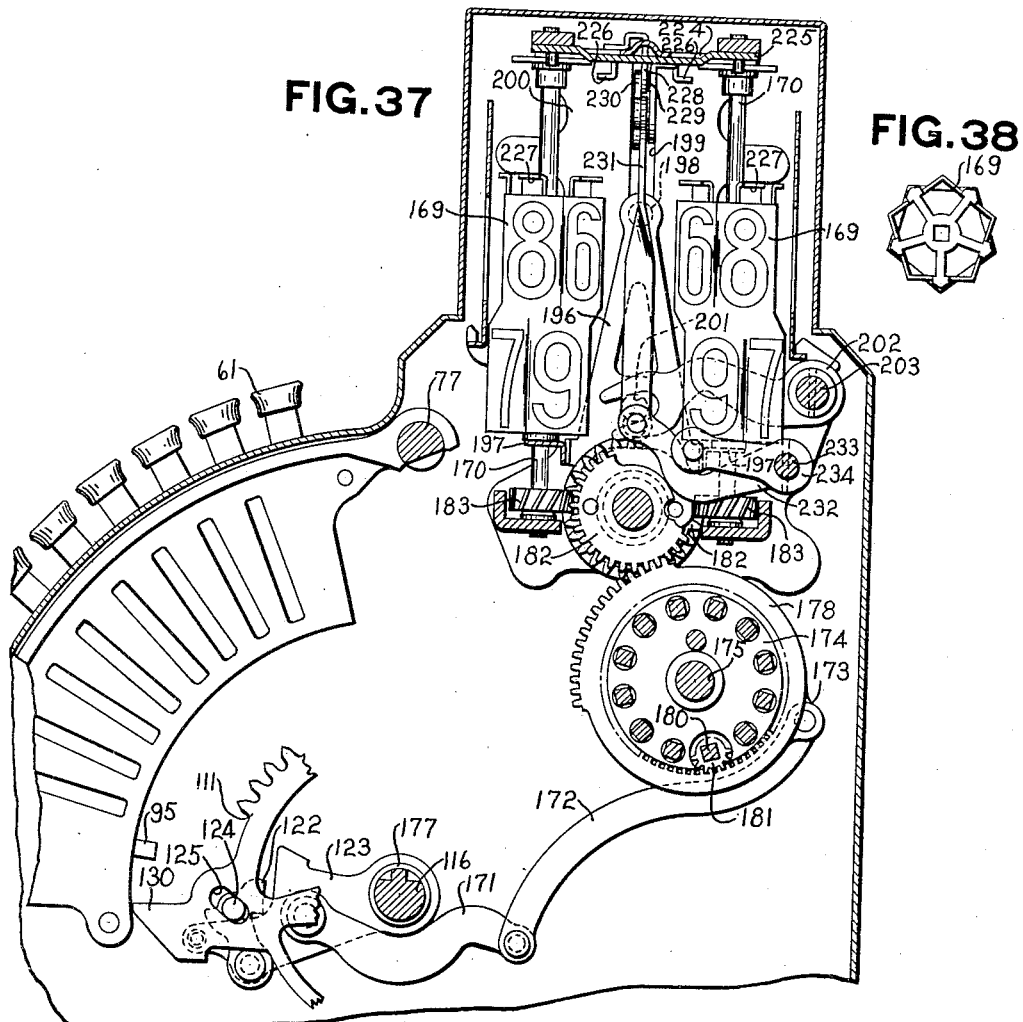
FIG. 37
FIG. 38
FIG. 39
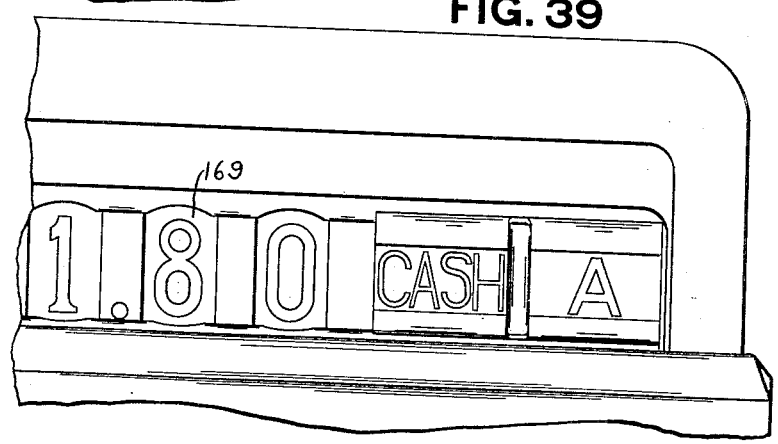
Pascal Spurlino
Arthur R. Colley
Laurence N. Lehman
and Frederick Gantner
Inventors
By Earl Bent
Their Attorney

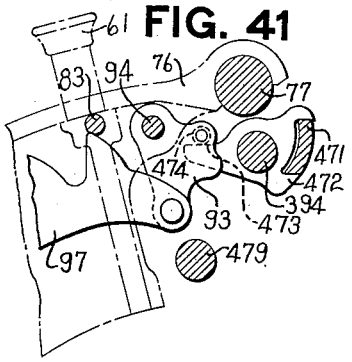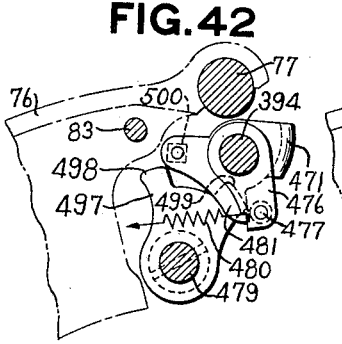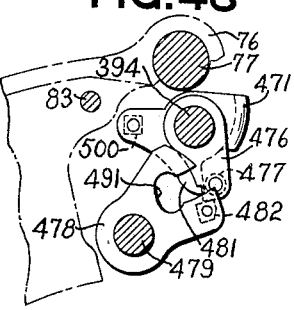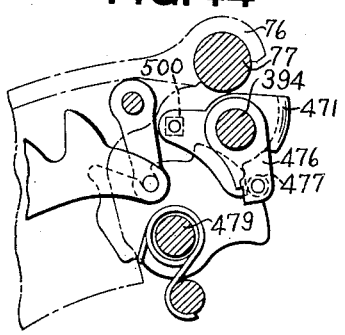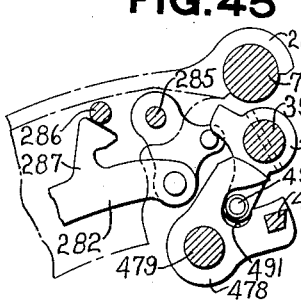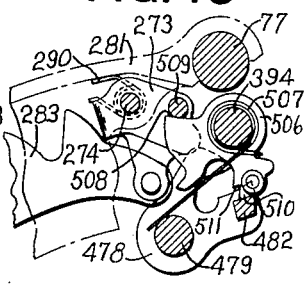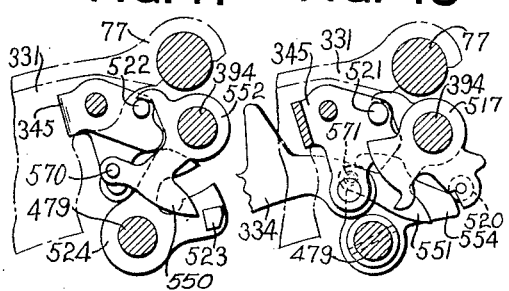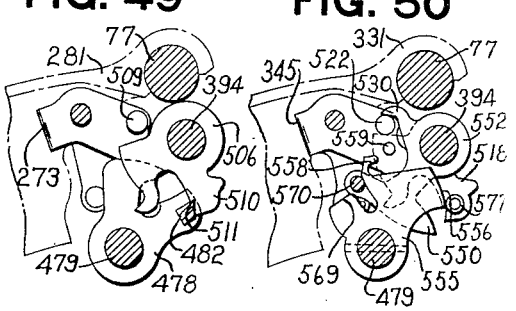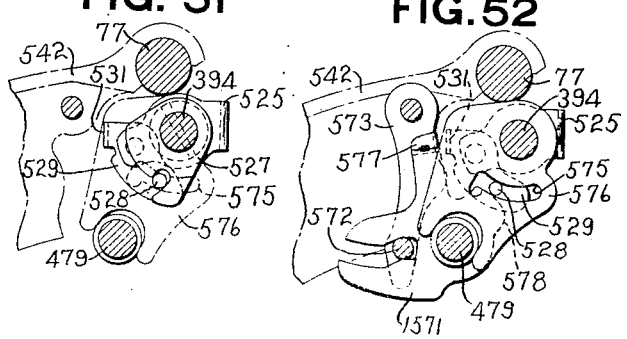

Patented Oct. 9, 1945

2,386,364

UNITED STATES PATENT OFFICE 2,386,364

CASH REGISTER

Pascal Spurlino, Arthur R. Colley, Laurence N. Lehman, and Frederick Gantner, Dayton, Ohio, assignors to The National Cash Register Company, Dayton, Ohio, a corporation of Maryland Application July 16, 1941, Serial No. 402,590

30 Claims. (Cl. 235—6)

This invention relates to cash registers and accounting machines and is more particularly directed to the totalizer engaging and controlling mechanisms thereof.

The machine shown in the accompanying drawings is of the general type shown and described in United States Letters Patent Nos. 1,619,796 and 1,749,960, issued March 1, 1927, and March 11, 1930, respectively, to Bernis M. Shipley; and No. 1,917,356, issued July 11, 1933, to Samuel Brand. The indicating mechanism employed in connection therewith is of the so-called "pentagon" type, which is fully illustrated and described in the patent of Frank R. Werner, No. 2,279,805, issued April 14, 1942. Used in connection with the indicating mechanism and the totalizer selecting mechanism is external-internal gear drive mechanism of the type disclosed in United States Letters Patent No. 1,693,279, issued November 27, 1928, to Walter J. Kreider.

Heretofore, in machines of this type, provided with one or more lines of interspersed totalizers, a manually adjustable total control device was employed for conditioning the machine to perform a single cycle of operation for adding amounts upon the totalizers, or a double cycle of operation for taking a total or a sub-total from the totalizers. When it was desired to take an amount off of one totalizer and transfer the amount to another totalizer, it was also necessary to condition the machine for a double cycle of operation by manually adjusting the total control device to one of its various total taking positions.

The present invention enables the taking of a total from one totalizer and the automatic transfer thereof to another totalizer during a single cycle of operation, while the total control device remains in its normal "add" position. It will readily be seen that such an arrangement is particularly advantageous when it is desired to take a total of a multiple-item transaction, clear the multiple-item totalizer, and transfer the amount taken therefrom to a group totalizer, without the necessity of manually moving the total control device to a position to condition the machine for performing the regular two-cycle operation usually necessary for accomplishing such results.

It is, therefore, a primary object of the invention to provide a novel totalizer control mechanism which is characterized by its flexibility and selectivity.

Another object of the invention is to provide mechanism, controlled by a differentially adjustable control device, for conditioning the machine to perform single-cycle adding operations and double-cycle total taking operations, and means adapted under certain conditions, when the device is adjusted for single-cycle adding operations, to supersede the control exercised by said device over the mechanism to enable the machine to be operated to take an amount off of one totalizer, reset said totalizer to zero, and transfer such amount to another totalizer in the same row during a single cycle of operation.

Another object of the invention is to provide a novel arrangement for selecting and engaging the totalizers during item entering operations and item total taking operations.

Another object of the invention is to provide novel means for transferring totals taken from one totalizer to another totalizer of the same row.

Another object of the invention is to provide a novel arrangement for machine release, in accordance with the various kinds of transactions performed.

Another object of the invention is to provide novel interlocking means for certain keys, and means to control the operation of the interlocking means in various kinds of machine operations.

Another object of the invention is the provision of novel means for taking a total from an item totalizer and automatically transferring it to a group totalizer, both carried on the same line, during a single cycle of operation.

A further object of the invention is the provision of means for selectively engaging one or all of a plurality of totalizer lines simultaneously with a common actuating mechanism during an adding operation.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

Of said drawings:

Fig. 1 is a diagrammatic representation of the keyboard of the illustrated machine.

Fig. 2 is a detail side view of a totalizer selecting disk, which is differentially adjustable under control of the unit lock lever, and the pawls or feelers coacting therewith.

Fig. 3 is a detail side view of another totalizer selecting disk, which is differentially adjustable under control of the bank of item control keys, and the pawls or feelers coacting therewith.

Fig. 4 is a detail side view of another totalizer selecting disk, which is differentially adjustable under control of the transaction bank of keys, together with its associated pawls and feelers.

Fig. 5 is a vertical section through a portion of the machine, showing the total key and associated mechanism for controlling the engagement of the totalizers during either single-cycle or double-cycle sub-total and total taking operations.

Fig. 6 is a detail side view of the means actuated by the key lock line for connecting the throwout reset line to the cam actuating mechanism and retaining the total key depressed during total taking operations.

Fig. 7 is a detail vertical section through a portion of the machine, showing the means for shifting the upper totalizer line.

Fig. 8 is a detail side view of the lower portion of the mechanism shown in Fig. 6.

Fig. 12 is a side elevation of the clerks' bank of keys and the mechanism controlled thereby for shifting laterally the lower totalizer line to effect a variable selection of clerks' totalizers for engagement with the actuators.

Fig. 13 is a detail right-hand side view of devices controlled by the banks of multiple-item and single-item keys for releasing the machine for operation, and interlocks associated therewith.

Fig. 14 is a detail view of the clerk's bank locking detent and its controlling means from the multiple-item and single-item bank.

Fig. 15 is a right side elevation of the bank of transaction keys and the mechanism controlled thereby for differentially adjusting the totalizer selecting disk associated therewith.

Fig. 16 is a detail fragmentary side view of the upper portion of the bank of transaction keys.

Fig. 17 is a left side elevation of the bank of transaction keys shown in Figs. 15 and 16, showing additional detents associated therewith.

Fig. 21 is a front elevation of the upper totalizer line, showing a portion of the means for shifting the same relatively to the actuators.

Fig. 22 is a front elevation of the lower totalizer line, showing the means for shifting the same laterally relatively to the actuators.

Fig. 23 is a detail side view of the portion of the means controlled by the clerks' bank of keys for shifting the lower totalizer line.

Fig. 24 is a side view of the totalizer engaging means.

Fig. 25 is a detail side view of a portion of the totalizer selecting means.

Fig. 26 is a side view of the mechanism for controlling the engagement or non-engagement of the upper totalizer line with the actuators, showing the parts in their home positions.

Fig. 27 is a view of the mechanism shown in Fig. 26, showing the parts in the positions to which they are moved during the first half-cycle of an adding operation to prevent the upper totalizer line from being moved into engagement with the actuators.

Fig. 28 is a view of the same mechanism shown in Figs. 26 and 27, showing the feeling member coacting with unnotched portions of the peripheries of the selecting disks at the end of the first half-cycle of operation, thereby preventing the upper totalizer line from being moved into engagement with the actuators during the last half of said cycle of operation.

Fig. 29 is like Fig. 28 except that it shows the feeling member coacting with notched portions of the peripheries of the selecting disks, thereby causing the upper totalizer to be moved into engagement with the actuators during the last half of the cycle of operation.

Fig. 30 is a view of the mechanism illustrated in Figs. 26, 27, 28, and 29, showing the positions assumed by the parts shortly after the beginning of the first half of the cycle of operation, when the upper totalizer line is moved into engagement with the actuators in order that the latter may take off the amount on said totalizer and add it on another totalizer on said line during the last half-cycle of said operation.

Figures 31, 31A, 32, 33:
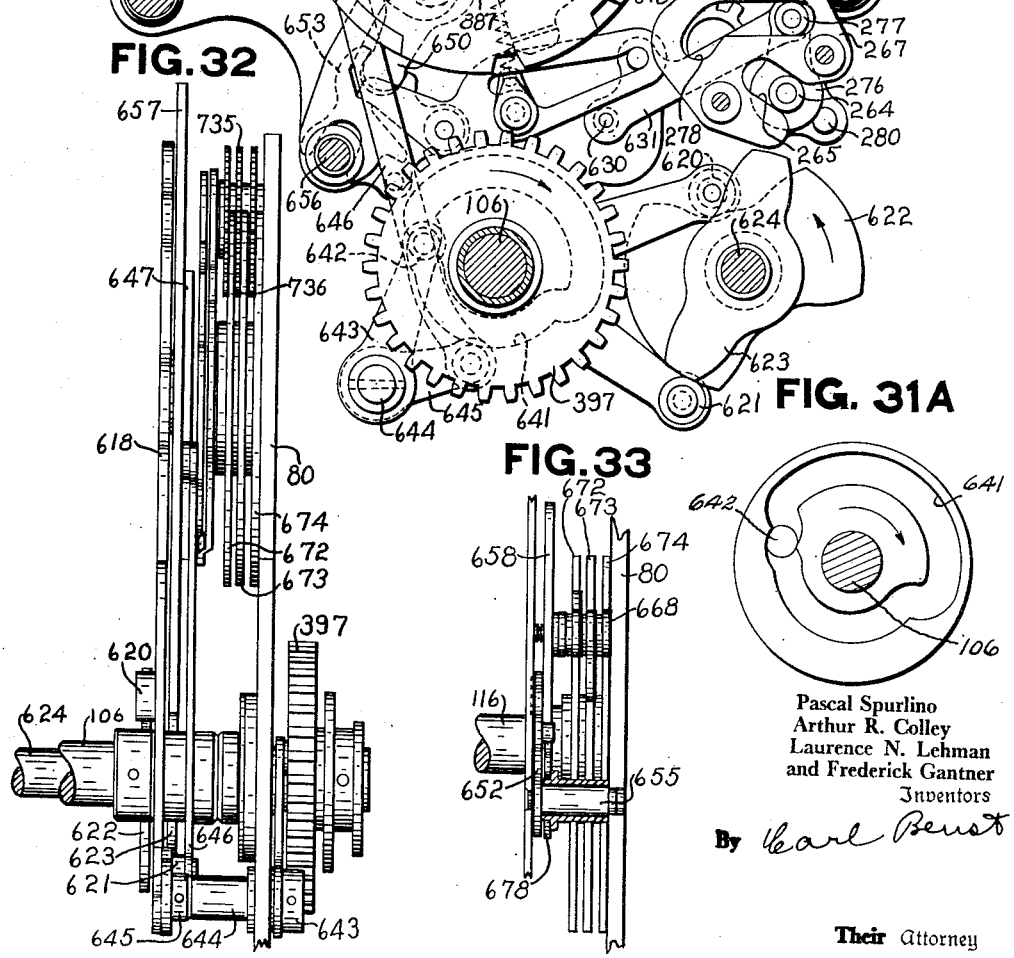

Fig. 31 is a side view of a portion of the totalizer selecting plate associated with the bank of transaction keys, together with the totalizer engaging mechanism controlled thereby.

Fig. 31A is a detail view showing the dotted cam race of Fig. 31 in full lines.

Fig. 32 is a front elevation of a portion of the mechanism shown in Fig. 31.

Fig. 33 is a fragmentary front view of a portion of the mechanism shown in Fig. 31.

Figure 34:
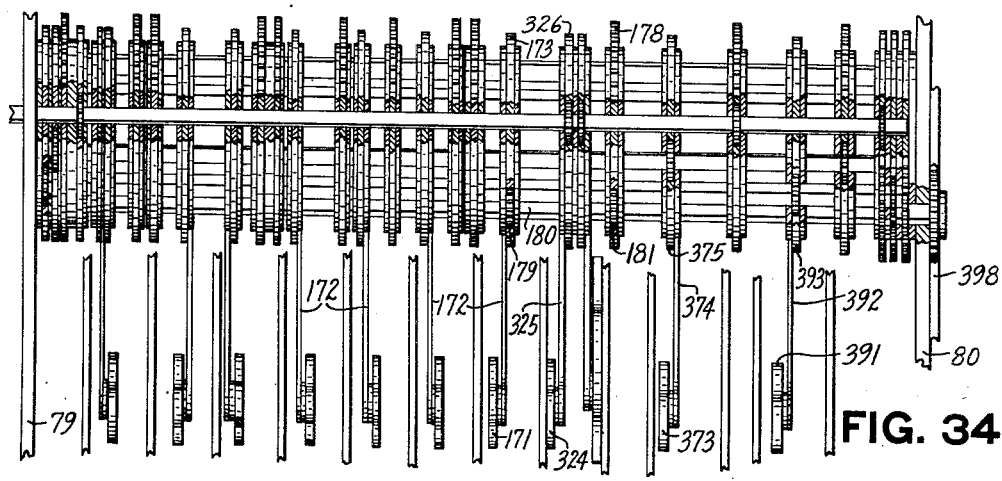

Fig. 34 is a front elevation of the train of external-internal gear drive mechanism.

Figure 35:
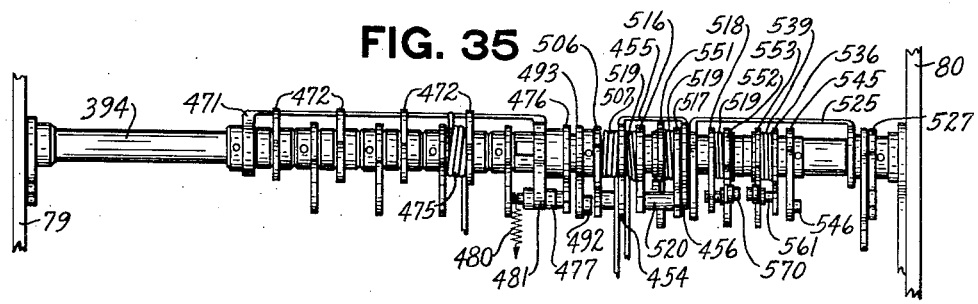

Fig. 35 is a top plan view of the machine release line.

Figure 36:
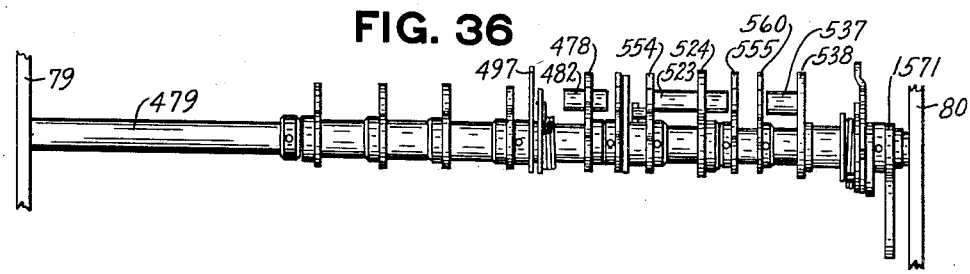

Fig. 36 is a top plan view of the upper reset line.

Fig. 37 is a vertical section through a portion of the machine, showing the indicating mechanism and the means for differentially setting the same.

Fig. 38 is a detail top plan view of one of the indicators employed in the present machine.

Fig. 39 is a fragmentary view of the upper portion of the machine, showing certain of the indicators.

Fig. 40 is a side view of a portion of the mechanism for raising and lowering the indicators.

Figs. 41, 42, 43, and 44 are detail right-hand side views of the devices controlled by the banks of amount keys for releasing the machine for operation, as well as certain interlocks associated therewith.

Figs. 45, 46, and 49 are detail right-hand side views of the devices controlled by the transaction bank of keys for releasing the machine for operation, as well as certain interlocks related thereto.

Figs. 47, 48, and 50 are detail right-hand side views of the devices controlled by the clerks' bank of keys for releasing the machine, and the interlocks associated therewith.

Figs. 51 and 52 are detail right-hand side views of the devices controlled by the bank of multiple-item and single-item keys for releasing the machine for operation, and the interlocks related to the same.

General description

The machine embodying this invention is arranged to record single-item transactions and multiple-item transactions. A single-item transaction consists of the entering of a single item in the group totalizer and in the selected clerk's totalizer, and the setting up of this item on the indicators.

A multiple-item transaction consists of a series of item-entering operations followed by a clearing operation. During the item entering operations, the items are accumulated in the multiple-item totalizer and in the proper clerk's totalizer, and are set up on the indicators as the items are entered in the totalizers. In the clearing operation following a series of multiple-item entering operations, the multiple-item totalizer is reset to zero, and the total is automatically transferred to the group totalizer and set up on the indicators, all during a single-cycle machine operation.

In recording a multiple-item transaction wherein there is a tax involved, instead of clearing the multiple-item totalizer following the entry of the last item of such a transaction, a "read" operation is performed, which causes a sub-total to be set up on the indicators, without clearing the totalizer, during a single-cycle machine operation. The operator then computes the amount of tax based on the sub-total amount displayed on the indicators, and causes such tax to be added into the multiple-item totalizer. The multiple-item totalizer is afterward reset to zero, and the total of all the items comprised in such multiple-item transaction, including the tax, is automatically transferred to the group totalizer and set up on the indicators, during a single-cycle machine operation.

In machines performing these operations, it is highly desirable that various keys should be operated in certain operations and be blocked against operation in others. It is also necessary that keys be released in certain operations and be retained depressed in other operations. Novel mechanisms have been provided herein for insuring that the keys will be locked and released under the proper conditions.

When it is desired to read or reset to zero the group totalizer or any one of the clerks' totalizers, it is necessary to adjust the unit lock lever (total control device) to the proper one of its various positions of adjustment to condition the machine for a double-cycle operation.

The type of machine disclosed in the present application includes, generally, a plurality of interspersed totalizers, control keys, and differential mechanisms associated therewith for selecting the desired totalizer; a plurality of banks of amount keys and differential mechanisms associated therewith for adding amounts set up thereon into the selected totalizers; and total and sub-total control mechanism.

Printing mechanism may be provided for the purpose of printing on one or a plurality of record materials the various amounts registered, and the totals and sub-totals accumulated on the various totalizers. The present machine is shown equipped with indicators for displaying the above data to the public upon operation of the machine.

Machines of this type usually employ a plurality of rows of interspersed totalizers for classifying and recording the various data set up on the keyboard of the machine. Also provided in such machines are means, under control of the differentially adjustable control device (unit lock lever), which condition the machine either for a single cycle of operation to perform a regular adding operation, or for a double cycle of operation to perform a total or sub-total taking operation, otherwise known in this art as a "reset" operation or a "read" operation, respectively.

In order to take an amount off of one totalizer and transfer such amount to another totalizer in such types of machines, it is necessary to adjust the total control device to condition the machine for a two-cycle operation.

While the machine herein illustrated is provided with all of the above mentioned mechanisms for accomplishing the results set forth, it also includes novel means for greatly increasing the flexibility and selectivity of the totalizer selecting and engaging mechanism. For example, with the present invention, it is possible, after registering all the items of a multiple-item transaction, to take the total off of the multiple-item totalizer, reset said totalizer to zero, and transfer such total amount to a group totalizer in the same row, during a single cycle of operation, without moving the control device out of its normal "add" position.

Interlocks are provided between the various kinds of keys and the unit lock lever to retain the operated transaction and clerks' keys depressed during multiple-item operations, as well as to prevent operation of the keys and the unit lock lever during other kinds of operations, as will be described more in detail hereinafter.

Keyboard

The keyboard of the present machine is diagrammatically shown in Fig. 1 and includes a plurality of banks of amount keys 61; three rows of control keys comprising a bank of transaction keys 62, a bank of clerks' keys 63, and a bank of multiple-item and single-item keys 64 and 65, respectively; a differentially adjustable unit lock total control lever 66; and a total key 67.

Amounts to be entered on one or another of the plurality of totalizers in the machine are set up by depressing the appropriate amount keys 61 (Figs. 1 and 18), arranged in denominational banks. Each of these banks of keys 61 is provided with a differential mechanism to add into the denominational wheels of the selected totalizer the amount set up on the amount keys and to control the adjustment of the indicators accordingly.

The transaction keys 62 (Figs. 15, 16, and 17) control the selection of totalizers into which the amounts set up on the amount keys 61 are to be added, as well as control the adjustment of the indicators and certain other elements in the machine for taking a sub-total from the itemizing totalizer and a total from the group totalizer.

The clerks' keys 63 (Fig. 12) control the selection of the clerks' totalizers into which amounts set up on the amount keys are to be added, as well as control the adjustment of the indicators associated therewith.

The bank of multiple-item and single-item keys 64 and 65 (Fig. 10), respectively, controls mechanism for selecting either the multiple-item totalizer or the group totalizer, into which the amounts set up on the amount keys are to be added.

The unit lock lever 66 (Figs. 9 and 11) controls the adjustment of certain elements for conditioning the machine to perform single-cycle adding operations and double-cycle total or sub-total taking operations.

The total key 67 (Fig. 5) is adapted, when the unit lock lever 66 is adjusted for single-cycle adding operations, to supersede the control of said lever over certain elements in the machine to cause the latter to take a total from the item totalizer and transfer such total to the group totalizer during a single cycle of operation.

Amount keys

As previously stated, the machine herein illustrated has four banks of amount keys 61, and, inasmuch as all of the amount banks and their associated differential mechanisms are identically alike, it is thought that a description of one denominational unit will suffice for all.

Figure 18:
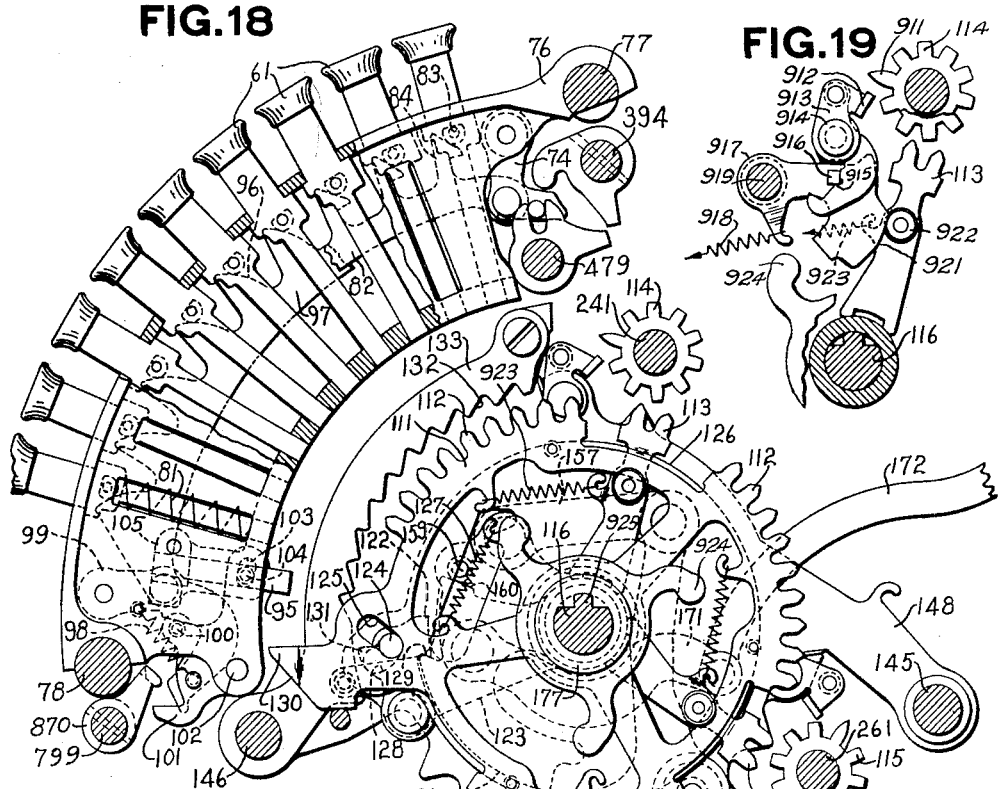
Fig. 18 is a side elevation of a bank of amount keys and the differential mechanism controlled thereby.

Referring to Fig. 18, it will be seen that the amount keys 61 are slidably mounted in a frame 76 which is removably supported on rods 77 and 78 extending between and supported by the main side frames 79 and 80 (Figs. 21 and 22) of the machine.

The amount keys 61 are normally maintained in their undepressed positions by the usual coil springs 81 (only one of which is shown). When a key 61 is depressed, it is held in depressed position by a locking detent 82 supported at its upper end by a bell crank 74 and at its lower end by an arm (not shown), both said bell crank and said arm being pivotally mounted on the frame 76. Depression of an amount key 61 causes a pin 83 carried thereby to coact with a cam portion of a hook 84 on the detent 82 to cam the latter downwardly against the action of the usual spring (not shown) until the pin 83 clears the hook 84, whereupon said spring moves the detent 82 upwardly to lock the hook 84 over the pin 83 to retain said key in its depressed position. Near the end of the operation, the detent 82 is again moved downwardly, by mechanism to be hereinafter described, to disengage the hook 84 from the pin 83, thus releasing the key 61 to the action of the coil spring 81, which moves the key outwardly to its normal undepressed position.

A zero stop 95 (Fig. 18) is provided for causing the differentially movable actuator to be arrested in zero position when the machine is operated with no key depressed. During adding operations, this stop is moved out of its normal effective position by depression of any one of the keys 61. When an amount key is depressed, the pin 83 thereon coacts with the cam portion 96 of a control bar 97 to cam the latter downwardly against the action of a spring 98. Said bar is pivoted at its upper end to an arm 93 (Fig. 41) loose on a stud 94 mounted in the frame 76, and at its lower end by a curved arm 99 pivotally mounted on the frame 76. When the bar 97 is moved downwardly, it rocks the arm 99 clockwise, which, through a pin 100 on one end of a lever 101 pivoted at 102 to the frame 76, rocks the lever 101 counter-clockwise against the action of a spring 98. The other end of the lever 101 has a slot 103, through which projects a pin 104 carried by the zero stop 95, so that counter-clockwise movement of the lever 101, through the pin 104 and the slot 103, slides the zero stop 95 toward the left in a guide member 105 carried by the frame 76, thus moving the stop out of its normal effective position to an ineffective position.

When the depressed key 61 is returned to its normal undepressed position, the spring 98, normal the lever 101, returns the zero stop 95 through the bar 97 to their normal positions.

Amount differential mechanism

There are provided in the machine as many amount differential mechanisms as there are amount banks of keys, and there may be one or more additional differential mechanisms to take care of the overflow amounts. Inasmuch as each of said differential mechanisms is identically the same, a description of one will suffice for all. Each differential mechanism is controlled by its respective bank of amount keys 61 to accumulate on totalizers and adjust indicators and type wheels during adding operations.

The present machine is adapted to perform single-cycle operations and double-cycle operations, a single cycle of operation involving one complete revolution of a main drive shaft 106, while a double-cycle operation requires two complete revolutions of the main drive shaft. The means for conditioning the machine to perform such operations will be hereinafter described.

Each differential mechanism includes a differentially movable actuator 111 (Fig. 18) provided with racks 112 and transfer carrying arms 113 for operating totalizer wheels 114 and 117 arranged on one line, and 115 arranged on another line. The transfer mechanism (Fig. 19) which controls the arms 113 is hereinafter described. While the actuator 111 is shown provided with three racks 112 for operating totalizer wheels on a like number of different lines, only two such lines are used in the present machine, and consequently only two of said racks will be effective.

The actuator 111 is loosely mounted on a shaft 116 carried by the machine side frames 79 and 80. During each cycle of operation of the machine, the actuator 111 is driven first in a clockwise direction and then in a counter-clockwise direction by a segmentally shaped driver 121 also loosely mounted on the shaft 116, which driver is given an invariable excursion of movement, during each cycle of operation of the machine, by means to be hereinafter described.

The actuator 111 is connected to the driver 121 by means of a latch 122 pivotally mounted on an arm 123 also loose on the shaft 116. A pin 124 on the latch 122 projects through a slot 125 in the actuator 111. Arranged parallel with and adjacent to the actuator 111 is a counter-balance plate 126, said plate being loose on the shaft 116 and resiliently connected to the actuator 111 by a spring 127. The plate 126 is provided with a curved slot 128 substantially at right angles to the inclined slot 125 in the actuator 111. The pin 124 also projects through and works in the slot 128. Thus the plate 126, through the slot 128 and its resilient connection with the actuator 111, normally serves to hold the pin 124 at the bottom of the slot 125 in the actuator 111, to thereby maintain the latch 122 in engagement with a shoulder 129 formed on the driver 121. With the latch 122 thus engaged with the shoulder 129, the driver 121, during its clockwise movement, moves the actuator 111 and the plate 126 clockwise until the latch 122 is disengaged from the driver, under control of either the zero stop 95 or a depressed amount key 61, in the case of an adding operation. If it is a total taking operation, then the actuator 111 is arrested under control of the selected one of the totalizer wheels 114, 115, or 117, as will be described later.

When one of the keys 61 is depressed, the lower end thereof is positioned in the path of movement of a projection 130 on the actuator 111. Thus, when the actuator 111 and its associated plate 126 are moved clockwise by the driver 121, the projection 130 strikes the end of the depressed key and thereby arrests movement of the actuator 111. When this occurs, the latch 122 and the plate 126 continue to move clockwise relatively to the actuator until the slot 125, coacting with the pin 124, cams the latch 122 counter-clockwise, against the action of the slot 128 in the plate 126, to disengage the latch from the driver 121. When the latch 122 is thus disengaged from the driver 121, a projection 131 formed on said latch engages one of a series of notches 132 in a stationary locking plate 133 to maintain said latch and the actuator in their differentially set positions.

Through the camming action of the slot 125 on the pin 124, under the influence of the yieldable means formed by the spring 127, the plate 126, and the actuator 111, the possibility of premature disengagement of the latch 122 from the driver 121, when the machine is operated at excessive speed, is obviated. In addition, such an arrangement facilitates disengagement of the latch from the driver at the proper time and thereby reduces to a minimum the amount of load thus placed on the main drive shaft of the machine.

The means for giving the driver 121 associated with the amount differential bank shown in Fig. 18, and all the rest of the drivers associated with the rest of the amount banks and any overflow banks, their invariable excursions of movement during each cycle of operation of the machine, includes an oscillating frame consisting of a lever 140 (Fig. 15) and a lever 141 (Fig. 18) connected by a rod 142. The lever 140 is pivoted on a stud 143 carried by a supporting plate or hanger 144 (Fig. 15), which in turn is supported on rods 145 and 146 carried by the machine side frames 79 and 80. The lever 141 is pivoted on a stud 147 secured to a hanger 148 like the hanger 144. The hanger 148 is supported by the rods 145 and 146. There is a hanger 148 associated with each of the amount differential units.

The lever 140, which is near the right-hand side of the machine, carries rollers 149 and 150 cooperating with plate cams 151 and 152, respectively, which are secured together and fastened on the main drive shaft 106.

Secured to the lever 141 are rollers 153 and 154 cooperating with plate cams 155 and 156, which are secured together and also fastened to the main cam shaft 106. These cams 155 and 156 and the lever 141 are located adjacent the left-hand side of the machine.

The rod 142 fits loosely in the levers 140 and 141 to permit the ends of the rod 142 to be moved in slightly different timing. The right end of the rod 142 starts to move downwardly (Fig. 15) at about 10 degrees ahead of the left end thereof. To obtain this result, the section of the cams 151—152 and 155—156, which are effective to lower the respective ends of rod 142, are alike except that they are displaced on the shaft 106 a distance equal to 10 degrees of movement of the shaft 106. Therefore, during the initial, or downward, movement of the shaft 142, the right-hand end thereof starts to move 10 degrees ahead of the left-hand end, and it also reaches its lowermost position 10 degrees ahead of the left-hand end thereof. After both ends of the shaft 142 have reached their lowermost positions, in which the shaft 142 is again in a horizontal position, they are so held by dwells in said cams.

During the return movement upwardly of the rod 142, both ends thereof start at the same time, but the effective sections of the cams 151—152 and 155—156 are so developed that the lever 140 moves faster than the lever 141. To obtain this result, the effective sections of cams 151—152 and 155—156 are such that the former completes the upward movement of lever 140 10 degrees ahead of the movement of lever 141 by cams 155—156. At the end of the return movement of rod 142, it is again in horizontal position, as shown.

The purpose of the loose fit of the rod 142 in the levers 140 and 141 is to allow for this non-parallel movement of the levers 140 and 141. In other words, the right-hand end of the rod 142, which is the end near the cams 151 and 152, is lowered slightly ahead of that end of the rod which is near the cams 155 and 156. About the middle of the operation, the rod 142 again becomes parallel with the shaft 106, and finally, on the return movement upwardly to normal position, that end of the rod 142 adjacent the cams 151 and 152 starts upwardly simultaneously with the other end of the rod and returns home slightly ahead. However, when the cams are back in their home positions, the rod 142 is again in horizontal position, as shown in Figs. 15 and 18.

Connected to each driver 121 (Fig. 18) is a link 157 pivoted to the upper end of a lever 158, which is pivoted on a stud 147. The lower ends of these levers surround the rod 142.

From the above description, it will be clear that the rocking clockwise of the frame consisting of levers 140 and 141 and the rod 142, through the connections of levers 158 to the rod 142, draws the links 157 to the right, thus rocking the drivers clockwise in the manner previously mentioned to drive the differentials through the latch mechanism.

As the cams 151, 152, 155, and 156 return to normal positions, the frame consisting of levers 140 and 141 and rod 142 is rocked counter-clockwise, thus restoring the drivers 121 to their normal positions.

There is a lever 158 connected to each of the drivers 121, and, as these levers are connected at various distances along the rod 142, the leading motion of one end of the rod ahead of the other end of the rod as it is moved downwardly causes the drivers 121 to be successively operated—that is, one to start slightly ahead of the other—so that, in case the latches of all the differential banks have been stopped at the same position, the disconnecting of the drivers from the latches would not occur at exactly the same time, thus relieving the load upon the drive shaft and the motor of the machine.

Since the return of the rod 142 to its normal position is occasioned by one end of the rod leading the other end, the drivers are restored to their normal positions in succession.

Moreover, as these drivers restore the differentially positioned actuators by means to be hereinafter described, said actuators will be restored to normal position in successive order, thus again relieving the load on the shaft and allowing time for transfer operations from lower to higher denominational order to take place in the totalizers.

To restore the latch arms 123 and their actuators 111 to normal positions, each of the drivers 121 carries a stud 159 adapted to contact a shoulder 160 of the arm 123. Therefore, as the cams 151, 152, 155, and 156 raise the rod 142, the levers 158, through the links 157, rock the drivers counter-clockwise to normal positions, whereupon the studs 159 contact the shoulders 160 and rock the arms 123 and the differential actuators 111 to normal positions.

It might be well to state at this point that during adding operations, as the actuators 111 are rocked clockwise differentially, the totalizer wheels 114, 115, and 117 are held disengaged from the racks 112 of the actuators, but, after the actuators have received their differential settings, the selected set of these wheels is moved into engagement with racks 112, and therefore, upon the counter-clockwise restoration of said racks, the amounts corresponding to the differential setting of the actuators are added into the selected set of totalizer wheels. After the actuators reach their home positions, the totalizer wheels are disengaged from the racks 112. The mechanism for controlling the engaging and disengaging of the wheels with and from the racks 112 will be hereinafter described.

Amount indicating mechanism

The indicating mechanism herein illustrated is of the so-called "pentagon" type, similar to that disclosed in the before mentioned Werner patent, and includes two groups of rotatable, multiple-faced indicators 169 (Figs. 37, 38, and 39), one group for indicating to the front of the machine and the other group for indicating to the rear. Each group of indicators is so arranged with relation to the other group that, upon simultaneous operation of both groups, the reading of the digits of an amount standing on the indicators will be from left to right as viewed either from the front or from the rear of the machine.

Each indicator 169 consists of a tube-like shell composed of an upper portion and a lower portion, each portion thereof bearing half of the ten digits of the decimal order. In the form shown, the odd digits are placed on the lower portion of the indicator 169, while the even digits appear on the upper portion. The digits on the lower portion are displaced relatively to the digits on the upper portion, so that very little movement is required when rotating the indicator from one position to another.

Inasmuch as each indicator 169 has two portions, it is necessary to arrange not only to rotate each indicator to bring the proper characters into a plane parallel with the sight openings in the machine, but to shift each indicator axially to bring the characters on the lower portion thereof, for example, into visible position at the sight openings. To this end, each indicator 169 is mounted to shift axially along a rotatable shaft 170. Mechanism is preferably constructed to lift and rotate the indicators simultaneously. Thus, by the time the indicator is rotated to the proper position, it is shifted axially into position to expose an amount on the lower portion thereof, when such a character is selected by the rotary movement of the shaft 170 under control of the keys on the keyboard.

For differentially adjusting the indicators, there is provided a plurality of beams 171 (Fig. 37) pivoted at their forward ends to their respective latch carrying arms 123. The rearward end of each of the beams is pivoted to the lower end of one of a plurality of links 172. The upper end of each link 172 is pivoted to one of a plurality of ring gears 173 (Figs. 34 and 37), each of which is rotatably mounted on an individual stationary disk 174, which acts as a bearing for such gear. These disks 174 are supported on a rod 175 carried by the side frames 79 and 80 (Fig. 34). When the forward ends of the beams 171 are moved clockwise with the latch carrying arms 123, rolls 176 (Fig. 18) on the levers 158 contact the lower edge of the beams 171, intermediate their ends, to move the latter upwardly against collars 177 on the shaft 116. Thus, when the forward ends of the beams 171 are arrested by reason of the projections 130 striking the ends of depressed amount keys 61, the rearward ends of such beams are adjusted by the rolls 176 to positions corresponding to the values of the keys depressed. The beams 171 will, through the links 172, the gears 173, and an external-internal gear mechanism of the type disclosed in the previously mentioned Kreider patent, impart a like adjustment to the indicators. This external-internal gear mechanism will now be briefly described.

Associated with each of the gears 173 (Fig. 34) is a pair of external-internal gears 178, one for adjusting the front indicator and the other for adjusting the corresponding rear indicator representing the denominational order of its appropriate bank of amount keys 61. The gears 178 are located at variable distances from, and in parallel relation with, their respective gears 173 in order to effect the simultaneous adjustment of both front and rear indicators, so that, when the amount standing thereon is viewed, the digits can be properly read from left to right as viewed from either the front or the rear of the machine.

When one of the gears 173 is differentially adjusted under control of its appropriate denominational bank of amount keys 61, as heretofore described, internal teeth thereon coact with a pinion 179 (Fig. 34) secured on a square shaft 180, both pinion and shaft being freely mounted in the disks 174 (Fig. 37), to impart a like adjustment to said pinion and shaft. Also secured on the shaft 180 is a pair of pinions 181 which mesh with the internal teeth of the pair of gears 178 associated with the gear 173 receiving the differential adjustment. Thus it will be seen that the differential movement imparted to the gear 173 is transmitted, by means of the pinion 179, the shaft 180, and the pinions 181, to its associated pair of gears 178. The gears 178, in turn, operating through a pair of intermediate gears 182 (Fig. 37), actuate each one of a pair of helical gears 183 secured to the lower ends of the shafts 170 carrying the front and rear indicators to simultaneously adjust said shafts 170 and the associated indicators for displaying an amount corresponding to the value of the amount key 61 depressed in the associated bank.

As previously mentioned, the indicators are lifted during each operation of the machine for the purpose of exposing, when necessary, the lower portions thereof to view. The means for accomplishing this result includes an indicator lifting frame (Fig. 37) comprising two end plates 196 (only one of which is shown), each connected to the other by two angularly shaped members 197 secured to the front and rear sides of the plates 196. The members 197 are provided with a plurality of notches through which project the shafts 170. The plates 196 carry, near their upper ends, guide rollers 198 which operate in vertical slots 199 in each of a pair of side plates 200. Each of a pair of studs 201, each carried by one of the plates 196, is embraced by the bifurcated end of one of a pair of levers 202 secured to a shaft 203 journaled in the side frames of the machine. Also secured to the shaft 203 (Fig. 40) is an arm 204 which is connected by a link 205 to the rear end of a lever 206 freely mounted on a rod 211 secured in the machine side frames. The forward end of the lever 206 carries a pair of rollers 207 and 208 coacting with a pair of cams 209 and 210, respectively, secured to the main drive shaft 106. Thus, upon operation of the main drive shaft 106, the cams 209 and 210 will, through the rollers 207 and 208, the lever 206, the link 205, and the arm 204, rotate the shaft 203 and the levers 202 first in a clockwise direction and then in a counter-clockwise direction. Clockwise movement of the levers 202 raises the indicator frame, together with the indicators 169, to a position in which only the lower portions of the indicators are exposed to view, while counter-clockwise movement of the levers 202 acts to lower the indicator frame, permitting the indicators 169 to move therewith to expose the upper portions of the indicators to view, provided that the indicators are not retained in their upper positions.

The means for retaining the indicators 169 in their raised positions for the purpose of exposing the lower portions thereof to view includes a slide 224 (Fig. 37) mounted for lateral movement on a top frame 225 carried by the indicator side plates 200. The slide 224 is normally held in its furthermost position to the right by a spring similar to the spring 275 shown in Fig. 10 of the before mentioned Werner patent. The slide 224 has arms 226, one for each indicator 169, each having its lower end bent at right angles to form a laterally projecting finger.

The upper portion of each indicator 169 has five hooks 227 adapted to engage the fingers on the arms 226. To retain the indicator in its raised position, the hooks 227 are so positioned on each indicator 169 that engagement of an arm 226 with one of its associated hooks 227 can occur only when one of the faces on the lower portion of that particular indicator 169 is so adjusted that, upon the indicator's being lifted vertically, the amount thereon will be exposed to view. Upon operation of the machine, the slide 224 is first moved toward the left, as viewed from the front of the machine, against the action of the before mentioned spring, to disengage the arms 226 from the hooks 227 to permit any indicators which have been retained in their raised positions from a previous operation to move downwardly to their normal positions. After this occurs, the indicators receive their rotatable adjustment as well as their vertical movement, as previously described, whereupon the slide 224 is moved back to the right, so that the arms 226 can engage the hooks 227 of any indicators which have been rotatably adjusted for displaying the amounts on the lower portions thereof, thus retaining said indicators in their raised positions to expose the lower portions thereof to view.

The means for moving the slide 224 first to the left and then to the right, in the manner above referred to, will now be described. Secured to the under side of the slide 224 is a bracket 228 provided with a bifurcation engaging a stud 229 mounted in one arm of a bell crank 230 pivotally mounted on a stud carried by a frame supported bracket. The other arm of the bell crank 230 is connected by a link 231 to an arm 232 secured to a shaft 233 journaled in the machine side frames 79 and 80. Also secured to the shaft 233 is an arm 234 similar to the arm 204 (Fig. 40) previously mentioned in connection with the means for raising and lowering the indicator lifting frame heretofore described.

The arm 234 and the shaft 233, like the arm 204 and the shaft 203, receive first a clockwise movement and then a counter-clockwise movement during each operation of the machine. When the arm 234 is rocked in the manner just described, it will, through the shaft 233, the arm 232, and the link 231, rock the bell crank 230 first counter-clockwise and then clockwise. The bell crank 230, through the stud 229 and the bracket 228, will in turn shift the slide 224 first to the left and then to the right in the manner heretofore described.

The means employed for imparting first a clockwise movement and then a counter-clockwise movement to the arm 234 is identically like, and operates in the same manner as, that shown in Fig. 40 for imparting similar movements to the arm 204. It is therefore thought that the train of mechanism shown in Fig. 40, together with the description of the operation thereof, will provide a thorough understanding of the mechanism, and its operation, contemplated for use in actuating the arm 234 in the above manner, without the necessity of showing or describing the same herein.

The transaction indicators are of the same type as those illustrated and described in the aforesaid Werner patent, and, since they form no part of the present invention, they are neither shown nor described herein.

Totalizers

The machine herein illustrated has six totalizers (Figs. 18, 21, and 22)—two totalizers 114 and 117 on the upper line and four totalizers 115 on the lower line. The two totalizers on the upper line (Fig. 21) are associated with the "multiple-item" key 64, the "single-item" key 65, and the "total" key 67, while the four totalizers on the lower line (Fig. 22) are associated with the four clerks' keys "A," "B," "D," and "E" 63.

Each totalizer on the upper line (Fig. 21) comprises a plurality of totalizer pinions 114 or 117 interspersed on a tube 241 mounted at its opposite ends in arms 242 and 243 journaled upon a shaft 244 and shiftable laterally thereon. The ends of the shaft 244 enter guide slots 245 (Figs. 24, 25, and 31) formed in cam plates 246 and 247 secured to the inner faces of the side frames 79 and 80, respectively. The right-hand totalizer pinion 114 of each denominational order represents the "item" totalizer associated with the "multiple-item" key 64, while the left-hand totalizer pinion 117 of each denominational order represents the "group" totalizer associated with the "single-item" key 65 and the "total" key 67.

When registering a multiple-item transaction, it is necessary to depress the "multiple-item" key 64, which controls means for positioning the upper totalizer line so that the "item" totalizer 114 is positioned to be engaged by the amount actuators 111 during each of the machine operations necessary to record all of the items included in that particular transaction. To ascertain the total amount of such multiple-item transaction, the "total" key 67 is depressed, which controls means for causing the upper totalizer line, after the total has been removed from the "item" totalizer and placed on the amount actuators 111, to be shifted toward the right. This positions the "group" totalizer 117 so that the latter is engaged with the actuators 111, during their return to home positions, to thereby add into the "group" totalizer the amount removed from the "item" totalizer. Such total amount is also shown on the indicators. Furthermore, the function of removing the amount from one totalizer, resetting that totalizer to zero, and transferring such amount to another totalizer on the same line is all accomplished during a single cycle of operation, without moving the lock control lever 66.

When single-item transactions are registered, the "single-item" key 65 is depressed. This controls means for positioning the upper totalizer line so that the "group" totalizer wheels 117 are positioned to be engaged by the amount actuators 111, thus adding such amount directly upon the "group" totalizer.

Also, the illustrated machine is so arranged that, upon entering into the machine either a single-item transaction or a multiple-item transaction, the amount of each individual item is added directly upon the proper clerk's totalizer at the same time that it is added upon either the "group" totalizer or the "item" totalizer.

The totalizer pinions for both the upper line and the lower line are arranged in frames which are adapted to be shifted laterally to select the totalizers for engagement with the amount actuators 111. Associated with the upper totalizer line are arms 248 and 249 (Figs. 21, 24, 25, and 31) fast on opposite ends of the shaft 244 and carrying rolls 250 coacting with cam slots 251 in the cam plates 246 and 247. It is obvious from the foregoing that rocking of the cam arms 248 and 249 and the shaft 244 will cause the rolls 250 to follow the contour of the cam slots 251 to engage the totalizers with and disengage them from the racks 112 of the actuators 111. The free end of the arm 243 (Fig. 21) is bifurcated to embrace a lug 252 secured to the adjacent hanger 148 to prevent the arms 242 and 243 from turning on the shaft 244.

A rod 253 (Fig. 21) connects the tails of the arms 242 and 243, and, with the arms 242 and 243 and the tube 241, forms a frame slidable axially on the shaft 244 for the purpose of bringing the desired set of pinions 114 or 117 into operative relation with the racks 112 on the actuators 111, as is old and well known in the art.

Each totalizer on the lower line (Fig. 22) comprises a plurality of totalizer pinions 115 interspersed on a tube 261 mounted in arms 262 and 263 journaled upon a shaft 264 and laterally shiftable thereon. The ends of the shaft 264, like the shaft 244 associated with the upper totalizer line, enter guide slots 265 (Figs. 24, 25, and 31) in cam plates 266 and 267 secured to the inner faces of the side frames 79 and 80, respectively.

The totalizer pinions 115 of each denominational group, running from right to left, represent the "A," "B," "D," and "E" totalizers, respectively, associated with the clerk's keys bearing corresponding indicia.

The lower totalizer line is moved into engagement with the amount actuators 111 during each of the operations necessary to record each of the items comprised in a multiple-item transaction. However, upon the taking of the total of such multiple-item transaction by resetting the "item" totalizer to zero and transferring such amount to the "group" totalizer, as heretofore described, the clerk's totalizers, for obvious reasons, are prevented from being engaged with the amount actuators 111. When a single-item transaction is registered upon the "group" totalizer, as previously described, the clerks' totalizer line is also moved into engagement with the amount actuators 111. The means for controlling the engagement of the lower totalizer line with the amount actuators will be described hereinafter.

Arms 275 and 276 (Figs. 22, 24, 25, and 31) are fast on opposite ends of the shaft 264 and carry rolls 277 adapted to travel in cam slots 278 in the cam plates 266 and 267. It is apparent from the foregoing that rocking of the cam arms 275 and 276 and the shaft 264 will cause the rolls 277 to follow the cam slots 278 to engage the totalizers with and disengage them from the racks 112 of the actuators 111.

A rod 280 (Fig. 22) connects the tails of the arms 262 and 263, and, with the arms 262 and 263 and the tube 261, forms a frame slidable axially on the shaft 264 for the purpose of bringing any desired set of pinions 115 into operative relation with the racks 112 on the actuators 111, as is old and well known in the art.

*Tens transfer mechanism*

Figure 19:
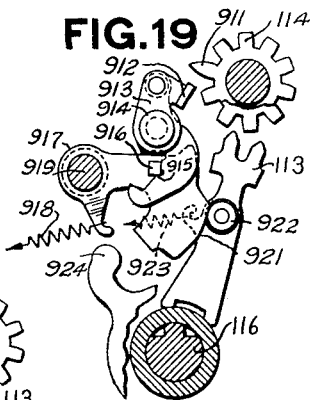
Fig. 19 is a detail side view of the means by which the totalizer wheels control the adjustment of the amount differential actuator during totalizer reading or resetting operations.
Figure 20:
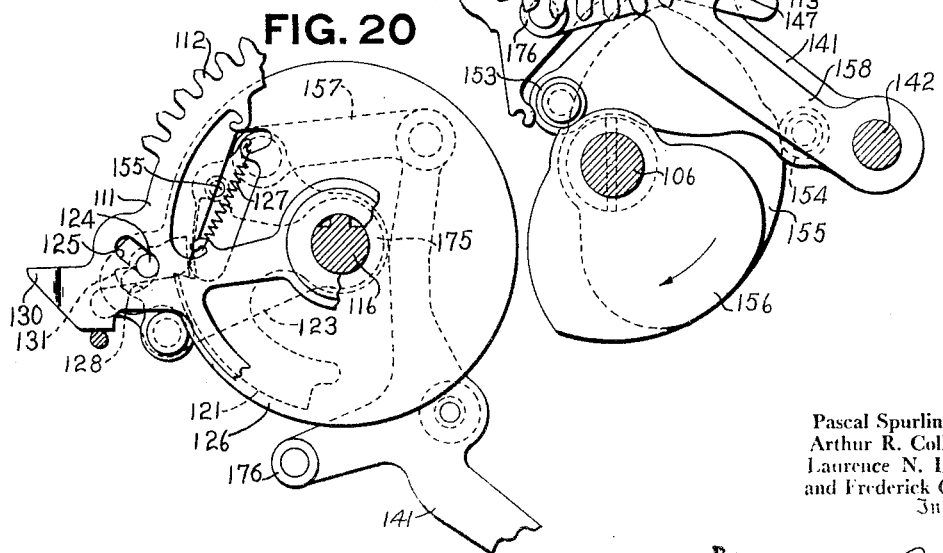
Fig. 20 is a detail side view of the latch operating mechanism associated with an amount differential actuator.

The mechanism for transferring 1 to a higher order totalizer wheel from the next lower order totalizer wheel as the latter passes from 9 to 0 is shown in Fig. 19. This figure is illustrated as applied to one order of the upper totalizer line, and a similar mechanism is provided for the lower totalizer line, as is well known in the art.

When the totalizer wheel 114 of a lower order passes from 9 to 0, a long tooth 911 engages a flange 912 on a latch 913 and rocks the latch 913 counter-clockwise (Fig. 19) around its pivot stud 914, the stud 914 being mounted on hanger 148 (Fig. 18). Counter-clockwise movement of the latch 913 withdraws a shoulder 915 of the latch from beneath a square stud 916 mounted on a spring-urged cam arm 917, to thereby permit the spring 918 to rock the cam arm 917 clockwise about its pivot 919. Such clockwise movement of the cam arm 917 withdraws a cam surface 921 from engagement with a roller 922 on the transfer carrying arm 113 to permit a spring 923 to rock the arm 113 counter-clockwise (Figs. 18 and 19) one step, which closes the gap between the rack 112 and the arm 113, in the same manner and for the same purpose as well known and disclosed in the above-named Shipley Patent No. 1,619,796, to enter 1 in the next higher totalizer element.

At the beginning of the next machine operation, whether it be an add, sub-total, or reset operation, a reset spider 924 is rocked clockwise to engage and rock the cam arm 917 back to its original position to latch the square stud 916 behind the shoulder 915 of the latch 913. During this return movement of the cam arm 917, the cam 921, acting on the roller 822, restores the carrying arm 113 back to its original position as shown in Figs. 18 and 19. Immediately after the arm 113 is latched in its normal position, the shaft 116 is returned to its normal position.

The reset spider 924 is provided with a notched bore which fits over a projection 925 on the shaft 116. The shaft 116 is rocked first clockwise and then counter-clockwise during each machine cycle. The clockwise movement of the shaft 116 rocks the spider 924 clockwise to restore the tripped transfer arm 113 at the beginning of the machine operation in the manner described above. The timing of the restoring movement of the transfer arms is such that they are restored prior to the engagement of the totalizer wheels 114 with the actuators 111 during any type of operation; i. e., add, sub-total, reset, or transfer total operations.

Transaction keys

The transaction keys 62 (Figs. 15 and 17) bear the following indicia: "Cash," "Cash tax," "Charge," "Charge tax," "Received on account," "Paid out," "Sub-total," "Group total," and "No sale," each of which represents the particular kind of operation in connection with which its respective key is used, as will be described more in detail hereinafter. The keys 62 are carried in a frame 281 removably supported on the rods 77 and 78. Pivotally mounted adjacent the left side of the frame 281 is a locking detent 282 (Fig. 17) for retaining the keys 62 in their depressed positions, and a control bar 283 for moving a zero stop pawl 284 out of its normal effective position in substantially the same manner as is done with respect to each of the banks of amount keys 61 previously described.

The locking detent 282 is supported at its upper end by a bell crank 285 (Fig. 45) and at its lower end by an arm (not shown), both said bell crank and said arm being pivotally mounted on the frame 281. When one of the transaction keys 62 is depressed, a pin 286 thereon coacts with the cam portion of a hook 287 on detent 282 to cam the latter downwardly against the action of a spring 272 (Fig. 17) until the pin clears the hook 287, after which said spring moves the detent upwardly in an old and well-known manner to lock the hook 287 over the pin 286 to retain the key in its depressed position.

Near the end of the operation of the machine, the detent 282 is again moved downwardly, by mechanism to be hereinafter described, sufficiently to disengage the hook 287 from the pin 286, thus permitting the key to be moved outwardly to its undepressed position by the usual coil spring (not shown).

The control bar 283 is pivotally mounted at its upper end on the left-hand arm of a yoke 273 (Fig. 46) freely mounted on a rod 274 suitably mounted in the frame 281. The bar 283 is pivotally mounted at its lower end to an arm 288 carried by the frame 281. When the machine is operated with no transaction key 62 depressed, the stop pawl 284 serves to arrest the movement of a differentially movable actuator, to be later described, in an ineffective position. When a transaction key 62 is depressed, its pin 286, through the associated inclined projection on the control bar 283, cams the latter downwardly against the action of a torsion spring 290 (Fig. 46). Such movement of the bar 283 rocks the arm 288 in a counter-clockwise direction (Fig. 17) causing the forward edge of the latter to coact with a pin 291 on the stop pawl 284 to rock said pawl slightly clockwise (Fig. 17) against the action of a spring 292. This permits the differentially movable actuator to be moved clockwise (Fig. 15) until arrested by the depressed key, as will be later described.

Transaction keys—differential mechanism

Associated with, and differentially adjustable under control of, the transaction keys 62 (Fig. 15) is a differential mechanism which serves to adjust a totalizer selecting disk (Fig. 4) as well as indicating mechanism.

This differential mechanism includes a differential arm 301 loosely mounted on the shaft 116. The "sub-total" and "group total" keys 62 control the setting of total taking mechanism for accomplishing either sub-total or grand total taking operations, as will be hereinafter described.

Pivotally mounted on the arm 301 is a latch 302, which normally engages a shoulder 303 on a driver 304 to establish driving connections between the latter and the arm 301. The driver 304 receives an invariable excursion of movement during each cycle of operation of the machine and, through the engagement of the latch 302 with the shoulder 303, carries the arm 301 with it during its clockwise movement. Means is provided, under control of the transaction keys 62, for disengaging the latch 302 from the shoulder 303 to arrest the clockwise movement of the arm 301 in a position corresponding to the key depressed. This means includes a stud 305 carried by the latch 302 and projecting through diagonal slots 306 and 307 formed at right angles to each other in a balance plate 308 and a stop arm 309, respectively, both of the latter being loosely mounted on the shaft 116. The plate 308 and the stop arm 309 are connected together by a spring 310 and serve to prevent premature disengagement of the latch 302 from the driver 304. The plat 308 and the stop arm 309 move in unison with the differential arm 301 during the latter's clockwise movement until a finger 311 on the arm 309 strikes the lower end of a depressed key 62 and is stopped thereby. When this occurs, the slots 306 and 307, acting on the stud 305, will disengage the latch 302 from the driver 304, and the arm 301 will stop in a position corresponding to the key depressed, while the driver continues its clockwise movement to the full extent. Upon the return counter-clockwise movement of the driver 304 to its home position, a stud 312 on the driver 304 comes into contact with a shoulder 313 of the arm 301 and returns the latter to normal position.

The means for imparting an invariable excursion of movement to the driver 304 includes a lever 321 (Fig. 15) pivoted on the stud 143 on the hanger 144. The lever 321 is connected at its lower end to the rod 142 and at its upper end to a link 323 pivoted to the driver 304. Thus, when the rod 142 is moved in the manner described in connection with the differential mechanism associated with the amount keys, the driver 304 will, through the connections just mentioned, be given an invariable excursion of movement, first in a clockwise direction and then in a counter-clockwise direction to normal position.

When the differential arm 301 is moved clockwise, the forward end of a beam 324 pivoted thereto will be moved a like extent. The rear end of the beam 324 is connected by a link 325 to an internal gear 326, through which the totalizer selecting plate and the indicating mechanism are adjusted, as will be described later. After the forward end of the beam 324 has been positioned by the arm 301 under control of the transaction keys 62, a roller 327 on the lever 321 will coact with the under side of the beam 324 to move the latter upwardly and, through the link 325, adjust the gear 326 according to the extent of movement received by the arm 301. The gear 326, through the external-internal gear mechanism to be described hereinafter, will impart a corresponding adjustment to the totalizer selecting plate and the indicator mechanism.

Clerks' keys

The clerks' keys 63 (Figs. 1 and 12) are employed herein to control the selection of the proper clerk's totalizer for engagement with the differential actuators 111 associated with the banks of amount keys, as well as to control the adjustment of the indicating mechanism to indicate characters representing the different clerks.

The bank of clerks' keys 63 includes four keys bearing clerks' identification letters A, B, D, and E. The keys 63 are slidably mounted in a frame 331 mounted on the rods 77 and 78, and each key is normally maintained in its outer undepressed position by the usual coil spring 332. Pivotally mounted adjacent the left side of the frame 331 is a locking detent 333 for retaining the keys 63 in their depressed positions, and a control bar 334 for moving a stop pawl 335 out of its normal effective position in substantially the same manner as is done with respect to the bank of transaction keys 62, previously described.

The locking detent 333 is supported at its upper end by a bell crank 336 and at its lower end by an arm 337, both the bell crank and the arm being pivotally mounted on the frame 331. When one of the keys 63 is depressed, a pin 338 thereon coacts with the cam portion of one of a series of hooks 339 on the detent 333 to cam the latter downwardly against the action of a spring 540 until the pin 338 clears the hook 339, when the detent 333 will be moved upwardly by the spring 340 to lock the hook 339 over the pin 338 to retain the key in its depressed position.

Near the end of the operation of the machine, the detent 333 is again moved downwardly by mechanism hereinafter described, sufficiently to disengage the hook 339 from the pin 338, thus permitting the key to be moved outwardly to its undepressed position by the coil spring 332.

The control bar 334 is pivoted at its upper end to one arm of a yoke 345 (Fig. 48) and at its lower end to an arm 346, both the yoke and the arm being pivoted on the frame 331. When the machine is operated with no clerk's key 63 depressed, the stop pawl 335, which is pivotally mounted on the frame 331, serves to arrest the movement of a differential arm 347, to be later described, in an ineffective position. On the other hand, when a clerk's key 63 is depressed, the pin 338 thereon coacts with one of a series of inclined projections formed integral with the control bar 334 to cam the latter downwardly against the action of a spring (not shown). Such movement of the bar 334 rocks the arm 346 clockwise, causing the forward edge thereof to coact with a pin 348 on the stop pawl 335 to rock the latter counter-clockwise out of its effective position against the action of a spring 349. This permits the differential ram 347 to be moved clockwise until arrested by the end of a depressed key 63, as will be later described.

Clerks' keys—differential mechanism

The construction and operation of the differential mechanism associated with the bank of clerks' keys 63 are substantially like the construction and operation illustrated and described in connection with the bank of transaction keys 62 and will, therefore, be described only briefly herein.

Such differential mechanism includes the differential arm 347 (Fig. 12) having pivotally mounted thereon a latch 356 normally held in engagement with a shoulder 357 on a driver 358, which receives a constant excursion of movement, first clockwise and then counter-clockwise to normal position, during each cycle of operation of the machine. The driver 358 is connected by a link 359 to a lever 360 pivoted on a stud 350 on a hanger 361, and is mounted at its lower end on the rod 142. Movement of the rod 142 in the manner previously described will, through the lever 360 and the link 359, impart to the driver 358 the constant excursion of movement above referred to.

The means for normally holding the latch 356 in engagement with the shoulder 357 on the driver 358 includes a stop arm 362 and a balance plate 363, both loosely mounted on the shaft 116 and connected together by a spring 364. The latch 356 carries a pin 365, which projects through slots 366 and 367 formed at right angles to one another in the arm 362 and the plate 363, respectively.

When the driver 358 receives its clockwise movement, the latch 356 moves the differential arm 347, the arm 362, and the plate 363 clockwise until a finger 368 on the stop arm 362 strikes the lower end of a depressed key 63, whereupon the clockwise movement of the arm 362 is arrested, and the continued movement of the driver 358 disengages the latch 356 from the driver 358 in the usual manner, and the forward end of the latch 356 enters the appropriate one of a series of notches 369 in a stationary bar 370. Engagement of the forward end of the latch 356 with the notch 369 locks the latch and the arm 347 in a position corresponding to the depressed key 63, and the driver 358, as it completes its excursion in a clockwise direction, brings its outer periphery against the foot of the latch 356 to maintain the forward end of the latter in such locked position through its engagement with a notch in the bar 370.

Upon the return counter-clockwise movement of the driver 358 to its home position, a stud 371 thereon coacts with a surface 372 on the arm 347 to return the latter, together with the arm 362 and the plate 363, to their home positions.

For controlling the selection of the proper clerks' totalizer for engagement with the differentially movable actuators 111 associated with the banks of amount keys 61, there is provided a beam 373 which is pivoted at its forward end to the differential arm 347, the rear end of said beam being pivoted to the lower end of a link 374 connected to a gear 375. The arm 347, in combination with a roller 376 on the lever 360, adjusts the beam 373 and the gear 375 according to whichever one of the clerks' keys 63 has been depressed. The gear 375 in turn, through an external-internal gear mechanism to be hereinafter described, serves to adjust the means for controlling the engagement of the proper clerks' totalizer with the amount actuators 111, as well as adjust suitable indicating mechanism.

Multiple-item key and single-item key

The multiple-item key 64 and the single-item key 65 (Figs. 1 and 10) control the adjustment of mechanism for differentially setting a totalizer selecting plate (Fig. 3), which determines whether an item totalizer or a group totalizer in the same row will be shifted to a position where it can be engaged with the amount differential actuators 111 (Fig. 18).

The bank of "multiple-item" and "single-item" keys 64 and 65 is substantially like any one of the banks of amount keys 61 (Fig. 18) in so far as having associated therewith a detent, a control bar, and a zero stop pawl 1356 which function in the same manner as the detent 82, the control bar 97, and the zero stop pawl 95 associated with each bank of amount keys. It will be remembered that the detent serves to retain the keys in their depressed positions while the control bar moves the zero stop pawl out of the path of the differential mechanism, thereby permitting the latter to move clockwise until arrested by the end of a depressed key.

*Multiple-item and single-item keys—Differential mechanism*

Associated with and differentially adjustable under control of the "multiple-item" and the "single-item" keys 64 and 65, respectively, is a differential mechanism (Fig. 10) which serves to variably adjust a totalizer selecting plate (Fig. 3) which determines whether the item totalizer or the group totalizer will be engaged with the amount differential actuators 111. This differential mechanism and the means for actuating the same are identical with that shown and described in connection with the transaction keys 62, and therefore only a brief description thereof is thought necessary.

The differential mechanism for the "multiple-item" and the "single-item" keys 64 and 65 includes a driver 1376, a latch 377, a latch arm 378, a stop arm 379, and a balance plate 380, all pivoted on the shaft 116. The balance plate 380 and the stop arm 379 are connected by the usual spring 381.

The driver 1376 is operated by a link 382 connected to a lever 383 pivoted on the stud 384 of a hanger 385. The lever 383 carries rollers 386 and 387 driven by plate cams 388 and 389 fast to drive shaft 106. A roller 390 on the lever 383 cooperates with a beam 391 in a manner hereinbefore described. The beam 391 is connected by a link 392 to a gear 393 of the internal-external gear mechanism to differentially adjust the totalizer selecting plate (Fig. 3) in a manner to be hereinafter described.

*Unit lock control lever*

The unit lock control lever 66 (Figs. 9 and 11) has six different positions of adjustment; namely, reading from the top down, "Reset," "Read," "Proprietor," "Receipt off," "Receipt on," and "Register lock" positions. As previously mentioned herein, machines of the type to which the present invention is shown applied generally require a single cycle of operation to perform an adding operation and a double cycle of operation to perform either a totalizer reset to zero operation (total taking operation) or a totalizer read operation (sub-total operation). In this connection, the control lever 66, when moved to any one of its different positions of adjustment, actuates mechanism for conditioning the machine for performing either a single cycle of operation or a double cycle of operation. For example, when the lever is moved to either its "reset" position or its "read" position, the result will be that the machine is conditioned for a double-cycle operation, while, on the other hand, if the lever is moved to any one of its other positions (excepting the "register lock" position, whereby the machine is rendered inoperative), the machine will be conditioned for a single-cycle operation.

In addition, the unit lock control lever 66 controls the adjustment of a totalizer selecting disk (Fig. 2), which, in combination with the selecting disks associated with the bank of "multiple-item" and "single-item" keys 64 and 65 and the bank of transaction keys 62, determines which totalizer or totalizers will be engaged with the amount actuators for the purpose of either adding or total-taking.

Another function of the control lever 66 is that, when it is moved to either its "reset" position or its "read" position, it will adjust mechanism for causing the zero stop pawls for the amount banks to be rocked out of their normal effective positions to prevent their interfering with the clockwise movement of the differential actuators associated therewith during such total or sub-total recording operations, as will be more fully described hereinafter.

*Operating means and cycle control mechanism*

The machine may be motor driven through a clutch mechanism of the type illustrated and described in the above mentioned Shipley Patent No. 1,619,796, or it may also be operated manually by a crank. Machines of this type are normally locked against idle operation by locking mechanism such as that also fully disclosed in said Shipley patent. The locking mechanism is readily released to permit operation of the machine by rocking the usual release shaft 394 (Fig. 9), which controls the before mentioned clutch mechanism and also completes a circuit through the motor. The manner in which the clutch mechanism is controlled to cause the machine to perform either a single cycle or a double cycle of operation is old and well known in the art. Means is provided, under the control of certain control keys, to prevent releasing movement of the shaft 394 until one of said keys is depressed, as will be hereinafter described.

Associated with the above mentioned clutch mechanism and release shaft 394 is the usual gear 395, freely mounted on a stud 396 in the right side frame 80 and meshing with a smaller gear 397 secured to the main drive shaft 106. When the machine is hand or crank operated, as shown in said Shipley patent, the handle gear (not shown) is meshed with the gear 395 to drive the latter. The ratio of the two gears 395 and 397 is such that one-half of one complete counter-clockwise rotation of the drive gear 395 will impart one complete clockwise rotation (single cycle of operation) to the gear 397 and the main drive shaft 106, while one complete counter-clockwise rotation of the gear 395 will give two complete clockwise rotations (double cycle of operation) to the gear 397 and the main drive shaft 106. The means for controlling the extent of counter-clockwise movement imparted to the gear 395 will now be described.

The unit lock control lever 66 has formed integral therewith a plate 398 (Fig. 9) pivoted on the stud 396. Also pivoted on the stud 396 is a two-armed lever 399, the lower arm of which is rigidly connected to the plate 398 while its other arm has pivoted thereto a plate 400 normally held by a spring 401 against a stud 402 carried by the upper arm of the lever 399. Coacting with an irregularly shaped slot 403 in the plate 400 is a roller 404 carried by one arm 405 of a yoke 406 pivoted on a stud 407 mounted in the side frame 80. The arm 405 has pivoted thereto a pitman 408 having a slot 413 to embrace the stud 396. A cam disk 409, also journaled on the stud 396, fits in a recess in the gear 395 and has a cam groove 410, the inner wall of which has a notch 411. The pitman 408 carries a roll 412 which normally rests in the notch 411.

A coupling slide 431 is shiftable along a way 432 (shown in dotted lines) formed diametrically across the back side of the cam disk 409. One end of the coupling slide 431 is narrowed down and has a lip 433 projecting between pins 434 projecting inwardly from the pitman 408. The relation of the cam disk 409 and the gear 395 is such that the narrowed end of the coupling slide 431 lies opposite a notch 435 formed in the outer wall of the central recess in the gear 395 when the machine is at rest.

The gear 395 rotates relatively to the cam disk 409 during single-cycle operations, there being two diametrically opposed notches 435 in the gear 395, so that, at the end of each half rotation of the latter gear, one or the other of such notches lies opposite the narrowed end of the coupling slide 431.

It will be remembered that the unit lock control lever 66 has six different positions of manual adjustment. When moved to any one of its four lowermost or left-hand positions of adjustment, as viewed in Figs. 9 and 11, the lever 66 will, through the rigid connection between the plate 398 and the two-armed lever 399, move the plate 400 so that the roller 404 on the arm 405 will traverse only the upper portion of the slot 403. Since the upper portion of the slot 403 is concentric with the stud 396, any such movement thus given to the plate 400 will have no effect on the arm 405 of the yoke 406 or upon any of the parts associated with the latter. From this, it will be seen that, when the unit lock control lever 66 occupies any one of its four lowermost positions of adjustment, the mechanism described above will remain substantially as viewed in Fig. 9, with the result that any operation of the machine will be a single-cycle operation.

However, if the unit lock control lever 66 is moved to either of its two uppermost or right-hand positions of adjustment preparatory to conditioning the machine for a double-cycle, total taking operation, the plate 400 will be rocked sufficiently in a clockwise direction about the stud 396 to cause the roller 404 to coact with the lower portion of the slot 403 and thereby rock the arm 405 and the yoke 406 in a clockwise direction. This movement of the arm 405 will draw the pitman 408 towards the left, as viewed in Fig. 9, to withdraw the roll 412 from its notch 411 in the cam groove 410. The pitman 408, through the cooperation of the pins 434 with the lip 433, also draws the coupling slide 431 towards the left to insert the narrowed end thereof part way into the notch 435 in the gear 395, thus connecting the gear and the cam disk 409 so that they will rotate in unison.

The before mentioned release shaft 394 is suitably journaled in the machine and is constantly urged to rock in a clockwise direction by a spring 436 compressed between the bottom of a slot 437 formed in a link 438 and a pair of spring clips 439, one on each side of the upper portion of the link 438, both being pivoted on a stud 440 projecting into the slot 437 from an arm 441 fast on the release shaft 394. The link 438 is also provided with an L-shaped slot 442, which coacts with a stud 443 carried by a key release lever 444 fulcrumed on the stud 407. The lever 444 also carries a roller 445, which coacts with a cam groove 446 in the gear 395.

When the shaft 394 is released to the action of the spring 436 to release the machine for operation, the spring 436, pressing against the stud 440, rocks the shaft 394 clockwise to free the machine for operation. When this occurs, the stud 440 will travel towards the upper end of the slot 437 in the link 438. The stud 443 on the lever 444 is normally seated in the substantially horizontal section of the slot 442 to support the link 438 in its normal position against the tendency of the spring 436 to force the link downwardly.

Figure 9:
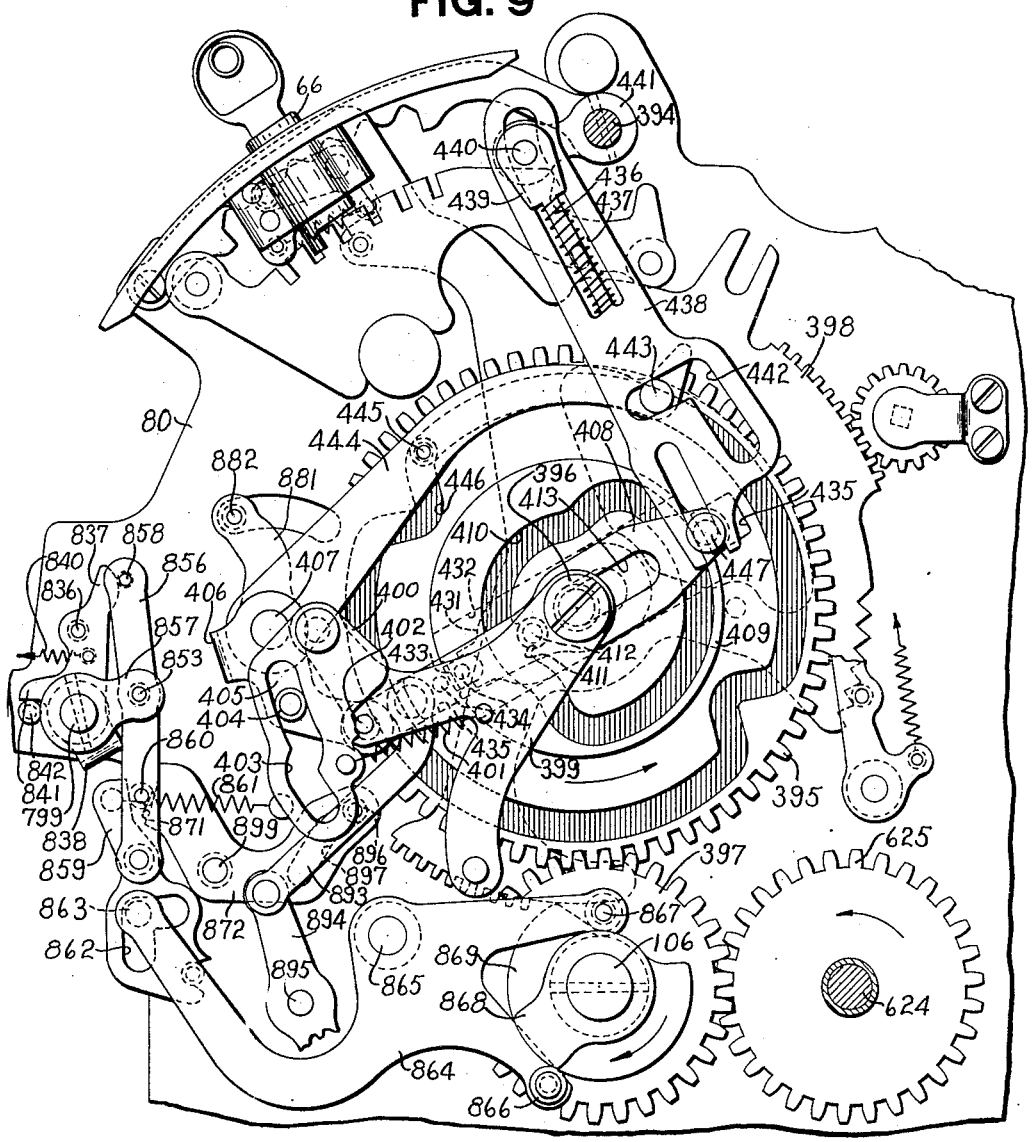
Fig. 9 is a vertical section through a portion of the machine, showing the unit lock lever and the means actuated thereby for adjusting its corresponding totalizer selecting disk, together with the mechanism for conditioning the machine for one-cycle operations and two-cycle operations.

Near the end of a cycle of operation of the machine, mechanism illustrated in Fig. 9 operates to rock the release shaft 394 counter-clockwise, as viewed in the drawings, past its normal position, to release the depressed amount keys and to bring the machine to rest in its home position, the shaft 394 being then turned slightly clockwise by the spring 436 to its normal position, as usual.

The above mentioned result is accomplished by the cam groove 446 in the gear 395 coacting with the roller 445 projecting from the lever 444 to rock the lever first clockwise and then counter-clockwise to normal. The lever 444, upon its clockwise travel, draws the link 438 downwardly to rock the arm 441 and the release shaft 394 counter-clockwise past their normal home positions, the stud 440 having assumed its position at the top of the slot 437 when the machine was released for operation.

After the above has taken place, the cam groove 446 then operates to raise the lever 444 and the link 438, whereupon the spring 436 rocks the arm 441 and the shaft 394 clockwise to normal. The shaft 394 and the arm 441 are prevented from being rocked farther in a clockwise direction at this time by restraining means disclosed in Shipley Patent No. 1,619,796, above mentioned. Therefore, the link 438, on its upward travel and after the shaft 394 and its associated parts reach their normal positions, compresses the spring 436 preparatory to another operation of the machine.

When the unit lock control lever 66 is moved to either "read" or "reset" position, it will, through the above mentioned means and in the manner previously described, draw the pitman 408 towards the left. Then, at the beginning of the machine operation, the cam 410 acting on roller 412 draws the pitman 408 farther to the left. The pitman 408 carries a stud 447 embraced by the bifurcated lower end of the link 438. The said two movements of the pitman 408 towards the left will rock the link 438 in a clockwise direction far enough to bring the nearly vertical portion of the slot 442 directly below the stud 443 on the lever 444. Thus, near the end of the first cycle of a two-cycle operation of the machine, when the cam groove 446 rocks the lever 444 in a clockwise direction, the stud 443 will move idly in the nearly vertical portion of the slot 442, thus preventing the link 438 from being drawn downwardly to end the machine operation at the completion of one cycle of operation, thus preventing the release of any totalizer selecting key which may have been depressed.

Near the end of the second cycle of a two-cycle operation, the cam groove 410 will coact with the roll 412 to move the pitman 408 sufficiently toward the right to position the stud 443 in the nearly horizontal portion of the slot 442 in the link 438. Therefore, when the lever 444 is rocked in a clockwise direction near the end of the second cycle of such operation, the stud 443 will be in a position to draw the link 438 downwardly to complete the operation of the machine and release any depressed keys.

Release mechanism

While a portion of the release mechanism has heretofore been described in connection with the cycle control mechanism, the means by which certain of the keys and the unit lock control lever 66 control the operation of the release shaft 394 will now be described.

Associated with the banks of amount keys 61 is a yoke 471 (Figs. 35, 41, 42, 43, and 44) pivotally mounted on the shaft 394. Also pivoted on the shaft 394 and embracing the yoke 471 is a plurality of control arms 472, one for each bank of amount keys. Each of the arms 472 has a projection 473 which coacts with a stud 474 on the arm 93 associated with its respective bank of keys. The yoke 471 and the arms 472 are constantly urged in a clockwise direction by a torsion spring 475 (Fig. 35) to maintain the projections 473 against the under side of the studs 474. Also pivotally mounted on the shaft 394, adjacent the right side of the yoke 471, is a pawl 476 carrying a stud 477.

Associated with the pawl 476 is a release plate 478 loosely mounted on a shaft 479 suitably journaled in the machine. In order to release the machine for operation, it is necessary that the plate 478 be free to rock counter-clockwise. Normally, a spring 480 holds the stud 477 on the pawl 476 against a finger 481 formed on the right-hand arm of the yoke 471, thereby positioning the lower end of the pawl 476 in the path of movement of a stud 482 on the plate 478 to prevent counter-clockwise movement of the latter.

Whenever an amount key 61 is depressed, the control bar 97 is cammed toward the left (Fig. 41), thereby rocking the arm 93 clockwise and the arms 472 and the yoke 471 counter-clockwise. Such movement of the yoke will, through the finger 481 coacting with the stud 477, rock the pawl 476 counter-clockwise to remove the lower end thereof from the path of the stud 482, thus freeing the plate 478 for counter-clockwise movement to release the machine for operation. With the plate 478 thus released for counter-clockwise movement, a notch 491 (Fig. 45) formed therein is engaged by a stud 492 on an arm 493 secured to the release shaft 394. Thus, when the shaft 394 is rocked clockwise by the spring 436 (Fig. 9) to release the machine for operation, the arm 493 will be rocked clockwise and the plate 478 counter-clockwise.

Whenever the unit lock control lever 66 (Fig. 11) is moved to either its "read" position or its "reset" position, it will actuate means for locking the amount keys 61 against depression and at the same time release the plate 478 for counter-clockwise movement to permit operation of the machine. The means for accomplishing this result will now be described.

The lever 66 carries a roller 494 (Fig. 11), which coacts with a cam slot 495 in a lever 496 secured to the shaft 479. The configuration of the slot 495 is such that, when the lever 66 is moved to either "read" or "reset" position, the lever 496 and the shaft 479 will be rocked in a clockwise direction. Secured on the shaft 479 (Fig. 42) is a plate 497 provided with projections 498 and 499. When the shaft 479 is rocked clockwise, as just described, the plate 497 will be rocked sufficiently clockwise to place the projection 498 directly under a square stud 500 on the yoke 471, thereby holding the yoke 471 and the arm 472 against counter-clockwise movement and thus preventing depression of any of the amount keys 61. At the same time, the other projection 499 on the plate 497 will coact with the stud 477 to cam the pawl 476 counter-clockwise to release the plate 478 to counter-clockwise movement by the arm 493 (Fig. 45) when the shaft 394 rotates in a clockwise direction to release the machine for operation. When the lever 66 is returned to any of its other positions of adjustment, it will, through the same train of mechanism, return the plate 497 to its normal ineffective position.

Associated with the bank of transaction keys 62 is a pawl 506 (Figs. 35 and 46) loosely mounted on the release shaft 394. A torsion spring 507 normally urges the pawl 506 in a clockwise direction to maintain a surface 508 thereof in contact with the under side of a stud 509 carried by the right-hand arm of the yoke 273. A downwardly extending projection 510 of the pawl 506 normally coacts with the stud 482, which extends on both sides of the plate 478, to hold the plate 478 against counter-clockwise movement and thereby prevent the clockwise movement of the shaft 394 necessary to release the machine. It will be seen from the above that depression of a transaction key 62 will cam the control bar 283 toward the left (Fig. 46), thereby rocking the yoke 273 clockwise, which, through the stud 509, rocks the pawl 506 counter-clockwise. Such movement of the pawl 506 removes the projection 510 from the path of the stud 482, thus freeing the plate 478 to counter-clockwise movement by the arm 493 (Fig. 45) when the shaft 394 is rocked clockwise by the spring 436 to release the machine for operation.

If the release shaft 394 is released without any of the transaction keys 62 being fully depressed, the plate 478 will move counter-clockwise until the stud 482 engages a notch 511 in the projection 510, thereby arresting such counter-clockwise movement of the plate 478 to lock the machine and prevent completion of the operation. It is then necessary to restore the parts to their normal positions by operation of a key release lever, in a manner well known in the art, such as, for example, the lever 280—281 shown in Figs. 1 and 15 of the above-named Shipley Patent No. 1,619,796.

Associated with the bank of clerks' keys 63 are three pawls 516, 517, and 518 (Figs. 35, 48, and 50), similar to the pawl 506 described in connection with the bank of transaction keys 62. Each of these pawls is pivotally mounted on the shaft 394, and the pawls are normally urged in a clockwise direction by the usual torsion springs 519 (Fig. 35). The lower extending ends of the pawls 516 and 517 are rigidly connected together by a stud 520 (Figs. 35 and 48) to constitute a single unit. Secured in and extending on both sides of the left arm of the yoke 345 is a stud 521 (Fig. 48), while similarly located in the right arm of such yoke is a stud 522 (Figs. 47 and 50). The pawls 517 and 518 are normally held by their torsion springs 519 in contact with the portions of the studs 521 and 522 which project toward the inside of the yoke.

Each of the pawls 517 and 518 is adapted to coact at a different time with a release plate 524 (Figs. 14 and 47), similar to the plate 478 (Fig. 43), to normally prevent release of the machine for operation. Each of the pawls 517 and 518 is provided with a downwardly extending projection which, under certain conditions, coacts with a square stud 523 on the plate 524 to hold the same against counter-clockwise movement and thereby prevent release of the machine until the proper time. When the unit lock control lever 66 is in one of its "add" positions (one-cycle operation), only the pawl 518 will coact with the stud 523 to prevent release of the machine. However, when the lever 66 is moved to either its total taking position or its sub-total taking position (two-cycle operation), the pawl 518 will be rendered ineffective, and the pawl 517 will coact with the stud 523 to hold the plate 524 against counter-clockwise movement until the proper time for releasing the machine for operation.

The means for controlling which one of the pawls 517 and 518 will coact with the plate 524 to hold the latter against counter-clockwise movement to prevent release of the machine for operation will now be described.

Associated with the pawl 517 is a cam member 554 (Figs. 36 and 48) secured to the shaft 479. When the unit lock control lever 66 is in any of its "add" positions (single-cycle operation), the cam 554 will be positioned as shown in Fig. 48. When thus positioned, the rearward edge of the cam 554 will coact with the stud 520 on the pawl 517 and will serve to hold the latter out of cooperative relation with the stud 523 on the plate 524.

On the other hand, the pawl 518 has associated therewith a cam member 555 (Figs. 36 and 50) secured to the shaft 479. When the unit lock control lever 66 occupies any one of its "add" positions (single-cycle operation), the cam 555 is positioned as shown in Fig. 50, in which position it does not interfere with the engagement of pawl 518 with stud 523 to hold the plate 524 against counter-clockwise movement.

Movement of the control lever 66 to any one of its positions ("sub-total" and "reset") for conditioning the machine for a two-cycle operation will, as previously described, rock the shaft 479, as well as the cams 554 and 555 (Figs. 48 and 50), in a clockwise direction. Such movement of the cam 554 will release the pawl 517 to the action of the springs 519, thus causing the pawl 517 to rock clockwise to engage the lower projection thereof with the stud 523 and hold the plate 524 against counter-clockwise movement. At the same time, the clockwise movement imparted to the cam 555 causes a surface 556 (Fig. 50) thereon to coact with a roller 557 on the pawl 518 to cam the latter counter-clockwise out of cooperative relation with the stud 523 on the plate 524, thus leaving the pawl 517 as the sole means for holding the plate 524 against counter-clockwise movement.

Movement of the control lever 66 to either sub-total or reset position would cause the cam 555 to rock clockwise, as above described, to move a hook 558 (Fig. 50), formed integral therewith, under and beyond a pin 559 carried by the right arm of the yoke 345. Then, upon depression of a clerk's key 63, corresponding to the totalizer from which either a sub-total or a grand total is to be taken, the yoke 345 will be free to rock clockwise by reason of the hook 558 having been moved beyond the pin 559.

If, on the other hand, a clerk's key 63 is depressed before the control lever 66 is moved to either its sub-total position or its reset position, the pin 559 will be moved clockwise to engage the inside of the hook 558 to hold the cam 555 against clockwise movement, thus locking the control lever 66 against movement.

The means for rocking the plate 524 counter-clockwise includes a yoke 525 (Figs. 13, 14, 35, 51, and 52) pivotally mounted on the shaft 394, the left-hand arm of said yoke carrying a stud 526 (Fig. 14) adapted to coact with the notched portion of the plate 524. When a clerk's key 63 is depressed and the yoke 345 is rocked clockwise, as previously described, either the pawl 517 or the pawl 518, depending upon which is in its effective position, is rocked counter-clockwise to remove the lower projection thereof from the path of movement of the stud 523 and the plate 524. This releases the plate 524 for the counter-clockwise movement which the latter receives through the stud 526 when the yoke 525 is rocked clockwise to release the machine for operation. The means for rocking the yoke 525 will now be described.

Secured on the shaft 394 is an arm 527 (Figs. 13, 35, and 51) notched to engage a stud 528 carried near the lower end of a link 529 pivoted near its upper end with the right-hand arm of the yoke 525. When the plate 524 is released for counter-clockwise movement, the spring 436 (Fig. 9) rocks the shaft 394 clockwise and, through the arm 527, the stud 528, and the link 529, imparts a like movement to the yoke 525 to thereby release the machine for operation. As previously mentioned, the shaft 394 is, later in the operation, rocked counter-clockwise slightly past its home position to effect release of the depressed keys, and then clockwise to home position. Through the same train of mechanism just described, the yoke 525 is moved in a different direction corresponding to the movement imparted to the shaft 394.

The means associated with the bank of multiple-item keys and single-item keys 64 and 65 for releasing the machine for operation includes a pawl 536 pivoted on the shaft 394 (Figs. 14 and 35), which normally coacts with a stud 537 carried by a notched plate 538 (Fig. 36) to hold the latter against counter-clockwise movement to prevent the release of the machine for operation until the proper time. The pawl 536 is substantially like the pawl 506 previously described in connection with the bank of transaction keys 62. The usual torsion spring 539 normally urges the pawl 536 in a clockwise direction to maintain the downwardly projecting portion thereof in contact with the stud 537 of the plate 538. The pawl 536 and the plate 538 are similar to, and operate in substantially the same manner as, the pawl 506 and the plate 478, respectively, previously described in connection with the transaction bank of keys 62. It is, therefore, felt that a detailed description of the construction and operation of these parts will not be necessary herein.

When either the multiple-item key 64 or the single-item key 65 is depressed, a bell crank 540 is rocked clockwise. Such movement of the bell crank 540, by means of its stud 541 (Fig. 10) on a frame 542, rocks the pawl 536 (Fig. 14) counter-clockwise to remove a projection 543 thereof from the path of movement of the stud 537 (Fig. 36) secured to the notched plate 538, thereby freeing such plate for counter-clockwise movement. An arm 545 (Fig. 35) secured to the shaft 394 carries a stud 546, which engages the notched portion of the plate 538 (Fig. 36) to rock the latter counter-clockwise when the shaft 394 and the arm 545 are rocked clockwise by the spring 436 (Fig. 9) to release the machine for operation.

Means is provided in connection with the bank of multiple-item keys and single-item keys 64 and 65, respectively, for causing the pawl 536 to be effective only during adding operations (single-cycle) and ineffective during sub-total or reset operations (two-cycle). Such means includes a cam 560 (Fig. 36), similar to the cam 555 (Figs. 36 and 50) previously described, secured on the shaft 479. Since the construction and operation of the cam 560 are substantially like the construction and operation of the cam 555 previously described, only a brief discussion thereof will be given here.

When the control lever 66 is in one of its "add" positions, the cam 560 occupies the same position as the cam 555, shown in Fig. 50. In this position, the cam 560 will allow the pawl 536, when no key 64 or 65 is depressed, to effectively hold the plate 538 against the counterclockwise movement necessary to release the machine for operation. However, when the control lever 66 is moved to either of its two uppermost positions of adjustment ("read" or "reset"), which conditions the machine for a two-cycle operation, the cam 560 will be rocked clockwise, in the same manner as the cam 555, causing the rear edge thereof to coact with a roller 561 (Fig. 35) on the pawl 536 to cam the latter counter-clockwise, against the action of the spring 539, out of cooperative relation with the plate 538. This releases the plate 538 for the counter-clockwise movement necessary to release the machine for operation.

A plurality of non-repeat pawls are employed in the present machine for the purpose of preventing a repeat operation of the machine during a regular single-cycle operation so long as there is a key held depressed in either the clerks' bank of keys 63 or the multiple-item-single-item bank of keys 64—65. Associated with the pawls 517 and 518 corresponding to the clerks' bank of keys 63 are non-repeat pawls 551 and 552, respectively (Figs. 35, 47, 48, and 50), while associated with the pawl 536 corresponding to the bank of multiple-item and single-item keys 64—65 is a non-repeat pawl 553. Each of the non-repeat pawls 551 and 552 is connected to its corresponding one of pawls 517 and 518 by one of the torsion springs 519, and the non-repeat pawl 553 is connected to the pawl 536 by the spring 539.

A description of the construction and operation of the non-repeat pawls 551 and 552 will be given first.

The pawls 551 and 552 are so arranged that only the pawl 552 will be operable during adding or single-cycle operations, while during total or sub-total operations (two-cycle operations) only the pawl 551 will be operable.

When one of the clerks' keys 63 is depressed, while the control lever 66 occupies one of its adding positions of adjustment, the yoke 345 (Fig. 50) is rocked clockwise, as heretofore described, causing the stud 522 to rock the pawl 518 counter-clockwise to move its lower end from the path of movement of the stud 523 (Fig. 47) on the plate 524. This releases the plate 524 for the counter-clockwise movement which is necessary to release the machine for operation. When the machine is thus released for operation, the yoke 525 (Figs. 13 and 35) is moved first clockwise, then counter-clockwise slightly past its normal position, and finally clockwise to normal position, as previously described. The yoke 525, in turn, will, through the stud 526 (Fig. 14), rock the plate 524 first counter-clockwise, then clockwise slightly past normal position, and finally counter-clockwise to normal position. While the pawl 518 is moving counter-clockwise, the non-repeat pawl 552 will, through the action of the spring 519, tend to move therewith, but is limited in such counter-clockwise movement by a nose 550 of the non-repeat pawl striking the stud 523 on the plate 524. Thus, when the plate 524 is rocked counter-clockwise, as previously described, the stud 523 moves above the nose 550 and holds the pawl 552 against further counter-clockwise movement by the spring 519. Later in the operation, when the plate 524 is rocked clockwise slightly past its normal position, the stud 523 will clear the end of the nose 550. If, at this time, there is still one of the clerks' keys 63 depressed, the spring 519 will cause the non-repeat pawl 552 to be moved its full extent in a counter-clockwise direction, thereby positioning the nose 550 directly above the stud 523 to block counter-clockwise movement of the plate 524 and prevent a repeat operation.

If, on the other hand, the depressed clerk's key 63 is released and restored to its undepressed position before completion of the operation of the machine, the stud 522 (Fig. 50), coacting with a finger 530 of the non-repeat pawl 552, returns the latter clockwise to its home position.

When the control lever 66 is moved to either one of its two uppermost positions of adjustment for causing the machine to perform a two-cycle sub-total operation or reset operation, it will, through means to be presently described, render the non-repeat pawl 552 inoperable and the non-repeat pawl 551 operable. Such movement of the lever 66 will, through mechanism previously described, impart a clockwise movement to the shaft 479 and the cams 554 and 555 secured thereon. As heretofore mentioned, when this occurs, the cam 554 will render the pawl 517 operable, while the cam 555 will render the pawl 518 inoperable. At the same time the cam 555 is being rocked clockwise, a shoulder 569 thereof engages a pin 570 (Fig. 50) on the non-repeat pawl 552 and thereby renders the latter inoperable. On the other hand, such clockwise movement of the cam 554 not only releases the pawl 517 (Fig. 48) to permit the latter to coact with the stud 523 on the plate 524, but also disengages a notch in the cam 554 from a pin 571 carried by the non-repeat pawl 551 to render the latter operable. Since each of the non-repeat pawls 551 and 552 coacts with the plate 524 in the same manner and for the same purpose, the only difference being in the time at which they operate, it is not thought necessary to reiterate the description thereof for the pawl 551.

Associated with the banks of multiple-item and single-item keys 64 and 65, respectively, is the non-repeat pawl 553 (Fig. 35), which is operable only during adding (single-cycle) operations and is substantially like, and operates in the same manner as, the non-repeat pawl 552 heretofore described in connection with the clerks' bank of keys 63. Also, during two-cycle total or sub-total operations, the cam 560 (Fig. 36) coacts with the pawl 553, in the same manner as the cam 555 (Figs. 35, 36, and 50) coacts with the pawl 552, to render the pawl 553 inoperable. Since the non-repeat pawl 553 is of the same construction and operates in the same manner as the non-repeat pawl 552 previously mentioned, it is not felt necessary to give any further description thereof.

When it is desired to record a multiple-item transaction, the operator depresses the appropriate amount key 61, transaction key 62, clerk's key 63, and multiple-item key 64, which releases the machine for operation. After the first operation of the machine in connection with the recording of such a transaction, the particular clerk's key which had been depressed and the transaction key are retained in their depressed positions until all of the items constituting such transaction have been recorded in the machine. The total key 67 is then depressed, which causes the total of such multiple-item transaction to be removed from the itemizing totalizer and transferred to the group totalizer, at the same time causing the indicators to be adjusted to display such total. During the latter operation, the various keys, which had previously been retained in their depressed positions, are returned to their undepressed positions.

The means for retaining the clerks' keys depressed includes a forked lever 1571 (Figs. 13, 36, and 52) freely mounted on the shaft 479. The lever 1571 embraces a stud 572 carried by a lever 573 pivoted to the frame 542, which supports the multiple-item and single-item keys 64 and 65, respectively. When the multiple-item key 64 is depressed and the machine operated, the lever 573 (Figs. 13 and 52) is rocked clockwise by means to be later described. During such clockwise movement of the lever 573, the stud 572 rocks the lever 1571 clockwise. The stud 528, heretofore referred to, projects through a slot 575 in a plate 576 mounted on the shafts 394 and 479.

When the multiple-item key 64 is depressed, the arm 527 (Fig. 51) moves the stud 528 to the left end of the slot 575. Such movement of the stud 528, through the link 529, imparts a clockwise movement to the yoke 525 to release the machine for operation, as previously described, whereupon an arm 577 (Fig. 52) of the lever 571 moves under a flange 531 of the link 529 and retains the yoke 525 in its moved position. When the arm 527 moves counter-clockwise in its attempt to return the link 529 and the yoke 525 to their untripped positions, the arm 577, being under the flange 531, causes the link 529 to rock clockwise and disengage the stud 528 from the notch in the arm 527 and force the stud into a notch at the left-hand end of the slot 575. Another arm 578 of the lever 1571 normally obstructs the entrance to the notch in the slot 575, but, when the lever 1571 is rocked clockwise, the arm 578 is moved out of its obstructing position.

With the yoke 525 thus held in its tripped position, the depressed clerk's key 63 is locked in its depressed position until the yoke 525 is released through the depression of the total key 67 to take the total of the multiple-item transaction.

The position assumed by the yoke 525 when held in such tripped position is shown in Figs. 13 and 14. When in said position, the stud 526 on the yoke 525 holds the plate 524 in its moved position, shown in Fig. 14. The plate 524 is provided with an upwardly-extending arm 591, normally out of the path of a stud 592 carried by bell crank 336, to normally permit free depression of any clerk's key. However, when the yoke 525 and the plate 524 are held in their moved positions, the arm 591 blocks rocking movement of the bell crank 336 and therefore prevents depression of a clerk's key 63 and thereby prevents release of a depressed clerk's key 63.

The following transaction keys 62—namely, "Cash," "Charge," "Received on account," "Paid out," and "No sale"—are to be retained in their depressed positions at the end of all item operations involving a multiple-item transaction and are to be released when the total of any such multiple-item transaction is completed by the operation of the total key 67.

To accomplish this purpose, the transaction bank has therein the usual locking detent 450 (Figs. 15 and 16) having the usual locking fingers 451 cooperating with the above mentioned keys, which fingers are adapted to be locked over the studs 286 of any of the depressed keys by the detent spring 452 in the usual manner.

The detent 450 has a stud 453 adapted to cooperate with an arm 454 of a bail 455 mounted on a shaft 394. Another arm 456 (Fig. 35) of the bail 455 is connected to the yoke 525 to operate therewith.

When the yoke 525 is locked clockwise, as above described, the bail 455 and the arm 454 are locked likewise, thus placing a surface 457 of the arm 454 directly behind the stud 453 of the detent 450 to prevent a normal release lever 458 from moving the detent 450 to the right to release any of the depressed keys. Consequently, any depressed transaction key involved in a multiple-item transaction will be retained in depressed position during the entry of all of the items of the multiple-item transaction and will be released upon the taking of the total of the multiple-item transaction by the depression of the total key 67.

When the multiple-item key 64 is depressed and the machine operated, the lever 573, as before mentioned, is rocked clockwise to lock the depressed clerk's key 63 and also any depressed transaction key 62 in their depressed positions. The single-item key 65 is at this time locked against depression by a slide 579 (Fig. 10) pivoted to the lever 573, so that any movement imparted to the lever is likewise transmitted to the slide. Therefore, when the lever 573 is rocked clockwise, it will move the slide 579 toward the left, against the action of a spring 582, thereby placing a projection 583 on the slide 579 directly beneath a pin 585 of the single-item key 65 to prevent its depression. When the slide 579 is rocked toward the left, a stud 586 carried thereby is moved beyond a finger 587 of a lever 588 pivoted on the key frame 542. When this occurs, a spring 589 will rock the lever 588 counter-clockwise to position the finger 587 above the stud 586 and thus lock the slide 579 in its moved position. The slide 579 carries a stud 581, which projects through a slot 590 in the lever 588 to facilitate the proper cooperation between the lever and the slide. The lever 588 thus serves to hold the slide 579 and the lever 573 in their moved positions until the total key 67 is depressed, which causes the lever 588 to become disengaged from the stud 586, thereby permitting the spring 582 to return the slide 579 and the lever 573 to their home positions.

The means for imparting the clockwise movement to the lever 573 (Fig. 10) includes a lever 596 freely mounted on the shaft 116. Pivoted to the lever 596 is a pawl 597 which, through the influence of a spring 598, is constantly held in contact with a stud 599 on the slide 579. Counter-clockwise movement of the pawl 597 by the spring is limited to the home position of the pawl by a stud 600 thereon coacting with a projection 601 of the lever 596. The lever 596 receives a short counter-clockwise movement every time the upper totalizer line, which carries the itemizing totalizer and the group totalizer, is moved into engagement with the amount differential actuators 111 (Fig. 18). This is accomplished by means of a two-armed lever 602 (Fig. 10) pivotally mounted in a side plate 603 (Fig. 21) suitably supported in the machine. One arm of the lever 602 (Fig. 10) has a stud 604, which works in a slot 605 in an arm 606 of the lever 596. The other arm of the lever 602 has a cam surface 607 and an aligning finger 608. When the shaft 244 (Fig. 21) is moved downwardly to engage the upper totalizer line, a collar 609 thereon coacts with the cam surface 607 to rock the lever 602 counter-clockwise and, through the stud 604 and the slot 605, rock the lever 596 counter-clockwise. If the multiple-item key 64 has been depressed, the lever 596 will, through the coaction of the spring pressed pawl 597 with the stud 599, move the slide 579 toward the left until the finger 587 of the lever 588 snaps over the stud 586, which will hold the slide 579 in its moved position against the action of the spring 582. Such movement of the slide 579 rocks the lever 573 clockwise to perform the function of locking the operated clerk's key 63 and transaction key 62 in their depressed positions until they are later released by the total key 67, as will be described later.

When the lever 573 (Fig. 10) is rocked clockwise, as above described, a roller 610 carried thereby is positioned along a surface 611 of an arm 612 secured to the shaft 479, thereby locking said shaft against any clockwise movement. This prevents any manual adjustment of the unit lock control lever 66 to either a "read" or a "reset" position during any multiple-item transaction.

When the single-item key 65 is depressed, the pin 585, through the projection 583, blocks the slide 579 against any movement by the pawl 597 and the lever 596; thus, when the lever 596 is rocked counter-clockwise, the pawl 597 will move idly in a clockwise direction about its pivotal point, against the action of the spring 598.

*Totalizer engaging and disengaging mechanism*

This mechanism includes an engaging and disengaging spider 618 (Fig. 24), which receives two complete oscillatory movements during each cycle of operation of the machine. The spider is loosely mounted on the shaft 116 and has a notch 617 engaging an arm 616 of a Y-shaped lever 619 freely mounted on the shaft 106. The lever 619 carries rollers 620 and 621, which coact with a pair of cams 622 and 623, respectively, fast on a short shaft 624 suitably journaled in the right side frame 80. During each cycle of operation of the machine, the gear 397 (Fig. 9) will, through a gear 625 secured to the shaft 624, impart one complete counter-clockwise movement to the shaft 624 and the pair of cams 622 and 623 (Fig. 24). The cams 622 and 623 will, through the lever 619, rock the engaging spider 618 first clockwise and then counter-clockwise twice during each cycle of operation of the machine.

The engaging spider 618 (Fig. 24) has two notched arms 626 and 627, each corresponding to a different one of the totalizer lines. Associated with the upper totalizer line is a link 628 pivoted to the arm 249 and having a stud 629 which is normally engaged by the notched arm 626, as shown in Figs. 26, 29, and 30. It will thus be seen that clockwise movement of the spider 618 will, through the engagement of the arm 626 with the stud 629, cause the link 628 to be moved toward the right, thereby moving the roll 250 the full length of the slot 251 to cause the shaft 244 to be moved inwardly far enough to bring the selected totalizer pinions on the upper totalizer line into engagement with the actuators 111 (Fig. 18).

The lower totalizer line is moved into engagement with the actuators 111 in the same manner as that employed for the upper totalizer line. For example, the notched arm 627 (Fig. 24) is adapted to coact with a stud 630 on a link 631 and, during the clockwise movement of the spider 618, moves the link therewith. The link, being pivoted to the arm 276, will, during such movement, cause the roller 277 to move the full length of the slot 278 and thereby cause the lower totalizer line to be moved into engagement with the actuators 111.

It is evident from the above that one or both of the totalizer lines can be prevented from being moved into engagement with the differential actuators 111 by simply moving the studs 629 and 630 out of engagement with the notched arms 626 and 627, respectively, previous to the movement of the spider 618. The mechanism for accomplishing this result will be described presently.

*Control of totalizers for engagement with their actuators—add operations*

As stated above, when the studs 629 and 630 (Figs. 24 and 25) on the links 628 and 631, respectively, are engaged with the notched arms 626 and 627, the upper and lower totalizer lines are thus adapted to be rocked into engagement with their differential actuators 111 by the engaging spider 618. If, however, the studs 629 and 630 are moved to the position shown in Figs. 24, 27, and 28—that is, disengaged from the notched arms 626 and 627—the spider 618 will not, during its oscillatory movement, cause the totalizer lines to be engaged with the racks on the actuators 111, and consequently nothing will be added on the totalizers. The mechanism for controlling the engagement of the totalizers will now be described.

Coacting with a cam groove 641 (Figs. 31 and 31A) formed in the side of the gear 397 is a roller 642 carried by an arm 643 secured to one end of a short shaft 644 suitably journaled in the right side frame 80. Also secured on the shaft 644 is another arm 645 connected by a link 646 to a three-armed lever 647 (Fig. 25) freely mounted on the shaft 116. Since the gear 397 is secured to the main drive shaft 106, it will receive one complete clockwise rotation during each cycle of operation of the machine. Due to the configuration of the cam groove 641 (see also Fig. 31A) in the gear 397, the latter will, during its clockwise rotation, rock the arm 643, the shaft 644, and the arm 645 first clockwise slightly, then counter-clockwise, and finally clockwise to their normal positions. When this occurs, the arm 645, through the link 646, imparts first a slight counter-clockwise movement, then a clockwise movement, and finally a counter-clockwise movement to the lever 647. The respective extents of movements are indicated by Roman numerals I, II, and III in Figs. 7 and 25.

The lever 647 is provided with a plurality of radial arms 648, 649, and 650 (Figs. 7 and 25), the outer ends of which coact with notched portions of bell cranks 651, 652, and 653 pivotally mounted on rods 654, 655, and 656, respectively, the latter being suitably mounted in a hanger plate 657 (Figs. 24 and 31) and the side frame 80. The plate 657, in turn, is suitably supported by the rods 145 and 146. Thus, when the lever 647 is rocked in the manner just described, it will, through the arms 648, 649, and 650, impart to the bell cranks 651, 652, and 653 first a slight clockwise movement (I) to the Fig. 27 position, then a greater counter-clockwise movement (II) to the Figs. 28 and 29 position, and finally a clockwise movement (III) back to the starting position (Fig. 26).

Associated with the upper totalizer line is a lever 658 (Figs. 25 to 30) pivoted at 659 to the bell crank 652, while the other end of the lever is provided with an elongated opening 660, through which projects a stud 661 carried by the totalizer engaging and disengaging link 628. Pivoted at 667 to the lever 658 is a feeler 668. This feeler includes a plurality of fingers 669, 670, and 671, which are adapted to coact with the peripheries of totalizer selecting disks 672, 673, and 674 (Figs. 2, 3, 4, and 30), respectively, to control the engagement or non-engagement of the totalizer pinions 114 on the upper totalizer line with the racks 112 on the actuators 111 during adding operations. A spring 675 constantly urges the fingers 669, 670, and 671 into contact with the peripheries of the selecting disks. The disks 672, 673, and 674 are rotatably mounted on the shaft 116, and each of the disks is provided with a plurality of notches formed on the periphery thereof.

The bell crank 652, during the first slight clockwise movement (I, Fig. 27) imparted thereto by the lever 647, tends to rock the lever 658 counter-clockwise about the stud 661. However, this is prevented by an arm 676 (Figs. 25 to 31) of the lever 658 abutting a surface 677 on a link 678 held stationary at this time, thus causing the bell crank 652 and the lever 658 to rock clockwise about the rod 655 as a unit, instead of the lever 658 being rocked counter-clockwise about the stud 661. Such clockwise movement of the lever 658 carries the feeler 668 toward the right and away from the selecting disks 672—673—674 and, through the pin-and-slot connection 661—660, moves the link 628 counter-clockwise about the roll 250. This moves the stud 629 out of its normal engagement with the notched arm 626 of the engaging spider 618 and moves it into engagement with the notch 679 (Fig. 24) formed in the hanger plate 657. Thus, when the engaging spider 618 receives its first oscillatory movement, it does not rock the selected upper totalizer 114 or 117 into engagement with the differential actuators 111, and consequently no totalizer on said line will be added upon. During the time of such first oscillatory movement of the spider 618, the selecting disks 672 and 673 are differentially adjusted under control of their respective keys 62 and 64, the other selecting disk 674 having been adjusted under control of the unit lock lever 66 prior to the operation of the machine.

Before the spider 618 receives its second oscillatory movement, the lever 647 is rocked clockwise (II, Fig. 28), as previously described, and in so doing rocks the bell crank 652 in a counter-clockwise direction, as viewed in Fig. 28. The lever 658 is moved toward the left at this time by the bell crank 652 to bring the feeler 668 into cooperative relation with the peripheries of the selectng disks 672—673—674. If at this time all three of the fingers 669, 670, and 671, or only the two fingers 669 and 671, or the finger 670 alone or in combination with one or the other of the fingers 669 and 671, coact with unnotched portions of the peripheries (see chain lines in Fig. 28) of their respective selecting disks, the lever 658 will thereby be stopped in its movement toward the left and caused to pivot in a clockwise direction on the stud 667 to assume the position illustrated in Fig. 28. This will, through the pin-and-slot connection 661—660, move the link 628 counter-clockwise to position the stud 629 out of cooperative relation with the engaging spider 618. When this occurs, the selected upper totalizer 114 or 117 will not be moved into engagement with the racks 112 on the actuators 111, and consequently no totalizer on the upper totalizer line will be added upon during the second oscillatory movement imparted to the spider 618 during such operations.

If, on the other hand, all three of the fingers 669, 670, and 671, or just the middle finger 670, in combination with one or the other of the fingers 669 and 671, as shown in Fig. 29, enter notched portions, instead of engaging the unnotched portions of the peripheries of their respective disks 672, 673, and 674, the lever 658 is controlled to position the stud 629 into cooperative relation with the spider 618 in the following manner:

Before the spider 618 receives its second oscillatory movement, the lever 647 is rocked clockwise (II, Fig. 29), as previously described, and, in so doing, said lever rocks the bell crank 652 in a counter-clockwise direction. At this time, the bell crank 652 moves the lever 658 with it as a unit, about the rod 655, and, since notches are in the path of the feeler 668, the lever 658 moves into the position shown in Fig. 29, wherein the lever 658, through stud 661, moves link 628 into a position wherein the stud 629 (Fig. 24) lies in the notch in the arm 626 of the spider 618 and remains therein during the second oscillatory movement of the spider 618. Under such conditions, when the spider 618 receives its second oscillatory movement, the selected upper totalizer 114 or 117 moves into engagement with the racks 112 of the actuators 111 to add upon the selected one of the totalizers on said line.

Near the end of the second oscillatory movement imparted to the spider 618 during each adding operation, the lever 647 is rocked counter-clockwise (III, Fig. 26) back to the starting position, as previously described, thus causing the bell crank 652 to rock clockwise to return the lever 658 and the feeler 668, thereby returning the stud 629 to its normal effective position of engagement with the notch in the arm 626 of the engaging spider, provided said stud 629 is not already in such position.

While the mechanism described above controls the engagement and non-engagement of the selected totalizer 114 or 117 with the actuators 111 during an adding operation, it might be stated that mechanism similar to the above mentioned mechanism, and operating in substantially the same manner, is provided for controlling the engagement and non-engagement of the selected totalizer 115 on the lower totalizer line with the actuators 111 during such adding operations. It is therefore felt sufficient to describe only briefly such control mechanism for the lower totalizer line.

Associated with the lower totalizer line is also a lever 691 (Fig. 25) pivoted at 692 to the bell crank 653 and provided with an elongated slot 693 through which projects a stud 694 carried by the totalizer engaging and disengaging link 631. Pivotally mounted at 695 to the lever 691 is a feeler 696 having, in this case, only two feeling fingers, 697 and 698 (Figs. 2, 3, and 25), which are adapted to coact with the peripheries of the selecting disks 672 and 674, respectively, to control the engagement or non-engagement of the totalizer pinion 115 on the lower totalizer line with the differential actuators 111 during adding operations. Since the disk 673 exercises no control over the engagement or non-engagement of the lower totalizer line, the feeler 696 carries no feeling finger for coacting with that particular disk.

A spring 699 constantly tends to draw the lever 691 toward the left (Fig. 25) to bring the feeler 696 into cooperative relation with the peripheries of the selecting disks 672 and 674. The lever 691 has an arm 700, which normally abuts a surface 701 formed on the link 702 normally held stationary by means to be described hereinafter. Since the bell crank 653 and the lever 691 are substantially alike, and operate in the same manner as, the hereinbefore described bell crank 652 and its associated lever 658, it is not thought necessary to reiterate the description of the operation of such similar mechanism.

Totalizer selection

In order to actuate any particular totalizer on either the upper or the lower totalizer line, it is necessary to shift the line which carries such totalizer to bring the pinions of the selected totalizer opposite the differential actuating racks 112 on the actuators 111. This shifting movement is under the control of the clerk's key 63, the "multiple-item" and the "single-item" keys 64 and 65, respectively, and the "total" key 67. The bank of clerks' keys 63 controls the shifting of the lower totalizer line, while the "multiple-item" and the "single-item" keys 64 and 65, respectively, and the total key 67 control the shifting of the upper totalizer line.

Totalizer selection—clerks' totalizers

The manner in which the clerks' keys 63 control the selection of the clerks' totalizers will now be described. The differential movement imparted to the differential arm 362, under control of the clerks' keys 63, is transmitted, by means of the beam 373 (Fig. 12) and the link 374, through the internal-external gear drive mechanism, to another link 711 (Figs. 22 and 23) and a gear segment 712 freely mounted on the shaft 116. The segment 712 meshes with a gear 713 secured to one end of a short shaft 714 suitably journaled in a pair of hanger plates 715 and 603 secured to the rods 145 and 146. The shaft 714 has secured thereon a drum cam 717 provided with a cam slot 718 engaged by an anti-friction roller 719. The roller 719 is carried by a stud 720 secured to a shifting arm 721, which is bifurcated at one end to embrace an annular groove formed in a sleeve 722 loose on the shaft 264 and secured to the right arm 263 of the clerks' totalizer carrying frame. The stud 720 and the roller 719 project through a transverse slot 723 formed in a yoke 724, which serves to prevent any vertical movement from being given to such roller and stud. The yoke 724 has side arms 725 and 726 secured to the hanger plates 715 and 603, respectively, by separate pairs of studs 727 and 728 (Fig. 12), only one of such pairs of studs being shown. It will thus be seen that the segment 712 will, through the gear 713 and the shaft 714, impart to the drum cam 717 a movement commensurate with the movement which the differential arm 362 receives under control of the clerk's key 63. The drum cam 717, in turn, through the cooperation of the roller 719 with the cam slot 718, will shift the arm 721, the sleeve 722, and the clerks' totalizer frame to position the totalizer pinions 115 of the selected totalizer opposite the amount actuators 111. The direction of movement of the totalizer frame will depend upon the totalizer which was selected during the previous operation, because the shifting mechanism is what is known in the art as a minimum movement device, which, as is well known, shifts the totalizer line directly from the last position to its new position. When the clerks' totalizer pinions 115 are engaged with the racks 112 on the amount differential actuators during the operation of the machine, the selected clerk's totalizer will then be added upon.

Totalizer selection—item and group totalizers

The manner in which the multiple-item key 64, the single-item key 65, and the total key 67 control the selection of the "item" and the "group" totalizers on the upper totalizer line will now be described. Loosely mounted on the shaft 244 is a sleeve 735 (Figs. 7, 12, and 21), one end of which is secured to the right-hand arm 243 of the totalizer carrying frame on the upper totalizer line. The sleeve 735 (Fig. 21) has an annular groove, which is engaged by a bifurcated shifting arm 736 having a stud 737 carrying an anti-friction roller 738 coacting with a cam slot 739 of a drum cam 740. The cam 740 is secured to a short shaft 741 suitably journaled in the hanger plates 715 and 603. Clockwise movement of the shaft 741 and the drum cam 740 will, through the cooperation of the cam slot 739 and the roller 738, shift the arm 736 and the sleeve 735, together with the totalizer frame, toward the left, as viewed in Fig. 21, thereby positioning the right-hand pinion 114 of each group (representing the "item" totalizer) opposite the amount actuators 111.

In order to prevent any vertical movement from being imparted to the roller 738, a stationary flanged yoke 742 has a slot through which project the stud 737 and the roller 738. The yoke 742 has formed integral therewith two side arms 743 and 744, which are rigidly secured to the hanger plates 715 and 603, respectively.

The means for actuating the drum cam 740 to accomplish the above-mentioned result will now be described.

It will be recalled that the lever 647 (Figs. 7 and 25) is rocked first counter-clockwise, then clockwise, and finally counter-clockwise to its home position during each single-cycle machine operation. Such different movements of the lever 647 will, through engagement of the arm 648 thereof with the bell crank 651, cause the bell crank 651 to be rocked first clockwise, then counter-clockwise, and finally clockwise to its home position. Pivotally mounted on a stud 751 (Figs. 7 and 21) secured to the bell crank 651 are an arm 752 and a lever 753. The arm 752 and the lever 753 are secured to each other by a stud 754. The upper portion of the arm 752 has a cam slot 755, through which projects the stud 756 carried by a plate 757 secured to the shaft 741. The upper end of the lever 753 is shaped in the form of a foot 758, the sole of which coacts with a collar 759 secured to the bell crank 651 and acts as a guide for the lever 753 and a pin 760 carried thereby.

This pin 760 (Figs. 7 and 31) is against the projection 761 of the arm 762 at the end of a single-item entry operation.

At the end of any operation involving the entry of any of the items of a multiple-item transaction, the pin 760 is in a position slightly to the right of the projection 761.

At the end of a multiple-item total operation, the pin 760 also stands against the projection 761.

*Totalizer selection—single-item entry operation*

First will be described the operation involving the entry of a single-item transaction. The plate 757 (Fig. 7), which controls the shifting of the top totalizer line, is shown in a position where the group total is in a position to be added upon, and, since all single items are to be added directly into the group totalizer, this plate 757 must be in the position shown when the totalizer line is moved into engaging position.

During this single-item entry operation, the control disk 673 (Fig. 3) is shifted under control of the multiple-item and single-item bank differential mechanism to the second position, wherein there is no notch opposite the pin 760. During the first clockwise movement of the bell crank 651, the pin 760, being against the projection 761, causes a counter-clockwise movement of the lever 753 about the pin 760, whereupon the arm 752, through the slot 755 and the stud 756, rocks the plate 757, which brings the item totalizer into a position to be added upon were the parts left in this position. However, the bell crank 651 (Fig. 7) is immediately moved counter-clockwise, by the second movement (clockwise) of the lever 647, to bring the pin 760 into contact with the selected high part of the periphery of the disk 673, to thereby cause the lever 753 and the arm 752 to move clockwise about the pin 760, which immediately rocks the plate 757 back to the position shown in Fig. 7, wherein the group totalizer 117 is in a position to be moved into engagement with the actuators to have entered therein the amount of a single-item transaction.

*Totalizer selection—multiple-item entry operations*

Assuming that a multiple-item transaction is to be entered, the disk 673 will be moved to the fifth position, wherein a notch is positioned opposite the pin 760. Now, during the first clockwise movement of the bell crank 651, the lever 753 and the arm 752 are rocked counter-clockwise around the pin 760, since it is in contact with the projection 761, which movement rocks the plate 757 clockwise to shift the drum cam to bring the item totalizer 114 into the position wherein it will be engaged with the actuators to have entered therein the amount of the item now under consideration involving the first item of a multiple-item transaction. Now, as bell crank 651 moves counter-clockwise, due to the fact that there is a notch in the disk 673 opposite the pin 760, the lever 753 and the arm 752 are merely moved toward the right, pin 760 entering the notch in the fifth position of the disk 673. As this time, the slot 755 merely rides idly on the stud 756, and the plate 757 remains in shifted position, wherein the item totalizer has been selected for operation. After the entering of the item, and as the bell crank 651 moves clockwise again to its home position, the slot 755 merely slides on the stud 756, and the arm 752 and the lever 753 are merely moved to the left position, wherein the pin 760 is not quite in contact with the projection 761.

Assuming now that the second item of a multiple-item transaction is to be entered in the machine, during this operation the bell crank 651, during the first part of its clockwise movement, moves the lever 753 and the arm 752 to the left, as viewed in Fig. 7, until the pin 760 contacts the projection 761. However, there is no movement of the plate 757, as the slot 755 merely slides a little farther on the stud 756. Now, as the bell crank 651 is moved counterclockwise, the lever 753 and the arm 752 are moved towards the right (Fig. 7), and the slot 755 merely slides over the stud 756, thus in no way effecting any movement of the plate 757; consequently, the item totalizer 114 again remains in a position to have the second item entered therein. Now, as the bell crank 651 is moved clockwise to home position, the lever 753 and the arm 752 are slid to the left, riding idly on the stud 756 and causing no movement thereof, thus leaving the item totalizer in selected position at the end of this operation, and the pin 760 is not quite against the projection 761.

*Totalizer selection—multiple-item total operation*

To take the total of the two items just entered in the item totalizer 114, clear the totalizer, and transfer the amount to the group totalizer 117, all accomplished in one cycle of operation, involves the following movements of the bell crank 651, the lever 753 and the arm 752. Since the item totalizer is in a position to be added upon, and as it must be cleared during the first half of this cycle of operation, it is necessary that it remain in selected position. During this item total operation, the total key 67 (Fig. 5) is depressed, and, since no key 64 or 65 is depressed, the selecting disk 673 is now positioned under control of the zero stop pawl 1356 of the multiple-item-single-item bank, and consequently the disk 673 is stopped in the zero position, wherein there is no notch opposite the pin 760. During the first clockwise movement of the bell crank 651, the lever 753 and the arm 752 are slid to the left until the pin 760 contacts the projection 761. This movement involves no movement of the plate 757, as here again the slot 755 of the arm 752 merely slides on the stud 756, and therefore the item totalizer 114 is left in the position to be engaged with the actuators on their clockwise movement to have the amount taken from the item totalizer 114 and put on the actuators.

Immediately after this happens, the bell crank 651 is moved counter-clockwise, and now, since there is a high spot on the disk 673 opposite the pin 760, such counter-clockwise movement of the bell crank 651 causes a clockwise rocking of the lever 753 and the arm 752 about the pin 760, whereupon the slot 755 this time moves the plate 757 counter-clockwise, thus sliding the upper totalizer line to move the item totalizer 114, which has just been cleared, out of position and to move the group totalizer 117 into cooperative relation with the racks 112, whereby, during the latter part of this single-cycle operation, the amount which was taken from the item totalizer 114 is now entered into the group totalizer 117 as the racks 112 are restored counter-clockwise to their normal positions.

After this amount has been transferred into the group totalizer 117, the bell crank 651 is again moved clockwise to its normal position, and, during this movement, the lever 753 and the arm 752 are slid to the left to the position shown in Fig. 7, at which time the slot 755 rides idly on the stud 756, thus leaving the group totalizer 117 in selected position, or in a position to be engaged for the entry of another single-item transaction.

For the purpose of preventing any lateral movement from being imparted to the upper totalizer line during its engagement with the amount actuators 111, the plate 757 is provided with alining notches 769 and 770 (Fig. 7) adapted to be engaged by the before-mentioned aliner 608. The aliner 608 engages the notch 769 when the group totalizer is to be engaged with the actuators, and engages the notch 770 when the item totalizer is to be engaged.

Totalizers—adding operations

Figure 11:
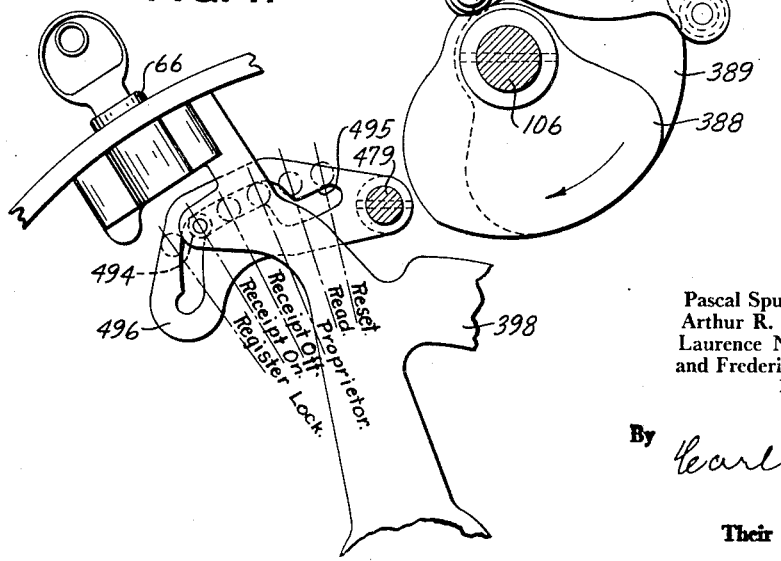
Fig. 11 is a detail fragmentary view of the unit lock lever, showing its various positions of adjustment.

During regular adding operations, the unit lock lever 66 is adjusted to any one of the three different positions identified in Figs. 1 and 11 as "Proprietor," "Receipt-off," and "Receipt-on." When the lever 66 is in any one of the three positions just mentioned, the machine will thereby be conditioned to perform single-cycle operations.

When performing an adding operation, the operator first depresses the proper amount key 61, the appropriate transaction key 62, the clerk's key 63, and either the multiple-item key 64 or the single-item key 65, depending upon whether the transaction to be recorded is composed of multiple items or a single item. The last mentioned keys are motorized, and depression thereof causes the machine to be operated to add upon the appriate totalizers on the both the upper and the lower totalizer lines. The manner in which this is accomplished will now be briefly reviewed.

At the beginning of such adding operations, the lever 647 (Fig. 31) rocks first counter-clockwise (see also Fig. 27), causing the feelers 668 and 696 to move away from the selecting disks 672—673—674. At the same time this occurs, the the lower end of the levers 658 and 691 (Fig. 25) contact with and are held by the links 678 and 702, respectively, thus causing the studs 629 and 630 (Figs. 24 and 25) to be moved out of their normal engagement with the notched arm 626 and 627, respectively, of the engaging spider 618. Thus, during the first oscillation of the engaging spider 618, both the upper and the lower totalizer lines will not be moved into engagement with the amount actuators 111, and nothing will be added upon any of the totalizers thereon.

After the feelers 668 and 696 have been moved away from the disks 672—673—674, the disks 672 and 673 are differentially adjusted under control of the banks of transaction keys 62 and the bank of multiple-item-single-item keys 64—65, respectively. The adjustment of the disk 674 is performed prior to the operation of the machine through the manual setting of the unit lock lever 66 to any one of its various positions of adjustment. At the same time, the amount actuators 111 position themselves according to the amount keys 61 depressed.

Later in said operation, the lever 647 is rocked clockwise (see Fig. 28), causing the feelers 668 and 696 to coact with the peripheries of the selecting disks 672—673—674. Should the feelers 668 and 696 contact certain unnotched portions (see Fig. 28) of the peripheries of said disks, the studs 629 and 630 will remain out of engagement with the notched arms of the engaging spider 618. When this occurs, the studs 629 and 630 will not be affected by the engaging spider 618 during the latter's second oscillatory movement, thus preventing any totalizer of either the upper or the lower totalizer line from being engaged with the amount actuators 111 during the last half-cycle of said operation. However, had the feelers 668 and 696 contacted certain notched portions (see Fig. 29) of the peripheries of said disks, the studs 629 and 630 would then have been moved into engagement with the notched arms of the engaging spider 618, and, during the second oscillatory movement of the latter, both the upper and the lower totalizer lines would have been moved into engagement with the actuators 111, so that said actuators would, upon their return movement to home position, add upon the selected totalizers amounts corresponding to the amount keys depressed.

When the lever 647 receives its final counter-clockwise movement (Fig. 26), near the end of such operation, the totalizer lines will be moved to withdraw the engaged totalizer out of engagement with the amount actuators 111 and returned to their home position.

"Item" totalizer—"sub-total" or "read" operation

When it is desired to read or take a sub-total from the "item" totalizer during the recording of a multiple-item transaction, the operator depresses the "sub-total" key 62 in the transaction bank and the "total" key 67, which, through means to be later described, causes a lever 771 (Figs. 5 and 31) to be rocked counter-clockwise. The lever 771 is loosely mounted on the rod 654 and has pivoted to its right-hand end a link 772. The link 772 carries a stud 773 (Fig. 5), which projects through slots 774 and 775 formed in levers 776 and 777, respectively, freely mounted on the shaft 116. The lever 777 has a slot 778, the right-hand wall of which is provided with a high spot and a plurality of low spots which are adapted to coact with a stud 764 on the link 678. When the lever 777 is in its home position, the high spot formed on the right-hand wall of the slot 778 coacts with the stud 764 to hold the link 678 against movement toward the right.

Each of the disks 672, 673, and 674 (Figs. 4, 3, and 2) is provided with three arcuate shaped slots, each of which is associated with a different totalizer line and exercises certain control over the resetting to zero of any selected totalizer on its respective line during the first half of a single-cycle operation of the machine. Such slots in the disk 672 bear reference numerals 785, 786, and 787 (Fig. 4), while similar slots in the disk 673 (Fig. 3) are numbered 782, 783, and 784. The corresponding slots in the disk 674 (Fig. 2) bear reference numerals 779, 780, and 781. Since the present machine is shown embodying only two totalizer lines—viz., the upper line and the back line—only the two slots in each of the disks corresponding to said lines will be hereinafter referred to. The outermost walls of the slots 786 and 783 in the disks 672 and 673, respectively, which are associated with the upper totalizer line, are cut away to provide high and low spots thereon. The stud 764 (Figs. 3, 4, 5, and 31) projects through and coacts with the slots 783 and 786 in the disks 673 and 672, respectively, and with the slot 778 in the lever 777. Consequently, the slot 780 in the disk 674 will not, in the present illustration of the invention, exercise any control over the totalizers on the upper line. It will be noticed that the right-hand wall of the slot 783 (Fig. 3) is composed of one continuous notched portion, while the corresponding wall of the slot 786 (Fig. 4) is composed of both notched and unnotched portions. It will thus be obvious that, in the present illustration, of the two slots 783 and 786, only the last mentioned slot will exercise any variable control over the resetting of the "item" totalizer.

Figure 10:
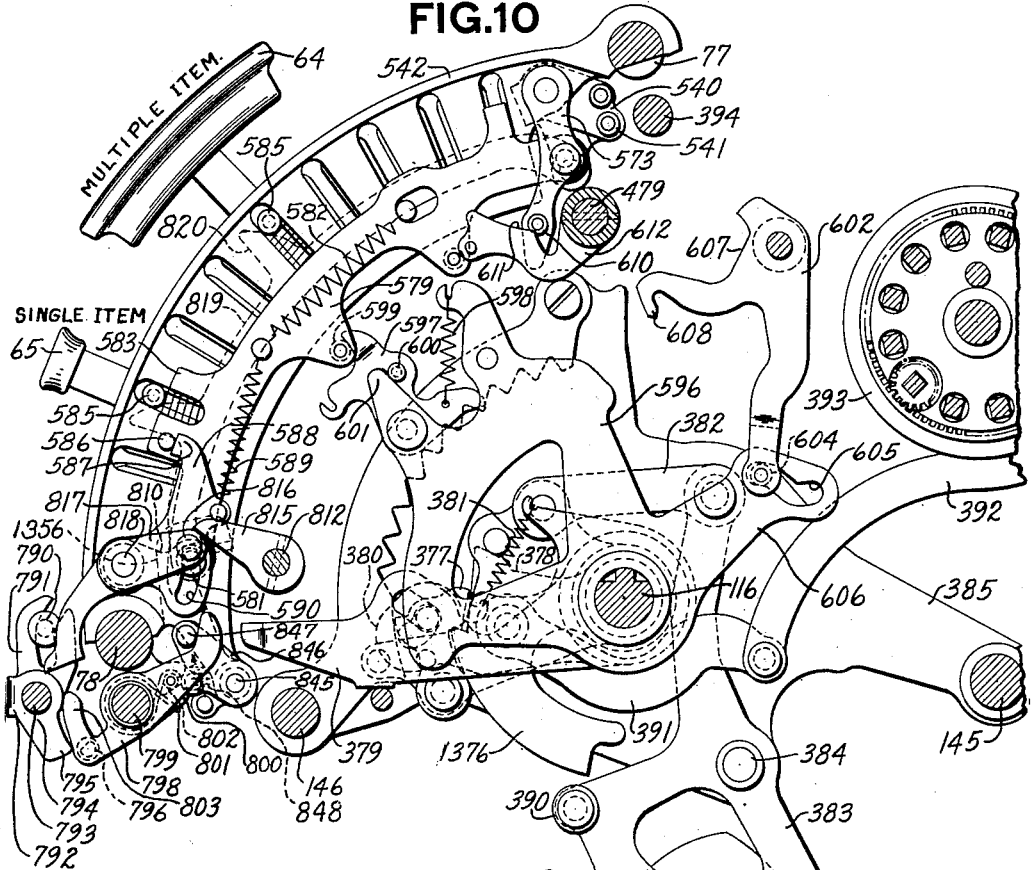
Fig. 10 is a side elevation of the bank of item control keys, showing the mechanism controlled thereby for differentially adjusting the totalizer selecting disk associated therewith.

When the "sub-total" key 62 and the "total" key 67 are depressed, causing the lever 771 to be rocked counter-clockwise, the link 772 will be moved upwardly (Fig. 5), whereupon the stud 773 cams the lever 777 clockwise to remove the high spot on the right-hand wall of the slot 778 out of obstructing position. When the "sub-total" key 62 is depressed, its pin 286 (Fig. 15) rocks a lever 789 clockwise. The lever 789 is pivoted on the frame 281 and carries a stud 790 embraced by the left-hand bifurcated arm 791 of a yoke 792 loose on a shaft 793 journaled in the side frames of the machine. The right-hand arm 794 of the yoke 792 has an arm 795 (Fig. 10).

The above mentioned clockwise movement of the lever 789 rocks the yoke 792 counter-clockwise to place the arm 795 over a half-round stud 796 (Fig. 10) carried by the lever 798 loose on the shaft 799 suitably journaled in the machine side frames. Secured on the shaft 799 is an arm 800 connected to the lever 798 by a torsion spring 801. This spring normally urges the lever 798 in a clockwise direction, but the latter is limited in such movement by a stud 802 thereon contacting the arm 800. The shaft 799 receives a clockwise movement during both sub-total operations and total taking operations.

As mentioned hereinbefore, when the "multiple-item" key 64 is once depressed, the slide 579 (Fig. 10) moves the projection 583 thereon beneath the pin 585 on the "single-item" key 65, so that the latter cannot be depressed until the "item" totalizer 114 is cleared and the amount thereon is transferred to the "group" totalizer 117. As previously described, the slide 579 is held in locking position by the lever 588, which is snapped over the stud 586 by the spring 589 and held in such locking position until the "item" totalizer 114 is cleared by depressing the total key 67.

When the shaft 799 is rocked clockwise during a total operation, the arm 800 is moved away from the stud 802, thereby permitting the spring 801 to rock the lever 798 clockwise. When this occurs, an upwardly extending projection 803 of the lever 798 strikes the lower end of the lever 588 and rocks the latter clockwise to remove the finger 587 from the path of the stud 586 to permit the slide 579 to be returned to its home position by the spring 582.

However, when the shaft 799 is rocked clockwise during a sub-total taking operation, it is desirable not to have the slide 579 moved out of its locking position. To prevent the slide 579 from being returned to its normally ineffective position at this time, the arm 795 is moved directly over the stud 796 to prevent clockwise movement of the lever 798 and thereby prevent the projection 803 from releasing the slide 579 from its locking position.

During the sub-totaling of the item totalizer, which operation has just been described, the sub-total key 62 has another definite function in connection with the zero stop pawl 284 of the transaction bank and the zero stop pawl 1356 of the multiple-item and single-item key bank.

The zero stop pawl 284 (Fig. 15) of the transaction key bank is normally in an ineffective position and is rocked into its effective position to control the transaction differential to stop in the zero position during the taking of the total of the item totalizer.

The zero stop pawl 1356 (Fig. 10) of the multiple-item and single-item key bank is also normally in its ineffective position and is permitted to move into its effective position during the taking of the total of the item totalizer.

However, during the taking of the sub-totals from the item totalizer, it is necessary in both instances, for a purpose to be hereinafter described, that the zero stop pawls 284 and 1356 of the transaction key bank and the multiple-item and single-item key bank remain in their ineffective positions.

The zero stop pawl 284 (Fig. 15) of the transaction bank is fast on the shaft 703 carried by the frame 281. Also secured to the shaft 703 is an arm 704 carrying a pin 705 held in contact with a lever 706 by a spring 292. The lever 706 is pivoted on the shaft 799 and carries a pin 707 held in contact with an arm 708 by a torsion spring 709.

Therefore, since the lever 706 cannot be moved clockwise beyond the limit of contact of the pin 707 with the arm 708, the lever 706, through the pin 705, holds the zero stop pawl 284 to its normal ineffective position as shown in Fig. 15. However, during the total taking operation, the shaft 799 is rocked clockwise, and, when this occurs, the spring 709 rocks the lever 706 clockwise, thus permitting the spring 292 to rock the zero stop pawl into an effective position to control the transaction differential to be stopped in zero position.

But, during the sub-total taking operation, the clockwise movement of the lever 789 (Fig. 15), as described above, rocks the yoke 792 counter-clockwise, whereupon a finger 729 thereon is moved above a stud 730 of the lever 706, so that, when the shaft 799 is rocked clockwise with its arm 708, the spring 709 cannot rock the lever 706, and consequently the zero stop pawl 284 will be held in its normal ineffective position to permit the differential mechanism of the transaction bank to be positioned in third position, which corresponds to the position of the sub-total key.

The zero stop pawl 1356 (Fig. 10) of the single-item and multiple-item key bank is fast on a shaft 845, to which is also secured an arm 846 carrying a pin 847 normally held in contact with a lever 798 by a spring 848.

Therefore, during the sub-total taking operations of the item totalizer 114, as above described, when the shaft 799 is rocked clockwise, the lever 798 cannot move clockwise under the action of the spring 801, due to the fact that the arm 795 has been moved above the stud 796 by the depression of the sub-total key, and consequently the differential arm 379 of the multiple-item-single-item bank is permitted to go to the ninth position and move the totalizer selecting disk 673 to the ninth position, wherein there is a notch (see Fig. 3) which is positioned opposite the pin 760 on the lever 753 (Fig. 7), so that, during the movements of the bell crank 651 the lever 753 and the arm 752, as previously described, the item totalizer 114 will be caused to remain in its selected position on the return movement of the bell crank 651 to its normal position when the pin 760 moves into the notch in the ninth position of the disk 673, thus permitting the slot 755 to move idly on the stud 756 of the plate 757, whereupon the amount which was taken from the item totalizer 114 and put on the racks 112, as the racks were moved in their clockwise directions, is put back into the item totalizer 114 as the racks 112 are restored to their normal positions, which constitutes a sub-total operation of the item totalizer.

When the item totalizer is cleared and the amount thereon is transferred to the group totalizer 117, as previously described, the sub-total key 62 is not depressed in conjunction with the total key 67, and therefore the zero stop pawl 1356 of the multiple-item and single-item bank is permitted to rock into its effective position under influence of its spring 848 when the shaft 799 is rocked clockwise, as above noted.

As above mentioned, depression of the "sub-total" key 62 and the "total" key 67 resulted in rocking the lever 777 (Fig. 5) clockwise to place a low spot on the right-hand wall of the slot 778 opposite the stud 764 (see also Fig. 30), thereby releasing the link 678 for the necessary shifting movement toward the right to effect the engagement of the "item" totalizer 114 during the first half of said single cycle of operation. It will be recalled that the disk 672 was previously adjusted, during the registering of the items making up said multiple-item transaction, under the control of the appropriate transaction key 62, thus removing the unnotched portion of the right-hand wall of the slot 786 (Fig. 4) and placing a notched portion thereof opposite the stud 764, thereby permitting the shifting movement of said link 678 (Fig. 30) toward the right.

When the machine is then operated and the bell crank 652 (Fig. 26) is rocked clockwise to the position shown in Fig. 30, as hereinbefore described, it will move the lever 658 and the link 678 therewith, causing the lever 658 to move counter-clockwise about the stud 661. When this occurs, the stud 629 is permitted to remain in engagement with the notched arm 626 of the engaging spider 618, as shown in Fig. 30, during the first oscillatory movement of the latter. It will thus be seen that the "item" totalizer pinions 114 on the upper totalizer line will be moved into engagement with the amount actuators 111 before the latter begin their upward movement. With the "item" totalizer pinions 114 thus engaged with the actuators 111, the drivers 121 will turn the actuators and the engaged adding wheels until the latches of their actuators are disconnected from the drivers under control of the long teeth 911 (Fig. 19) on said totalizer wheels when the long teeth are arrested by the flange 912 of the latch 913, which takes place at the time the totalizer wheels reach zero, which operation is old and well known in the art and will not be described here. The amount thus taken off of the "item" totalizer 114 and placed on the actuators 111 is, through the beam construction and internal-external drive mechanism, set up on the indicators as heretofore described. As the bell crank 652 (Fig. 25) receives its counter-clockwise movement, the engaging spider 618 completes its first oscillatory movement, thereby disengaging the item totalizer pinions 114, which are now standing at zero, from the actuators 111. The actuators 111 remain in the positions to which they were adjusted under control of the item totalizer pinions 114 until the feeler 668 is moved into contact with the peripheries of the selecting disks 672—673—674 by the counter-clockwise movement of the bell crank 652. When this occurs, the feelers 668 will coact with the necessary notched portions of the peripheries of said disks, thereby permitting the lever 658 to pivot in a clockwise direction about the stud 661. This permits the studs 629 to remain engaged with the notched arms 626 of the engaging spider 618, so that, during the second oscillatory movement of the latter, the "item" totalizer pinions 114 will be reengaged with the actuators 111. Upon the return movement of the actuators 111 to their home positions, they will add back onto the "item" totalizer the amount which was taken off of it earlier in the operation.

As previously mentioned, when taking sub-totals of the "item" totalizer, the operator depresses the "sub-total" key 62 and the "total" key 67, which causes the release of the machine for operation and at the same time causes the lever 777 (Fig. 5) to be rocked counter-clockwise to release the link 678 for movement toward the right. The means for accomplishing this result will now be described.

The "total" key 67 is secured to an arm 811 (Fig. 5) secured to a short shaft 812 suitably journaled in the right side frame 80. A spring 813 normally holds the arm 811 against a stud 814 secured in said side frame, to maintain the total key 67 in its normal undepressed position. Depression of the key 67 rocks the arm 811 and the shaft 812, as well as another arm 815 (Fig. 10) secured to said shaft, counter-clockwise. Such counter-clockwise movement of the arm 815 causes the latter to cooperate with the stud 816, carried by the arm 817, to rock the latter clockwise. The arm 817 is secured to a short shaft 818 suitably journaled in the key frame 542. Also secured to the shaft 818 is an arm 810, to which is pivoted the lower end of a control bar 819, the upper end of which is pivoted to the bell crank 540. The bar 819 is provided with the usual inclined projections 820, with which the pins 585 on the "multiple-item" key 64 and the "single-item" key 65 coact when said keys are depressed to cam said bar downwardly to release the machine for operation. It will thus be obvious that such clockwise movement of the arm 817 will, through the shaft 818, be transmitted to the arm pivoted to the lower end of the control bar 819, thereby moving the latter downwardly to release the machine for operation. The clockwise movement which the shaft 394 receives when the machine is released for operation is transmitted, by means to be presently described, to the shaft 793 suitably journaled in the side frames 79 and 80 and located toward the front of the machine. Secured to the shaft 394 (Fig. 6) is an arm 821 carrying a stud 822 embraced by a bifurcated portion of an arm 823 loosely mounted on a stud 824 carried by the side frame 79. The arm 823 is connected by a link 825 to a lever 826 (Fig. 8) loosely mounted on the rod 78. The other arm of the lever 826 carries a stud 827 embraced by the bifurcated portion of an arm 828 secured to the shaft 793. It will thus be seen that clockwise movement given to the shaft 394 will, through the train of mechanism just described, impart a like movement to the shaft 793.

When the "total" key 67 is depressed, thereby rocking the arm 811 and the shaft 812 counter-clockwise, a lever 829 (Fig. 5) connected by a spring 830 to the arm 811 is also rocked counter-clockwise. The lever 829 is pivoted on the shaft 812 and carries a stud 831 engaging a slot 832 in an arm 833. The arm 833 is pivoted to another arm 834 secured to the shaft 793. When the lever 829 is rocked counter-clockwise, as above described, the stud 831 coacts with the slot 832 to cam the arm 833 in a clockwise direction to position a surface 835 thereon in front of a stud 836 carried by a right-hand arm 837 of a yoke 838 loosely mounted on the shaft 799 suitably journaled in the right side frame 80. The yoke 838 is only maintained in its home position by a spring 840 connecting the arm 837 with the arm 834 to hold a projection 841 on the arm 837 against a stud 842 secured to the side frame 80. When the shaft 793 is rocked clockwise during the release of the machine for operation, the arm 834 moves the arm 833 toward the right, causing the surface 835, which was previously positioned in front of the stud 836 by the depression of the total key 67, to coact with the stud 836 to rock the yoke 838 clockwise. A left-hand arm 843 (Fig. 5) of the yoke 838, being connected by a link 844 to the lever 771, will at this time cause the lever 771 to be rocked counter-clockwise, thereby positioning the lever 777 so that the link 678 will be free for movement toward the right, as previously described. Movement of the arm 833 toward the right after it has been rocked clockwise by the key 67, as just described, positions a foot 854 beneath a block 855 secured to the frame 80 to thereby lock the total key 67 in its depressed position until the operation of the machine has been completed.

Near the end of the operation, when the release shaft 394 is rocked counter-clockwise to its home position, the arm 833 is moved toward the left, to withdraw the foot 854 from beneath the block 855 to release the total key 67 and permit it to be returned to its normal undepressed position by the spring 813.

During such "read" operation it is necessary that all of the zero stops 95 (Fig. 18) associated with the amount key banks be moved out of their normal effective positions, in order that the actuators may move upwardly to take an amount off of the "item" totalizer pinions 114. The means for accomplishing this result includes a lever 856 (Figs. 5 and 9) pivoted on a stud 853 on an arm 857 secured to the shaft 799. The upper arm of the lever 856 carries a stud 858, which is normally held against the arm 837. The lower arm of said lever 856 is pivoted to a link 859, which is normally held against a stud 860 in the lever 856 by a spring 861. The stud 860, in turn, bears against a surface 871 of one arm of a lever 872 (Fig. 9) to be described hereinafter. The link 859 is provided with a bayonet slot 862, through which projects a stud 863 carried by one arm of a lever 864 freely mounted on a stud 865 in the side frame 80. The other arm of the lever 864 carries rollers 866 and 867 coacting with cams 868 and 869, respectively, secured to the main drive shaft 106. When the yoke 838 is rocked clockwise, as above described, the arm 837 rocks the lever 856 clockwise with the stud 853 as its pivotal point. Since the link 859 is pivoted to the lever 856 and is held against the stud 860 of said lever, the link 859 and the lever 856 move clockwise as a unit. This moves the horizontal portion of the slot 862 over the stud 863.

Upon operation of the machine, the drive shaft 106 imparts one complete clockwise rotation to the cams 868 and 869 and, through the latter's cooperation with the rollers 866 and 867, rocks the lever 864 first counter-clockwise and then clockwise. The lever 864, during such counter-clockwise movement, moves the link 859 and the lever 856 downwardly, thus imparting a clockwise movement to the arm 857 and the shaft 799. The shaft 799 (Fig. 18) has secured thereon a yoke 870, which is adapted during such clockwise movement of the shaft 799 to rock each of the levers 101 counter-clockwise to move each of the zero stops 95 out of their normally effective positions. This will permit the actuators 111 to move upwardly under the control of the "item" totalizer pinions 114 during such reading operations.

When the lever 864 is rocked clockwise to its home position, it will, through the same train of mechanism just described, rock the yoke 870 counter-clockwise to permit the zero stops 95 to be returned to their normally effective positions by their springs 98.

The stud 863 is normally positioned in the slot 862 (Fig. 9), so that, when the lever 864 is rocked counter-clockwise during adding operations, as above described, the stud 863 will move idly in the vertical portion of the slot 862 and the zero stops 95 will not be affected thereby.

*Clearing the "item" totalizer and transferring the amount therefrom to the "group" totalizer*

After all the items of a multiple-item transaction have been recorded, it is desirable to take a total thereof, reset the "item" totalizer 114 to zero, and transfer the amount taken therefrom to the "group" totalizer 117. The manner in which this is accomplished will now be described.

Before the total of such items as have been recorded is taken, it may be desirable to take a sub-total for the purpose of computing any tax which might be chargeable on such items. In order to do this, the operator presses the "sub-total" key 62 in connection with the "total" key 67, as was previously described in connection with reading the "item" totalizer, to set up the sub-total on the indicators. The amount of the tax is then computed on the basis of the amount thus displayed on the indicators, and the "cash tax" key 62 is then depressed in conjunction with the "multiple-item" key 64, thereby causing the amount of the tax to be added upon the "item" totalizer. The operator then depresses the "total" key 67, which causes the "item" totalizer pinions 114 to be engaged with the actuators 111, so that, upon the upward movement of the latter, the amount will be taken off of the "item" totalizer and placed on the actuators 111, as previously described. However, before the actuators 111 begin their return movement to home position, the pin 760 (Fig. 7) will coact with an unnotched portion in the zero position of the control disk 673 (Fig. 3). This will cause the arm 752 to be rocked clockwise to position the "group" totalizer pinions 117 opposite the amount actuators 111. Therefore, when the upper totalizer line is moved into engagement with the actuators 111 before the latter begin their return movement to home position, the "group" totalizer 117 will be engaged therewith and, as the actuators move downwardly, will transfer to the "group" totalizer the total amount which was previously taken off of the "item" totalizer.

*"Group total" totalizer—"sub-total" or "read" operation*

In reading, or taking a sub-total from, the "group total" totalizer 117 on tube 241 (Figs. 18 and 21), the unit lock lever 66 is adjusted to the "read" position (Fig. 1), and the "sub-total" key 62 is depressed. These devices control the adjustment of the selecting disks 674 (Fig. 2) and 672 (Fig. 4), respectively, to control the engagement of the "group total" totalizer 117 with the actuators 111 (Fig. 18).

The adjusting of the unit lock lever 66 also disables the normal control over the totalizer line shifting mechanism (Fig. 7) by withdrawing the projection 761 of the arm 762 from the path of the pin 760. The adjusting of the unit lock lever 66 further conditions certain elements of the machine to cause the machine to perform two cycles of operation.

After the lever 66 and the "sub-total" key 62 have been adjusted, the machine is released for operation by depression of a clerk's key 63.

"Group total" totalizer selecting means

As pointed out hereinbefore, the "group total" totalizer 117 is shifted into position for receiving the total of a multiple-item transaction at the end of every multiple-item transaction entry operations and also prior to the entry of a single-item transaction, and said totalizer 117 remains in such shifted position at the end of each of said operations. Therefore, the "group total" totalizer 117 will always be in the selected position—that is, in position in alinement with the actuators 111—at the time it is desired to take a sub-total therefrom. Therefore, in the present disclosure, the shifting means disclosed in Fig. 7 is disabled when the unit lock lever 66 is moved to the "read" position (Fig. 1).

Movement of the unit lock lever 66 to the "read" position withdraws the projection 761 (Fig. 7) of the arm 762 from the path of the pin 760. Thereafter, during the sub-total, or read, operation, when the lever 647 receives its oscillating movements, the shifting arm 752 will not rock the plate 757, since the pin 760 will be free to move. At this time, the slot 755 of the arm 752 rides idly on the stud 756, thus permitting the shifting cam 740 and the tube 241 (Figs. 18 and 21) to remain in position to aline the "group total" totalizer 117 with the actuators 111.

The arm 762 is withdrawn from the path of the pin 760 by the unit lock lever 66 (Fig. 9) when the cam slot 403 of the cam plate 400 rocks the yoke 406. The yoke 406 is provided with an arm 881 connected to the arm 762 by a stud 882. Thus, when the lever 66 lifts the cam plate 400, the cam slot 403 rocks the yoke 406 and the arm 762 clockwise (Figs. 7 and 9), thus withdrawing the projection 761 of the arm 762 from the path of the pin 760. During the operation of the machine, the pin 760 moves idly, and therefore the "group total" totalizer 117 remains in proper alinement with the actuators 111.

"Group total" totalizer engaging means

The "group total" totalizer 117 is engaged with the actuators 111 by the engaging spider 618 (Fig. 24) in the same manner as heretofore described. The spider 618 pulls the link 628 downwardly when the stud 629 is in the notch of the spider. The link 628 is connected to the arm 249, the latter having a roll 250 engaging in the cam slot 251; and, as hereinafter described, rocking the arm 249 causes the totalizer frame to be moved to engage the "group total" totalizer 117 with the actuators 111. The spider 618 is actuated by cams 622 and 623, which rock the lever 619, and the latter, through the arm 616 thereon, rocks the spider 618 clockwise (Fig. 24). Reverse movement of the spider 618, by the cams 622 and 623, withdraws the totalizer 117 from engagement with the actuators 111.

As hereinbefore mentioned, the spider 618 receives two complete oscillating movements for each cycle, or rotation, of the drive shaft 624.

Since the sub-total or reading operation of the "group total" totalizer 117 requires two complete cycles, the spider 618 is oscillated four times during such two-cycle operation.

Means is provided to prevent engagement of the stud 629 (Fig. 24) with the notch in the engaging spider 618 during the first oscillating movement thereof in the first cycle of the two-cycle operation. This means includes the link 678, which is provided with the stud 764 (Fig. 5) normally held in engagement with a high spot in the wall of a slot 778 of a lever 777. When the lever 647 receives its first, or counter-clockwise, movement, from the position shown in Fig. 26 to the position shown in Fig. 27, the bell crank 652 is rocked clockwise to lift the feeler 668 away from the selecting plates and, through the stud 661, to withdraw the stud 629 from engagement with the notch in the engaging spider 618 (Fig. 24).

During the first cycle of the two-cycle operation, after the spider 618 has completed its first oscillating movement and has returned to its normal position, the lever 647 receives a clockwise movement from the Fig. 27 position to the Fig. 29 position. At this time, the notch "3" of the selecting disk 672 (Fig. 4) is in the path of the finger 669 of the feeler 668, and a notch of the selecting disk 674 (Fig. 2) is in the path of the finger 670, and therefore, as the bell crank 652 moves counter-clockwise (Fig. 29), said fingers enter said notches and permit the lever 658 to move far enough to engage the stud 629 with the notch in the totalizer engaging spider 618. Then, when the spider 618 receives its clockwise movement during its second oscillating movement, the "group total" totalizer 117 is carried into engagement with the actuators 111, just as in single-cycle total-taking operations. However, during the first cycle of a two-cycle total-taking operation, the zero stops 95 (Fig. 18) arrest the amount actuators 111 in their zero positions, and therefore the engaging and disengaging movement of the "group total" totalizer 117 during said first cycle is an idle one and the totalizer is not actuated. The zero stops 95 are withdrawn from the path of the amount actuators 111 at the beginning of the second cycle of operation, in the manner described hereinafter.

During the first cycle of a two-cycle operation, the transaction differential positions the selecting disk 672 (Fig. 4) to present the notch "3" to the finger 669 and a notch "3" to the stud 764 of the link 678 (Fig. 27). Also, when the unit lock lever 66 is manually adjusted to the "read" position prior to the machine operation, the selecting disk 674 (Fig. 2) is adjusted to present the notch "4" to the finger 670 of the feeler 668 (see also Fig. 25). The selecting disk 673 remains in its zero position, as shown in Fig. 3. The link 678 is also under control of a lever 777 (Fig. 5), which lever is normally in a position to prevent the link 678 from moving toward the right. The lever 777 has a slot 778 provided with a high spot and two low spots coacting with the stud 764 on the link 678. Near the end of the first cycle of operation, the lever 777 is rocked to withdraw the high spot from engagement with the stud 764. Therefore, at the beginning of the second cycle of a two-cycle operation, the fingers 669 and 670 have notches opposite them, and the link 678 is free to move toward the right (Figs. 25 to 29 inclusive).

The lever 777 is rocked counter-clockwise (Fig. 5), near the end of the first cycle of operation, by mechanism actuated by the cycling mechanism (Fig. 9).

As mentioned hereinbefore, the manual movement of the unit lock lever 66 (Fig. 9), through the plate 400, rocks the yoke 406 and thereby moves the pitman 408 to the left to couple the disk 409 to the gear 395. This movement of the yoke 406, through the arm 881, the stud 882, and the arm 762 (Fig. 31), rocks a cam arm 883 clockwise an initial movement an extent far enough to move the concentric part of the cam slot 884 over the stud 885 without moving the lever 776 (Fig. 5), on which the stud 885 is mounted. The lever 776 is coupled to the lever 777 by a stud 773 carried by a link 772, the stud projecting through slots 774 and 775 of the levers 776 and 777, respectively.

Near the latter part of the first cycle of the two-cycle operation, the disk 409 (Fig. 9) becomes effective to shift the pitman 408 leftwardly, thus rocking the yoke 406 and the arms 762 and 883 (Fig. 31) farther in a clockwise direction. During this second clockwise movement of the cam arm 883, the cam slot 884 therein rocks the levers 776 and 777 counter-clockwise (Fig. 5) to remove the high spot of the slot 778 from in front of the stud 764, as mentioned above.

During the first half of the second cycle of the two-cycle operation, when the lever 647 receives its first counter-clockwise movement (Fig. 30), the bell crank 652 rocks clockwise, just as in the first cycle. However, during the second cycle of operation, it is necessary that the stud 629 be engaged with the notch in the engaging spider 618. As the bell crank 652 rocks clockwise, the arm 676 of the lever 658, being free to move with the freed link 678, causes the lever 658 to pivot on the stud 659 of the bell crank 652 and on the stud 661 of the engaging link 628, and, therefore, the stud 629 remains in the notch of the totalizer engaging spider 618. Upon the first oscillation of the spider 618 during the second cycle of operation, the "group total" totalizer 117 is engaged with and disengaged from the amount actuators 111. The initial engagement of the totalizer wheels 117 with the amount actuators 111 occurs just before the latter move upwardly, or clockwise (Fig. 18), under the control of the totalizer wheels 117. After the amount differentials have completed their clockwise movement—that is, after the totalizer wheels 117 have been turned to zero—the spider 618 rocks counter-clockwise to disengage the "group total" totalizer wheels 117 from the actuators 111.

Just before the spider 618 receives its clockwise movement as it begins its second oscillating movement during the second cycle of operation, the lever 647 receives its clockwise movement from the position shown in Fig. 30 to the position shown in Fig. 29. This counter-clockwise movement of the lever 647 rocks the bell crank 652 counter-clockwise, thus bringing the feeler 668 into contact with the peripheries of the selecting disks 672 (Fig. 4), 673 (Fig. 3), and 674 (Fig. 2). At this time, the finger 669 (Fig. 4) enters the notch "3" of the disk 672, and the finger 670 (Fig. 2) enters the notch "4" of the disk 674. The finger 671 contacts the high spot "0" of the disk 673 (Fig. 3). This permits the lever 658 to assume the position shown in Fig. 29, wherein the stud 629 remains in the notch of the totalizer engaging spider 618, when the latter is oscillated the second time during the second cycle of operation.

The clockwise movement of the spider 618, as it begins its second oscillating movement, takes place prior to the return movement of the amount actuators 111, and, therefore, the "group total" totalizer 117 is reengaged with the actuators before they are returned to their home or normal positions. During the return movement of the actuators 111, the amount taken from the "group total" totalizer 117 is restored into it.

Zero stop withdrawing means

The amount actuators 111 are retained in the zero positions during the first cycle of the two-cycle operation by the zero stops 95 (Fig. 18). However, during the second cycle of a two-cycle operation, the zero stops 95 must be in their ineffective positions so that the actuators 111 can restore the totalizer wheels 117 to zero and thereafter reenter the amount taken off of the wheels 117 into said wheels 117 in the manner described above.

To withdraw the zero stops 95 from the path of the projections 130 of the totalizer actuators 111, mechanism shown in Fig. 9 is provided.

The means for imparting such movement to the zero stops 95 includes a link 893 (Fig. 9), which is pivoted at its upper end to the pitman 408. The other end of the link 893 is pivoted to the upper arm of a lever 894 freely mounted on a stud 895 in the side frame 80. The link 893 carries a roller 896, which projects through and works in an irregularly-shaped slot 897 formed in the right-hand arm of the lever 872, which is loosely mounted on a stud 899 in the frame 80. When the unit lock lever 66 is moved to "read" position, the pitman 408 is given a manual movement toward the left, as previously described, which, through the link 893, moves the roller 896 a short distance in the slot 897, but not sufficiently to impart any movement to the lever 872. However, near the latter part of the first cycle of said operation, the pitman 408 is automatically moved farther toward the left, which imparts a further movement to the roller 896 to thereby cam the lever 872 counter-clockwise about the stud 899. Such movement of the lever 872 will, through the cooperation of the surface 871 with the stud 860, cam the lever 856 clockwise to position the horizontal portion of the slot 862 over the stud 863. Therefore, during the second cycle of said operation, the cams 868 and 869 will, through the lever 864, draw the link 859 and the lever 856 downwardly to thereby impart a clockwise movement to the arm 857 and the shaft 799. This will, through the yokes 870 (Fig. 18), previously described, rock the zero stops 95 out of their normal effective positions to permit movement of the actuators 111 during the second cycle of such operation.

"Clerks' " totalizers—"sub-total" or "read" operations

The mechanism for sub-totaling, or reading, the clerks' totalizers is substantially the same as the mechanism for taking a sub-total from the "group total" totalizer. The difference between the two mechanisms is mainly in the method of shifting the totalizers for selective engagement with the actuators 111. For this reason, the mechanism which was described above is only briefly described in connection with the clerks' sub-total operation.

In reading, or taking a sub-total of, any one of the clerks' totalizers 115 on the tube 261 (Fig. 18), the unit lock lever 66 is adjusted to its "read" position (Fig. 1), and one of the clerks' keys 63 is depressed, depending upon which totalizer is to be read. This adjustment of the unit lock lever 66 adjusts certain parts in the machine to cause the machine to perform a two-cycle "read" operation, and the depression of a clerk's key 63 releases the machine for operation.

The clerk's totalizer line 261 is shifted to select a desired one of the clerks' totalizers 115 in the same manner as during adding operations, described above. This shifting is under control of the depressed clerk's key 63 (Figs. 1 and 12), which, through the differential arm 362, the beam 373, the link 374, the internal-external gear unit 375, the link 711 (Fig. 23), and the segment 712, adjusts the drum cam 717 (Fig. 22) to properly aline the selected clerk's totalizer 115 with the amount actuators 111.

The manual movement of the unit lock lever 66 from its normal "add" position to its "read" position imparts a clockwise movement to the plate 400 (Fig. 9), as described hereinbefore. Such clockwise movement of the plate 400 will, through the slot 403 and the roller 404, cam the yoke 406 clockwise. A left-hand arm 881 of the yoke 406 is secured to the arm 762 (Fig. 31) by a stud 882. The arm 762 is in turn secured by a hub to another arm 883 (Figs. 5 and 31), which is provided with an angularly-shaped slot 884, through which projects a stud 885 carried by the lever 776. It will thus be seen from the foregoing that, when the yoke 406 (Fig. 9) receives the clockwise movement mentioned above, the arms 762 and 883 (Fig. 31) will likewise be rocked clockwise. During such clockwise movement of the arm 883, the slot 884 moves idly over the stud 885 without affecting the levers 776 and 777. The lever 776 is provided with a slot 886 (Fig. 5), one wall of which is provided with a high spot and a low spot. A stud 887 on the link 702 associated with the clerks' totalizers normally coacts with the high spot associated with said slot 886 to prevent engagement of any of the clerks' totalizers with the actuators 111 when the latter move upwardly, to reset said totalizers to zero. With the lever 776 thus maintained in its normal position during the time the lever 691 (Fig. 25) is first lowered, the link 702 will be held against movement with said lever, thus causing the latter to move the stud 630 (Fig. 24) out of engagement with the notched arms of the engaging spider 618, so that the selected clerk's totalizer will not be engaged with the actuators 111 during the first oscillation of said engaging spider.

The zero stops 95 associated with the amount differential actuators 111 remain in their normally effective positions during said first cycle of said two-cycle operation, and consequently all of the amount actuators are thus stopped in their zero positions. However, during such first cycle of operation, the differential actuator corresponding to the clerk's key 63 is permitted to move to effect the shifting of the clerk's totalizer line, so as to aline the selected clerk's totalizer 115 with the amount actuators 111.

The lever 691 is moved counter-clockwise later in said first cycle of operation to engage the finger 697 with the low spot "0" on the selecting disk 672 (Fig. 4) and the finger 698 with the low spot "4" on the selecting disk 674 (Fig. 2). Since, at this time, a notched portion of the selecting disks is opposite the fingers 697 and 698, the lever 691 pivots clockwise about the stud 694, to permit its associated clerk's totalizer 115 to be moved into engagement with the amount actuators 111 upon the clockwise movement during the second oscillation of the engaging spider 618 during said first cycle of such two-cycle operation. However, since the amount actuators 111 were stopped in their zero positions during said first cycle of operation, the pinions of the selected clerk's totalizer will not be actuated at this time.

Near the latter part of the first cycle of such two-cycle "read" operation, the plate 400 (Fig. 9) is automatically given an additional clockwise movement, which is transmitted to the arms 762 and 883 (Figs. 5, 7, and 31). Such second, or automatic, clockwise movement of the arm 883 will cam the lever 776 counter-clockwise to remove the high spot from in front of the stud 887. This will release the link 702 for outward movement with the lever 691 during the first half of such second cycle operation.

If one of the clerks' keys 63 is depressed, without a key 62 being depressed, for the purpose of reading one of the clerks' totalizers, the disk 672 is adjusted under control of the transaction differential (Fig. 15) to present a notched portion of its periphery (corresponding to the "0" position of Fig. 4) to the finger 697 of the feeler 696 on the lever 691. The disk 674 is manually adjusted to present a notched portion of its periphery (corresponding to the "4" position in Fig. 2) to the feeling finger 698, by the unit lock lever 66 when the latter is adjusted to the "read" position. Thus, when both of the fingers 697 and 698 engage notched portions of their respective disks 672—674, the lever 691 (Fig. 25) will thereby be permitted to rock clockwise about the stud 694 without removing the stud 630 from the notched arm of the engaging spider 618. This will permit the spider 618 to engage the appropriate clerk's totalizer pinions 115 with the actuators 111, so that the latter will, upon their return movement to home position, add back into the proper clerk's totalizer the amount taken off of it earlier in the operation.

*"Group total" totalizer—"total taking" or "reset" operations*

When it is desired to reset the "group total" totalizer 117 to zero, the operator manually adjusts the unit lock lever 66 (Fig. 1) to its uppermost or "reset" position. If the "group total" totalizer 117 is to be reset, the operator will depress the "group total" key 62 in conjunction with one of the clerks' keys 63, the latter being motorized keys and merely serving in this particular operation to release the machine. This reset operation is substantially the same as the "read" operation, previously described in detail, except that in the present instance the adjustment of the control disk 674 is such that unnotched portions of the periphery thereof (corresponding to the "5" position in Fig. 2) is contacted by the feeling finger 670 for the upper totalizer line. During the "read" operation, as before described, after the totalizer has been reset to zero in the manner described in connection with a "read" operation, the feeling finger 670 is moved into contact with the low spot "4" of the periphery of the disk 674 during the latter part of the second cycle of such operation for the purpose of adding back onto the totalizer the amount which was removed from it earlier in the operation. However, in the "reset" operation, the feeling finger 670 will contact the unnotched portion "5" of the disk 674 to cause its lever 658, during the last cycle of said two-cycle operation, to rock clockwise (Fig. 28), using the stud 667 as a pivotal point, to disengage the stud 629 from the notched arm of the engaging spider 618 (Fig. 24). From this it will be seen that, during the last oscillatory movement imparted to the spider 618, the upper totalizer line will not be engaged with the actuators 111. Therefore, when the actuators 111 return to their home positions, nothing will be added back onto the totalizer 117, and the totalizer will remain at zero.

Clerks' totalizers—"total taking" or "reset" operations

When it is desired to reset to zero any one of the clerks' totalizers 115, the operator manually adjusts the unit lock lever 66 (Fig. 1) to its uppermost or "reset" position and then depresses the clerk's key 63 corresponding to the totalizer to be reset. This reset operation is substantially the same as the "read" operations previously described in detail. The difference between the "sub-total" operation and the "reset" operation lies in the fact that the control disk 674 is set to present the unnotched portion "5" (Fig. 2) of its periphery into the path of the feeling finger 698. After the selected clerk's totalizer is reset to zero in the manner described in the "sub-total," of "read," operations, the feeling finger 698 is moved into contact with the unnotched part "5" (Fig. 2) of the control disk 674 during the latter part of the second cycle of such operation to cause the lever 691, during the last cycle of said two-cycle operation, to rock clockwise, with the stud 695 as a pivotal point, to disengage the stud 630 (Fig. 24 from the notched arm of the engaging spider 618. From this it will be seen that, during the last oscillatory movement imparted to the engaging spider 618, the clerk's totalizer line will not be moved to engage the selected clerk's totalizer with the actuators 111. Therefore, when the actuators return to their home positions, nothing will be added back onto the selected clerk's totalizer, and said totalizer will remain at zero.

Since all of the different kinds of operations which the present machine is capable of performing have been fully discussed in connection with the description of the construction and operation of the various elements involved in the present invention, it is not thought necessary to give a résumé of such operations.

While the form of mechanism herein shown and described is admirably adapted to fulfill the objects primarily stated, it is to be understood that it is not intended to confine the invention to the one form or embodiment herein disclosed, for it is susceptible of embodiment in various form all coming within the scope of the claims which follow.

What is claimed is:

1. In a machine of the class described, the combination of a totalizer; actuating means for said totalizer, adapted to be moved in one direction to restore the totalizer to zero, and in another direction to accumulate amounts on the totalizer; operating means operable through two complete operations during each machine cycle; means adapted to be connected to the operating means to engage the totalizer with and disengage it from the actuating means; a plurality of differentially adjustable control members having peripheral control surfaces and internal control surfaces; a feeling device adapted to coact with the internal control surfaces of said members to control the connection of the engaging and disengaging means with the operating means during the first one of said complete operations to engage the totalizer with the actuating means to restore said totalizer to zero; and a feeling device adapted to coact with the peripheral control surfaces of said members to control the connection of the engaging and disengaging means with the operating means during the second one of said complete operations to engage the totalizer with the actuating means to accumulate amounts upon the totalizer.

2. In a machine of the class described, the combination of a totalizer; means for actuating the totalizer, the totalizer being normally disengaged from its actuating means, said actuating means being adapted to be moved in one direction to reset said totalizer to zero and in another direction to accumulate amounts on said totalizer; means for engaging the totalizer with and disengaging it from said actuating means; operating means operable two complete cycles during each machine operation, normally connected with the engaging means; and means, comprising a plurality of members having both internal control surfaces and external control surfaces, and two feelers, one feeler cooperating with the internal control surfaces of said members for selectively controlling the connection of the engaging means and the operating means during one of the cycles of operation of said operating means, and the other one of said feelers cooperating with the external control surfaces of said members for selectively controlling the connection of the engaging means and the operating means during the other of said cycles of operation of said operating means.

3. In a machine of the class described, the combination of a plurality of totalizers; means for actuating the totalizers, said actuating means being adapted to move in one direction to reset a totalizer to zero, and in another direction to accumulate the amount thus removed from said totalizer onto a different totalizer; means to select the totalizers to be actuated; means for engaging the totalizers with and disengaging them from said actuating means; operating means, operable through two complete cycles, to operate the engaging means; and means to selectively connect and disconnect the engaging means with and from the operating means, comprising a plurality of adjustable members having internal and external control surfaces, and a plurality of feelers, one feeler for cooperating with the internal control surfaces for causing the engaging means to be connected with the operating means during the first cycle of the latter to thereby engage the first selected totalizer with the actuating means for resetting the selected totalizer to zero, and the other feeler for cooperating with the external control surfaces for causing the engaging means to be connected with the operating means during the second cycle of the latter to thereby engage the second selected totalizer with the actuating means for accumulation on said second selected totalizer of the amount removed from the totalizer which is first selected, during a single machine operation.

4. In a machine of the class described, the combination of a totalizer; means for actuating the totalizer, said actuating means being adapted to be moved in one direction to reset the totalizer to zero and in another direction to accumulate on said totalizer; means for engaging the totalizer with and disengaging it from said actuating means one or two times during an operation of the machine; operating means, operable through two cycles of operation during each machine cycle; and means for controlling said engaging means to be connected to or disconnected from said operating means one or two times during each machine cycle, comprising a plurality of differentially adjustable members, each having both internal and external control surfaces, an auxiliary member having only an internal control surface, and a plurality of feelers, one of said feelers for cooperating with the internal control surfaces of said members and auxiliary member to cause the engaging means to be connected to the operating means during the first cycle of the latter to control the resetting of the totalizer to zero, another one of said feelers for cooperating with the external control surfaces of the first-mentioned members to cause the engaging means to be connected to the operating means during the second cycle of the latter to control the adding on the totalizers.

5. In a machine of the class described, the combination of a plurality of totalizers mounted on a common support; actuators therefor; means to engage and disengage the totalizers with and from the actuators; driving means operable through two complete operations during each machine operation; means to aline one of said totalizers with said actuators during the first one of said complete operations, and to aline another one of said totalizers with the actuators during the second one of said complete operations; and means, including a plurality of adjustable members having control surfaces to control the connection and disconnection of the engaging means with and from the driving means, to engage said first alined totalizer with the actuators during the first one of the complete operations of the driving means, for transferring the total from said alined totalizer to the actuators, and to engage the second alined totalizer with the actuators during the second one of the complete operations of the driving means to transfer the total from the actuators directly to another totalizer.

6. In a machine of the class described, the combination of a plurality of totalizers; actuators therefor; engaging means active through two complete operations during each machine cycle, said engaging means capable of being rendered ineffective during one or both of said operations; means to aline one of said totalizers with said actuators during the first one of said complete operations, and to aline another one of said totalizers with the actuators during the second one of said complete operations; control means having internal and external control surfaces, said internal control surfaces controlling the engaging means to remain effective during the first operation thereof to cause the first alined totalizer to be engaged with the actuators during the first operation of the engaging means for transferring a total from said first alined totalizer to the actuators, and said external control surfaces controlling the engaging means to remain effective during the second operation of the engaging means to cause the second alined totalizer to be engaged with the actuators, to cause the latter to accumulate such totals on said second alined totalizer, and feeling devices coacting with the control surfaces to determine the effectivity of the engaging means.

7. In a machine of the class described, the combination of a totalizer; actuators therefor; means for engaging said totalizer with the actuators; driving means for the engaging means operable through two complete cycles during each machine operation, said engaging means being connectable with and disconnectable from the driving means during one or both of said cycles of operation to engage and disengage the totalizer with and from the actuators during one or both of said cycles; and means for selectively controlling the connecting and disconnecting of the engaging means with and from the driving means to selectively cause said totalizer to be engaged with said actuators by said engaging means during one or both of said complete cycles, said control means including a plurality of adjustable members provided with two sets of control surfaces, and a plurality of feeling devices, one of said feeling devices adapted to coact with one set of control surfaces of said members, and another one of said feeling devices adapted to coact with the other set of control surfaces of said members.

8. In a machine of the class described, the combination of a totalizer; actuators therefor; means, normally effective but renderable ineffective, for engaging the totalizer with the actuators; means to actuate said means twice during each machine operation; a pivoted member having a plurality of pivotal points around any one of which said member is adapted to be moved to determine the effectivity of said engaging means; a plurality of adjustable plates, having internal and external control surfaces; and feeling devices, one of which is pivoted on said pivoted member and is adapted to coact with the external control surfaces of said plates to control which pivotal point said member will be moved around to determine the effectivity of the engaging means during one of said actuations, while the other one of said feeling devices is adapted to coact with the internal control surfaces of said plates to also control the pivotal point around which said member will be moved to determine the effectivity of the engaging means during the other one of said actuations.

9. In a machine of the class described, the combination of a totalizer; actuators therefor; means adapted to be rendered effective or ineffective for engaging the totalizer with the actuators; means to actuate the engaging means twice during each machine operation; a pivoted member having a plurality of pivotal points around any one of which said member is adapted to be moved to determine the effectivity of said engaging means; a plurality of adjustable plates having two sets of control surfaces; and feeling devices, one of which coacts with one set of control surfaces of said plates to control the effectivity of the engaging means during one actuation thereof, and the other one of which coacts with the other set of control surfaces of said plates to determine around which of said pivotal points the member will be moved to control the effectivity of the engaging means during the other one of said actuations thereof.

10. In a machine of the class described, the combination of a totalizer; actuators therefor, said actuators being adapted to be moved in one direction to reset the totalizer to zero and in another direction to accumulate thereon; means adapted to be effective or ineffective for engaging said totalizer with the actuators; means to actuate the engaging means twice during each machine operation; a pivoted member having a plurality of pivotal points around which it may be moved to determine the effectivity of said engaging means; a plurality of adjustable plates having two sets of control surfaces; and feeling devices, one of which coacts with one set of control surfaces of said plates to determine the pivotal points around which the member is moved to determine the effectivity of the engaging means during the first actuation of the engaging means when the actuators move in the zero resetting direction, while the other one of said feeling devices coacts with the other set of control surfaces of said plate to determine the pivotal points around which the member is moved to determine the effectivity of the engaging means during the second actuation of the engaging means when the actuators move in the accumulating direction.

11. In a machine of the class described, the combination of a totalizer; actuators therefor, said actuators being movable in one direction to reset the totalizer to zero and in another direction to accumulate amounts thereon; means normally effective for engaging the totalizer with the actuators, said means adapted to be rendered ineffective; operating means for the engaging means operable through two cycles during each machine operation, the timing of said operating means being such that the first operation thereof takes place to engage the totalizer with the actuators for said reset operation, and the second operation takes place to engage the totalizer with the actuators for said accumulation operation; a pivoted member having several pivoted points around different ones of which said member may be moved to determine the effectivity of the engaging means prior to the movement of the actuators in a zero resetting direction and prior to the movement of the actuators in the accumulating direction; means to move the pivoted member about the said pivotal points; a retaining member disposed in cooperative relationship with the pivoted member and normally stationary to cause said pivoted member to move about a certain one of said pivotal points to render said engaging means ineffective prior to the movement of the actuators in the zero resetting direction; a plurality of adjustable plates having two sets of control surfaces; and feeling devices, one of which is secured to the retaining member and coacts with one set of control surfaces of said plates to control whether the retaining member shall remain stationary or be moved and thereby select which one of the pivotal points the pivoted member shall move around prior to the first operation of the engaging means, to control the engagement of the totalizer with the actuators prior to the movement of the actuators in the zero resetting direction, while another of said feeling devices is pivoted on the pivoted member and is adapted to coact with the other set of control surfaces of said plates to select the pivotal points around which said pivoted member will be moved prior to the second operation of the engaging means, to control the engagement of the totalizer with the actuators in the accumulating direction.

12. In a machine of the class described, the combination of a plurality of totalizers mounted on a common axle; a common set of actuators therefor, said actuators being movable in one direction to reset the totalizers to zero, and in another direction to add thereon; means for shifting the totalizers relatively to said actuators to aline any desired totalizer with the actuators; normally effective means for engaging with the actuators any totalizer which has been alined therewith; operating means for the engaging means, operable through two complete operations during each machine operation; manipulative devices; and control means adjustable under control of said manipulative devices for controlling the operation of said shifting means and to control the engaging means to be disconnected from or connected with its operating means prior to each operation of the operating means to control the effectivity of said engaging means during each of said operations of the operating means, said control means having three sets of control surfaces, one of said sets of control surfaces determining the connection or disconnection of the engaging means with or from the operating means prior to the first movement of the operating means and prior to the movement of the actuators in the zero resetting direction while one of said totalizers is alined with the actuators, a second set of said three sets of control surfaces determining the operation of said shifting means to select another totalizer to be alined with the actuators, after the first seleced totalizer has been reset by the acuators, and a third set of said three sets of control surfaces determining the connection or disconnection of the engaging means with or from the operating means prior to the movement of the actuators in the accumulating direction to accumulate the amount taken from the first selected totalizer into the second selected totalizer.

13. In a machine of the class described, the combination of a plurality of totalizers mounted on a common support; a single group of actuators for said totalizers, said actuators being movable in one direction to reset the totalizers to zero and movable in another direction to add upon said totalizers; means for shifting the totalizers relatively to the actuators to select any desired totalizer for engagement with the actuators; means for engaging the totalizers with the actuators; operating means for the engaging means having two fixed movements for each machine operation, one movement being timed to engage the totalizers with the actuators for reset operations, and the other movement being timed for add operations, said engaging means adapted to be connected with or disconnected from the operating means during one or both operations thereof; means for controlling said shifting means to select the totalizer to be engaged with the actuators during the latter's movement in the zero resetting direction; and control means adapted to control the connection of the engaging means with the operating means during the movement of the actuators in the zero resetting direction, and to control said shifting means to select another one of said totalizers, and to control the connection of the engaging means with the operating means to engage the second selected totalizer with the actuators during the latter's movement in the adding direction.

14. In a machine of the class described, the combination of a plurality of totalizers mounted on a common axle; a single group of actuators therefor, said actuators being movable in one direction to reset the totalizers to zero and in another direction to add thereon; means for shifting said totalizers relatively to said actuators to select the totalizers to be engaged with the actuators; means for engaging the selected totalizers with the actuators; operating means for the engaging means having two fixed movements for each machine operation, one movement being timed to engage the totalizers with the actuators for reset operations, and the other movement being timed for add operations, said engaging means adapted to be connected with or disconnected from the operating means during one or both operations thereof; means for controlling said shifting means to select a totalizer to be engaged with the actuators during the latter's movement in the zero resetting direction; and control means comprising feeler devices and a plurality of adjustable members having a plurality of sets of control surfaces, one of said sets of control surfaces coacting with one feeler device for controlling the engaging means to be connected to the operating means, to thereby cause said engaging means to engage the selected totalizer with the actuators prior to the latter's movement in the zero resetting direction, one of the other sets of control surfaces coacting with another feeler device for controlling said shifting means to select another one of said totalizers, and a third set of control surfaces coacting with a third feeler device for controlling the engaging means to be connected to the operating means, to thereby cause the second selected totalizer to be engaged with the actuators during the latter's movement in an adding direction, to transfer a total from the first selected totalizer to the second selected totalizer.

15. In a machine of the class described, the combination of a totalizer; actuating means for said totalizer, adapted to be moved in one direction to restore the totalizer to zero and in another direction to accumulate on the totalizer; means for engaging the totalizer with and disengaging it from the actuating means; driving means for the engaging means operable through two complete cycles of movement, one of such movements being timed to engage the totalizer before the actuators move in their zero restoring direction, and the other one of said movements being timed to engage the totalizer before the actuators move in their accumulating direction; control means for determining in which of said timed movements the engaging means is to be connected to said driving means in respect to the direction of movement of the actuating means, said control means having a plurality of sets of control surfaces; means coacting with one of said sets of control surfaces to connect the engaging means with the driving means in accumulating timing; and means coacting with the other of said sets of control surfaces for connecting the engaging means with the driving means in restoring to zero timing, the control by one set of control surfaces being sequential to the control by the other set of control surfaces, so that the totalizer is engaged with the actuating means at the proper time during the two directions of movement of the actuating means.

16. In a machine of the class described, the combination of a totalizer; actuators therefor, which are adapted to be moved in one direction to restore the totalizer to zero and in another direction to accumulate on the totalizer; engaging means adapted to effect one or more engagements of the totalizer with the actuators during a single operation of the machine; operating means for the engaging means operable through two complete cycles of movement, one of such movements being timed to engage the totalizer before the actuators move in their zero restoring direction, and the other one of said movements being timed to engage the totalizer before the actuators move in their accumulating direction; a plurality of differentially adjustable control members having two sets of control surfaces; means coacting with one of said sets of control surfaces to control the totalizer for engagement with the actuators prior to said movement of the actuators to accumulate on said totalizer; and means coacting with the other set of control surfaces to control the totalizer for engagement with the actuators prior to said movement of the actuators to restore said totalizer to zero.

17. In a machine of the class described, the combination of a plurality of totalizers; actuating means therefor, said actuating means being movable in one direction to reset the totalizers to zero and in another direction to accumulate on said totalizers; means operable through two engaging cycles during each machine operation and adapted to engage one of said totalizers with the actuating means during the first one of said cycles and when the actuating means is moved in the resetting direction, and engage another one of said totalizers with said actuating means during the second one of said cycles and when the actuating means is moved in the accumulating direction; control means for controlling the effectiveness of the engaging means during both of said cyles of said engaging means to cause the totalizers to be engaged with the actuating means in said two directions of movement of the actuators, said control means comprising a plurality of adjustable members having internal and external control surfaces, two feeling devices for coacting with said surfaces to control the effectiveness of the engaging means, and a pivoted lever on which one of said feeling devices is pivotally mounted, whereby the feeling device is moved into engagement with the external surfaces of the control means to control the effectiveness of the engaging means prior to the resetting movement of the actuators, while another of said feeling devices is disposed in cooperative relation with the internal control surfaces of the adjustable members and the lower end of said lever to normally prevent pivotal movement of the pivoted lever; and means to readjust one of the control means to free the lever to its pivotal movement and to thereby cause the last-named feeling device to coact with the external surface of the adjustable members, to control the effectiveness of the engaging means prior to the accumulating movement of the actuators.

18. In a machine of the class described, the combination of a totalizer; actuators therefor, said actuators being movable in one direction to reset the totalizer to zero and in another direction to accumulate on said totalizer; means operable through two cycles during each machine operation and adapted to engage said totalizer with the actuators during the actuators' movement in a zero resetting direction, or to engage said totalizer with its actuators when the actuators are moved in an accumulating direction; and control means for controlling the effectiveness of the engaging means during both of said cycles of operation to control the time of engagement of the totalizer with the actuators by said engaging means during each of said cycles, said control means comprising a plurality of adjustable members having internal and external control surfaces, a pivoted lever, and two feeling devices, one of said feeling devices being disposed in cooperative relation with one end of said lever and adapted to coact with the internal control surfaces of said adjustable members to exercise certain control over the movement of said lever, while the other one of said feeling devices is mounted on the lever and is adapted to coact with the peripheries of said members to exercise certain control over the movement of said lever, to cause the lever to move said first-named feeler into coacting relation with the internal control surfaces of the adjustable members, said feeling devices thereby controlling the effectiveness of the engaging means prior to the resetting movement of said actuators and again prior to the accumulating movement of said actuators.

19. In a machine of the class described, the combination of a totalizer; actuators therefor, said actuators being movable in one direction to reset the totalizer to zero, and in another direction to accumulate on said totalizer; means operable through two cycles during each operation of the machine, one of said cycles occurring to engage the totalizer in reset timing and the other cycle occurring to engage the totalizer in accumulating timing, for engaging the totalizer with and disengaging it from the actuators; and control means to control the effectiveness of the engaging means for controlling the engagement of the totalizer with the actuating means by said engaging means, said control means comprising a plurality of adjustable members having two sets of control surfaces, a pivoted lever, means to move the lever in a pivotal direction and bodily to control the effectiveness of the engaging means during each of the cycles thereof to determine the time of engagement of the totalizer with the actuators by said engaging means, and a plurality of feeling devices, one of said feeling devices being disposed in cooperative relation with the lower end of said lever to control the pivotal movement of the lever and adapted to coact with one of the sets of control surfaces of said members, to control the movement of said lever prior to the time the actuators are moved in their zero resetting direction, and another one of said feeling devices being pivoted on said lever and being adaptd to be moved into contact with the other set of control surfaces of said members by said lever to control the movement of the lever prior to the time the actuators are moved in their accumulating direction.

20. In a machine of the class described, the combination of a totalizer; actuating means therefor, said actuating means being movable in one direction to reset the totalizer to zero and in another direction to accumulate on said totalizer; means operable through two cycles during each operation of the machine for engaging said totalizer with the actuating means, said engaging means being normally effective but adapted to be rendered ineffective; a movable lever having several pivotal points and adapted, when moved around one of said pivotal points, to render the engaging means ineffective and, when moved around the other of said pivotal points, to cause the engaging means to remain effective to engage the totalizer with the actuating means; and control means comprising a plurality of adjustable members having two sets of control surfaces, and a plurality of feeling devices to control the movements of said lever, one of said feeling devices being disposed in cooperative relation with one end of said lever and adapted to coact with one set of control surfaces of said members to control the movement of the lever around one of said pivotal points so that the engaging means will remain in its normal effective condition to control the engagement of the totalizer with the actuators when the actuators move in the direction for resetting said totalizer to zero, and another one of said feeling devices being pivoted on said lever and adapted to coact with the other set of control surfaces of certain of said members to determine on which of said two pivots the lever will pivot to thereby determine the position to which said lever is moved to control the effectiveness of the engaging means prior to the movement of the actuators in the accumulating direction.

21. In a machine of the class described, the combination of a totalizer; actuators therefor, said actuators being movable in one direction which sets the totalizer to zero, and movable in another direction to accumulate thereon; manipulative means to determine the amount to be accumulated on said totalizer; means for engaging said totalizer with the actuators; operating means for the engaging means receiving two cycles of movement during each machine operation; control means; feelers cooperable with the control means; connections between the feelers and the engaging means settable in accordance with the positions assumed by said feelers to determine when the engaging means will be connected to the operating means to determine the time when the totalizer will be engaged with the actuators by said engaging means, said control means including a plurality of adjustable control members having slots and peripheral surfaces, said slots controlling one of the feelers for causing the connections to be moved into the position for determining when the totalizer will be engaged with the actuators at the time of the latter's movement in a zero resetting direction, and said peripheral surfaces controlling another one of said feelers for causing the connections to be moved into the position for determining when the totalizer will be engaged with the actuators at the time of the latter's movement in the accumulating direction; and manipulative devices for controlling the adjustment of said members.

22. In a machine of the class described, the combination of a totalizer; actuators therefor; means to engage the totalizer with the actuators before the actuators move in one direction to thereby enter amounts into the totalizer, and to engage the totalizer with the actuators before the actuators move in another direction to thereby withdraw amounts from the totalizer; an operating means for the totalizer engaging means, said operating means operable two times during each machine cycle of operation; a settable element connected with the engaging means and settable into one position to couple the engaging means with the operating means and into another position to uncouple the engaging means from the operating means; devices to determine the position of the settable element; and control elements having two sets of control surfaces coacting with the devices, one of said sets of control surfaces controlling one of said devices to set the settable element to cause the engaging means to be connected to the operating means during one of the operations thereof, and the other of said sets of control surfaces controlling another one of said devices to set the settable element to cause the engaging means to be connected to the operating means during the other of its operations, whereby the totalizer can be engaged with the actuators either in amount entry timing or in total withdrawing timing.

23. In a machine of the class described, the combination of a totalizer; actuators therefor; means to engage the totalizer with the actuators before the actuators move in one direction to thereby enter amounts into the totalizer, and to engage the totalizer with the actuators before the actuators move in another direction to thereby withdraw amounts from the totalizer; an operating means for the totalizer engaging means, said operating means operable two times during each machine cycle of operation; control elements having two sets of control surfaces; sensing means cooperating with one set of the control surfaces to cause the engaging means to be connected to the operating means during one operation of the operating means; and another sensing means cooperating with the other set of the control surfaces to cause the engaging means to be connected with the operating means during the other operation of the operating means, whereby the totalizer is engaged with the actuators in either amount entry timing or total withdrawing timing.

24. In a machine of the class described, the combination of a totalizer; actuators therefor; means to engage the totalizer with the actuators before the actuators move in one direction to thereby enter amounts into the totalizer, and to engage the totalizer with the actuators before the actuators move in another direction to thereby withdraw amounts from the totalizer; an operating means for the totalizer engaging means, said operating means operable two times during each machine cycle of operation; control elements having two sets of control surfaces; sensing means cooperating with one set of the control surfaces to cause the engaging means to be connected to the operating means during one operation of the operating means; and another sensing means cooperating with the other set of the control surfaces to cause the engaging means to be connected with the operating means during the other operation of the operating means, whereby the totalizer is engaged with the actuators either in amount entry timing or in total withdrawing timing; manipulative devices to control the differential setting of said adjustable members.

25. In a machine of the class described, the combination of a plurality of totalizers mounted on a common support; actuators therefor; means to engage and disengage the totalizers with and from the actuators; driving means operable through two complete operations during each machine operation; means to aline one of said totalizers with said actuators during the first one of said complete operations, and to aline another one of said totalizers with the actuators during the second one of said complete operations; means, including a plurality of adjustable members having control surfaces; sensing means coacting with the control surfaces to control the connection and disconnection of the engaging means with and from the driving means, to engage the first alined totalizer with the actuators during the first one of the complete operations of the driving means, for transferring the total from the first alined totalizer to the actuators, and to engage the second alined totalizer with the actuators during the second one of the complete operations of the driving means to transfer the total from the actuators directly to said second alined totalizer; and manipulative devices to selectively control the adjustment of the control members.

26. In a machine of the class described, the combination of a plurality of totalizers mounted on a common support; actuators therefor; means to engage and disengage the totalizers with and from the actuators; driving means operable through two complete operations during each machine operation; means, including a plurality of adjustable members having control surfaces; sensing means coacting with the control surfaces to control the connection and disconnection of the engaging means with and from the driving means, to engage the totalizers with the actuators during the first one of the complete operations of the driving means, for transferring the total from one of said plurality of totalizers to the actuators, and to engage another totalizer with the actuators during the second one of the complete operations of the driving means to transfer the total from the actuators directly to another totalizer; and a manipulative total-taking control means to control release of the machine for operation and to control the setting of certain elements of the machine to cause the adjustment of said adjustable members, whereby said total transfer operation takes place.

27. In a machine of the class described, the combination of a plurality of interspersed totalizers; a set of actuators therefor; adjustable means to shift the totalizers relatively to the actuators to aline a selected totalizer with the actuators for actuation thereby; settable means to adjust the adjustable means; actuating means to move the settable means in one direction and return, said settable means being pivotally mounted on one element of the actuating means; a differentially positionable control device having control surfaces thereon; manipulative devices to differentially control the positioning of the control device; and means on the settable means movable into contact with the control device when the settable means is actuated in one direction by the actuating means to determine the setting of the settable means and thereby position the adjustable means to aline a totalizer with the actuators.

28. In a machine of the class described, the combination of a plurality of interspersed totalizers; a set of actuators therefor; adjustable means to shift the totalizers relatively to the actuators to aline a selected totalizer with the actuators for actuation thereby; settable means to adjust the adjustable means; actuating means to move the settable means in one direction and return, said settable means being pivotally mounted on one element of the actuating means; a differentially positionable control device having control surfaces thereon; manipulative devices to differentially control the positioning of the control device; and means on the settable means movable into contact with the control device to arrest one end of the settable means when the latter is actuated in one direction by the actuating means to thereby cause the settable means to be rocked about said pivotal mounting to cause the settable means to readjust the adjustable means to shift a certain totalizer into alinement with the actuators.

29. In a machine of the class described, the combination of a plurality of interspersed totalizers; a set of actuators therefor; adjustable means to shift the totalizers relatively to the actuators to aline a selected totalizer with the actuators for actuation thereby; settable means to adjust the adjustable means; actuating means to move the settable means in one direction and return, said settable means being pivotally mounted on one element of the actuating means; a differentially positionable control device having control surfaces thereon, said control surfaces consisting of high and low spots; manipulative devices to differentially control the positioning of the control device; a member having a normal position and an adjusted position; and means on the settable means movable in one direction by the actuating means, when the latter actuates the settable means, to contact said member, and thereafter movable in another direction to contact the control device, said settable means moving about the pivotal mounting in one direction to aline one totalizer with the actuators when the last-named means contacts the member in its normal position, said settable means moving about its pivotal mounting in another direction to aline another totalizer with the actuators when the last-named member contacts a high spot on the control device, and said settable means remaining in the position to which it was set by contacting the member, to permit the first selected totalizer to remain in alinement with the actuators when a low spot on the control device is in the path of the last-named means at the time the latter receives its second direction of movement.

30. In a machine of the class described, the combination of a plurality of interspersed totalizers; a set of actuators therefor; adjustable means to shift the totalizers relatively to the actuators to aline a selected totalizer with the actuators for actuation thereby; settable means to adjust the adjustable means; actuating means to move the settable means in one direction and return, said settable means being pivotally mounted on one element of the actuating means; a differentially positionable control device having control surfaces thereon; manipulative devices to differentially control the positioning of the control device; a stop member; and a means on the settable means movable into contact with the stop member as the actuating means moves the settable means in said one direction to cause the settable means to assume one position of adjustment to aline one totalizer with the actuators, said means on the settable means movable into contact with the control device as the actuating means moves the settable means in return direction to cause the settable means to assume another position of adjustment to aline another totalizer with the actuators.

PASCAL SPURLINO.
ARTHUR R. COLLEY.
LAURENCE N. LEHMAN.
FREDERICK GANTNER.